US012654795B2

(12) United States Patent
Chiya et al.

(10) Patent No.: US 12,654,795 B2
(45) Date of Patent: Jun. 16, 2026

(54) OPERATING DEVICE OF HUMAN-POWERED VEHICLE

(71) Applicant: SHIMANO INC., Sakai City (JP)

(72) Inventors: Naoki Chiya, Sakai City (JP); Kosuke Kitahara, Sakai City (JP); Kentaro Kosaka, Sakai City (JP); Yoshimitsu Miki, Sakai City (JP)

(73) Assignee: SHIMANO INC., Sakai (JP)

( * ) Notice: Subject to any disclaimer, the term of this patent is extended or adjusted under 35 U.S.C. 154(b) by 59 days.

(21) Appl. No.: 18/675,114

(22) Filed: May 27, 2024

(65) Prior Publication Data

US 2025/0033724 A1      Jan. 30, 2025

Related U.S. Application Data

(63) Continuation-in-part of application No. 18/360,835, filed on Jul. 28, 2023, now abandoned.

(51) Int. Cl.
*B62J 6/16*        (2020.01)
*B62K 11/14*      (2006.01)

(52) U.S. Cl.
CPC .................. *B62J 6/16* (2013.01); *B62K 11/14* (2013.01)

(58) Field of Classification Search
CPC ........... B62J 6/16; B62K 11/14; B62M 25/08
See application file for complete search history.

(56) References Cited

U.S. PATENT DOCUMENTS

| | | | | |
|---|---|---|---|---|
| 4,455,463 A * | 6/1984 | Rohl | ...................... | B62K 23/02 74/551.8 |
| 6,400,564 B1 * | 6/2002 | Nishimoto | ............. | B62M 25/08 340/432 |
| 6,538,221 B1 * | 3/2003 | Nishimoto | ............... | B62J 50/22 200/334 |
| 2004/0190302 A1 * | 9/2004 | Mascadri | ............... | B62K 11/14 362/489 |
| 2019/0217916 A1 * | 7/2019 | Kakinoki | ............... | B62M 25/08 |

FOREIGN PATENT DOCUMENTS

| | | | | | |
|---|---|---|---|---|---|
| CN | 115535132 A | * | 12/2022 | ............. | B62M 6/45 |
| DE | 102020202715 | | 9/2021 | | |
| DE | 102023115503 | | 12/2024 | | |
| JP | 2019-123493 | | 7/2019 | | |
| JP | 2023-006404 | | 1/2023 | | |
| WO | WO 2018/163197 | | 9/2018 | | |
| WO | WO-2022168300 A1 | * | 8/2022 | ............. | B62K 23/02 |

* cited by examiner

*Primary Examiner* — Daniel D Yabut
(74) *Attorney, Agent, or Firm* — MORI & WARD, LLP

(57) ABSTRACT

An operating device of a human-powered vehicle comprises a base structure, a first operating member, a second operating member, a first electric switch, and a second electric switch. The base structure is mountable to the human-powered vehicle. The first operating member is pivotally coupled to the base structure about a first pivot axis. The second operating member is pivotally coupled to the base structure about a second pivot axis. The first operating member and the second operating member are arranged in a first direction. The first electric switch is at least partially provided between the first operating member and the base structure. The second electric switch is at least partially provided between the second operating member and the base structure. At least one of the first pivot axis and the second pivot axis extends along the first direction.

31 Claims, 36 Drawing Sheets

OPERATING DEVICE OF HUMAN-POWERED VEHICLE

CROSS-REFERENCE TO RELATED APPLICATIONS

The present application is a continuation-in-part application of U.S. patent application Ser. No. 18/360,835 filed Jul. 28, 2023. The contents of U.S. patent application Ser. No. 18/360,835 are incorporated herein by reference in their entirety.

BACKGROUND

Technical Field

The present invention relates to an operating device of a human-powered vehicle.

Background Information

A human-powered vehicle includes an operating unit configured to operate at least one operated unit. The operating unit includes at least two operating members. One of objects of the present disclosure is to efficiently arrange the at least two operating members while improving the operability of the operating unit. Furthermore, the operating unit includes a light emitter unit. Another of the objects of the present disclosure is to enable the user to visibly recognize the light emitter unit comparatively easily.

SUMMARY

In accordance with a first aspect of the present invention, an operating device of a human-powered vehicle comprises a base structure, a first operating member, a second operating member, a first electric switch, and a second electric switch. The base structure is mountable to the human-powered vehicle. The first operating member is pivotally coupled to the base structure about a first pivot axis. The second operating member is pivotally coupled to the base structure about a second pivot axis. The first operating member and the second operating member are arranged in a first direction. The first electric switch is at least partially provided between the first operating member and the base structure. The second electric switch is at least partially provided between the second operating member and the base structure. At least one of the first pivot axis and the second pivot axis extends along the first direction.

With the operating device according to the first aspect, it is possible to efficiently arrange the first operating member and the second operating member while improving the operability of the operating device.

In accordance with a second aspect of the present invention, the operating device according to the first aspect is configured so that at least one of the first pivot axis and the second pivot axis is parallel to the first direction.

With the operating device according to the first aspect, it is possible to more efficiently arrange the first operating member and the second operating member while improving the operability of the operating device.

In accordance with a third aspect of the present invention, the operating device according to the first or second aspect is configured so that the first pivot axis is coincident with the second pivot axis.

With the operating device according to the third aspect, it is possible to more efficiently arrange the first operating member and the second operating member while improving the operability of the operating device.

In accordance with a fourth aspect of the present invention, the operating device according to any one of the first to third aspects is configured so that the second operating member is spaced apart from the first operating member in the first direction.

With the operating device according to the fourth aspect, it is possible to reduce or prevent contact between the first operating member and the second operating member. Thus, it is possible to efficiently arrange the first operating member and the second operating member while improving the operability of the operating device reliably.

In accordance with a fifth aspect of the present invention, the operating device according to any one of the first to fourth aspects further comprises a third operating member. The third operating member is at least partially provided between the first operating member and the second operating member in the first direction. The third operating member is movable relative to the base structure in a second direction intersecting the first direction. The third electric switch is at least partially provided between the third operating member and the base structure. The third electric switch is configured to be activated in response to a movement of the third operating member.

With the operating device according to the fifth aspect, it is possible to reliably improve the operability of the operating device.

In accordance with a sixth aspect of the present invention, the operating device according to the fifth aspect is configured so that the base structure includes a clamp. The clamp includes a clamp opening through which the handlebar is to extend. The clamp opening has a center axis. The third operating member includes a third inclined surface. The third inclined surface is non-parallel to and non-perpendicular to the center axis of the clamp opening.

With the operating device according to the sixth aspect, the third inclined surface can reliably improve the operability of the operating device or make the operating device compact.

In accordance with a seventh aspect of the present invention, the operating device according to any one of the first to sixth aspects is configured so that one of the first operating member and the second operating member is arranged to avoid overlapping the other of the first operating member and the second operating member as viewed in a third direction perpendicular to one of the first pivot axis and the second pivot axis.

With the operating device according to the seventh aspect, it is possible to more efficiently arrange the first operating member and the second operating member while improving the operability of the operating device.

In accordance with an eighth aspect of the present invention, the operating device according to any one of the first to seventh aspects is configured so that the base structure includes a clamp. The clamp is configured to couple the base structure and a handlebar of the human-powered vehicle.

With the operating device according to the eighth aspect, it is possible to mount the operating device to the handlebar via the clamp.

In accordance with a ninth aspect of the present invention, the operating device according to any one of the first to eighth aspects is configured so that the clamp includes a clamp opening through which the handlebar is to extend. The clamp opening has a center axis. The base structure has a base width defined along the center axis of the clamp opening as a maximum width of the base structure. That clamp opening has a clamp width defined along the center axis of the clamp opening as a minimum width of the clamp opening. A ratio of the clamp width to the base width is less than or equal to 45%.

With the operating device according to the ninth aspect, it is possible to reduce or prevent interference between the clamp and another device mounted to the handlebar.

In accordance with a tenth aspect of the present invention, the operating device according to the ninth aspect is configured so that the first operating member has a first width defined along the center axis of the clamp opening. The second operating member has a second width defined along the center axis of the clamp opening. At least one of a first ratio of the clamp width to the first width and a second ratio of the clamp width to the second width is less than or equal to 45%.

With the operating device according to the tenth aspect, it is possible to reliably reduce or prevent interference between the clamp and another device mounted to the handlebar.

In accordance with an eleventh aspect of the present invention, the operating device according to the ninth or tenth aspect is configured so that at least one of the first pivot axis and the second pivot axis is provided outside a region defined by the clamp width along the center axis of the clamp opening as viewed along the at least one of the first pivot axis and the second pivot axis.

With the operating device according to the eleventh aspect, it is possible to improve the flexibility of arrangement of the at least one of the first pivot axis and the second pivot axis.

In accordance with a twelfth aspect of the present invention, the operating device according to any one of the first to eleventh aspects is configured so that the first operating member includes a first end and a first additional end. The first additional end is provided closer to the first pivot axis than the first end.

With the operating device according to the twelfth aspect, it is possible to improve the operability of the first operating member.

In accordance with a thirteenth aspect of the present invention, the operating device according to the twelfth aspect is configured so that the first end is configured to be provided closer to a handlebar grip of a handlebar of the human-powered vehicle than the first additional end in a mounting state where the base structure is mounted to the handlebar.

With the operating device according to the thirteenth aspect, it is possible to reliably improve the operability of the first operating member.

In accordance with a fourteenth aspect of the present invention, the operating device according to the thirteenth aspect is configured so that the base structure includes a clamp. The clamp is configured to couple the base structure and the handlebar of the human-powered vehicle. The clamp includes a clamp opening through which the handlebar is to extend, the clamp opening having a center axis. The first operating member includes a first inclined surface. The first inclined surface is non-parallel to and non-perpendicular to the center axis of the clamp opening.

With the operating device according to the fourteenth aspect, it is possible to improve the operability of the first operating member.

In accordance with a fifteenth aspect of the present invention, the operating device according to the fourteenth aspect is configured so that the first inclined surface includes a first surface end and a first additional surface end and extends between the first surface end and the first additional surface end. The first surface end is configured to be provided closer to the handlebar grip of the handlebar than the first additional surface end in the mounting state where the base structure is mounted to the handlebar. A first distance is radially defined between the first inclined surface and the center axis of the clamp opening as viewed in the first direction. The first inclined surface is inclined to decrease the first distance from the first additional surface end toward the first surface end.

With the operating device according to the fifteenth aspect, it is possible to reliably improve the operability of the first operating member.

In accordance with a sixteenth aspect of the present invention, the operating device according to any one of the first to fifteenth aspects further comprises a first pivot pin and a second pivot pin. The first pivot pin extends along the first pivot axis. The second pivot pin extends along the second pivot axis. The first pivot pin pivotally couples the first operating member and the base structure about the first pivot axis. The second pivot pin pivotally couples the second operating member and the base structure.

With the operating device according to the sixteenth aspect, the first pivot pin and the second pivot pin can simplify the structure of the operating device.

In accordance with a seventeenth aspect of the present invention, the operating device according to the sixteenth aspect is configured so that the second pivot pin is a separate member from the first pivot pin.

With the operating device according to the seventeenth aspect, it is possible to save the weight of the operating device.

In accordance with an eighteenth aspect of the present invention, the operating device according to the sixteenth or seventeenth aspect further comprises a third operating member. The third operating member is at least partially provided between the first operating member and the second operating member in the first direction. The third operating member is movable relative to the base structure between a third rest position and a third operated position. At least one of the first pivot pin and the second pivot pin is contactable with the third operating member to position the third operating member in the third rest position.

With the operating device according to the eighteenth aspect, it is possible to position the third operating member in the third rest position with a comparatively simple structure.

In accordance with a nineteenth aspect of the present invention, the operating device according to any one of the first to eighteenth aspects is configured so that a reference plane is defined perpendicularly to the first direction and is provided between a first region and a second region to separate the first region and the second region. The first operating member is provided in the first region. The second operating member is provided in the second region.

With the operating device according to the nineteenth aspect, it is possible to more efficiently arrange the first operating member and the second operating member while improving the operability of the operating device.

In accordance with a twentieth aspect of the present invention, the operating device according to the nineteenth aspect is configured so that the second operating member has a shape symmetrical with a shape of the first operating member with respect to the reference plane as viewed along the reference plane.

With the operating device according to the twentieth aspect, it is possible to more efficiently arrange the first operating member and the second operating member while improving the operability of the operating device.

In accordance with a twenty-first aspect of the present invention, the operating device according to any one of the first to twentieth aspects further comprising a light emitter unit at least partially provided between the first operating member and the second operating member in the first direction as viewed in a second direction intersecting the first direction.

With the operating device according to the twenty-first aspect, the positional relationship between the first operating member, the second operating member, and the light emitter unit can restrict the user's finger or thumb from overlapping the light emitter unit. This enables the user to visibly recognize the light emitter unit comparatively easily.

In accordance with a twenty-second aspect of the present invention, an operating device of a human-powered vehicle comprises a base structure, a first operating member, a second operating member, and a light emitter unit. The base structure is mountable to the human-powered vehicle. The first operating member is movably coupled to the base structure and is configured to receive a first user input operation. The second operating member is movably coupled to the base structure and is configured to receive a second user input operation. The first operating member and the second operating member are arranged in a first direction. The light emitter unit is at least partially provided between the first operating member and the second operating member in the first direction as viewed in a second direction intersecting the first direction.

With the operating device according to the twenty-second aspect, the positional relationship between the first operating member, the second operating member, and the light emitter unit can restrict the user's finger or thumb from overlapping the light emitter unit. This enables the user to visibly recognize the light emitter unit comparatively easily.

In accordance with a twenty-third aspect of the present invention, the operating device according to the twenty-first or twenty-second aspect is configured so that the light emitter unit at least partially protrudes from at least one of the first operating member and the second operating member as viewed in the first direction.

With the operating device according to the twenty-third aspect, the positional relationship between the first operating member, the second operating member, and the light emitter unit enables the user to haptically recognize the light emitter unit while enabling the user to visibly recognize the light emitter unit more easily.

In accordance with a twenty-fourth aspect of the present invention, the operating device according to any one of the twenty-first to twenty-third aspects further comprises a third operating member movably coupled to the base structure and configured to receive a third user input operation. The light emitter unit and the third operating member are arranged in a third direction intersecting each of the first direction and the second direction.

With the operating device according to the twenty-fourth aspect, the third operating member can improve the usability of the operating device.

In accordance with a twenty-fifth aspect of the present invention, the operating device according to any one of the twenty-first to twenty-fourth aspects is configured so that the light emitter unit includes a light emitter and a light transmitting member. The light emitter is configured to emit light. The light transmitting member is configured to transmit light emitted from the light emitter.

With the operating device according to the twenty-fifth aspect, the light transmitting member enables the user to visibly recognize light emitted from the light emitter more easily.

In accordance with a twenty-sixth aspect of the present invention, the operating device according to the twenty-fifth aspect is configured so that at least one of the light emitter and the light transmitting member is at least partially provided between the first operating member and the second operating member in the first direction as viewed in the second direction.

With the operating device according to the twenty-sixth aspect, the positional relationship between the first operating member, the second operating member, the light emitter, and the light transmitting member can restrict the user's finger or thumb from overlapping the light emitter unit. This enables the user to visibly recognize the light emitter unit more easily.

In accordance with a twenty-seventh aspect of the present invention, the operating device according to the twenty-fifth or twenty-sixth aspect is configured so that the light transmitting member is integrally provided with at least part of the base structure as a one-piece unitary member.

With the operating device according to the twenty-seventh aspect, it is possible to manufacture the light transmitting member and the base structure at a comparatively reasonable cost.

In accordance with a twenty-eighth aspect of the present invention, the operating device according to any one of the twenty-fifth to twenty-seventh aspects is configured so that the light emitter unit includes an additional member coupled to the light transmitting member. The light transmitting member has first light transmittance. The additional member has second light transmittance. The first light transmittance is higher than the second light transmittance.

With the operating device according to the twenty-eighth aspect, the additional member can adjust a region in which light is emitted from the light transmitting member. This enables the user to visibly recognize the light emitter unit more clearly.

In accordance with a twenty-ninth aspect of the present invention, the operating device according to the twenty-eighth aspect is configured so that the additional member includes an opening. The light transmitting member is at least partially provided in the opening.

With the operating device according to the twenty-ninth aspect, the opening of the additional member can limit the region in which light is emitted from the light transmitting member. This enables the user to visibly recognize the light emitter unit more clearly.

In accordance with a thirtieth aspect of the present invention, the operating device according to at least one of the twenty-fifth to twenty-ninth aspects further comprises a first electric switch and a second electric switch. The first electric switch is configured to be activated in response to a movement of the first operating member. The second electric switch is configured to be activated in response to a movement of the second operating member. The light emitter is at least partially provided between the first electric switch and the second electric switch in the first direction as viewed in the second direction.

With the operating device according to the thirtieth aspect, the positional relationship between the first electric switch, the second electric switch, and the light emitter makes it easier to realize the positional relationship between the first operating member, the second operating member, and the light emitter unit.

In accordance with a thirty-first aspect of the present invention, the operating device according to any one of the twenty-fifth to thirtieth aspects further comprises a substrate and a terminal. The substrate has a first surface and a second surface provided on a reverse side of the first surface. The light emitter is provided on the first surface. The terminal is configured to be in contact with an electric power source. The terminal is provided on at least one of the first surface and the second surface.

With the operating device according to the thirty-first aspect, it is possible to utilize the first surface and the second surface as a place where the light emitter and the terminal.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings.

DESCRIPTION OF THE EMBODIMENTS

Figure 1:
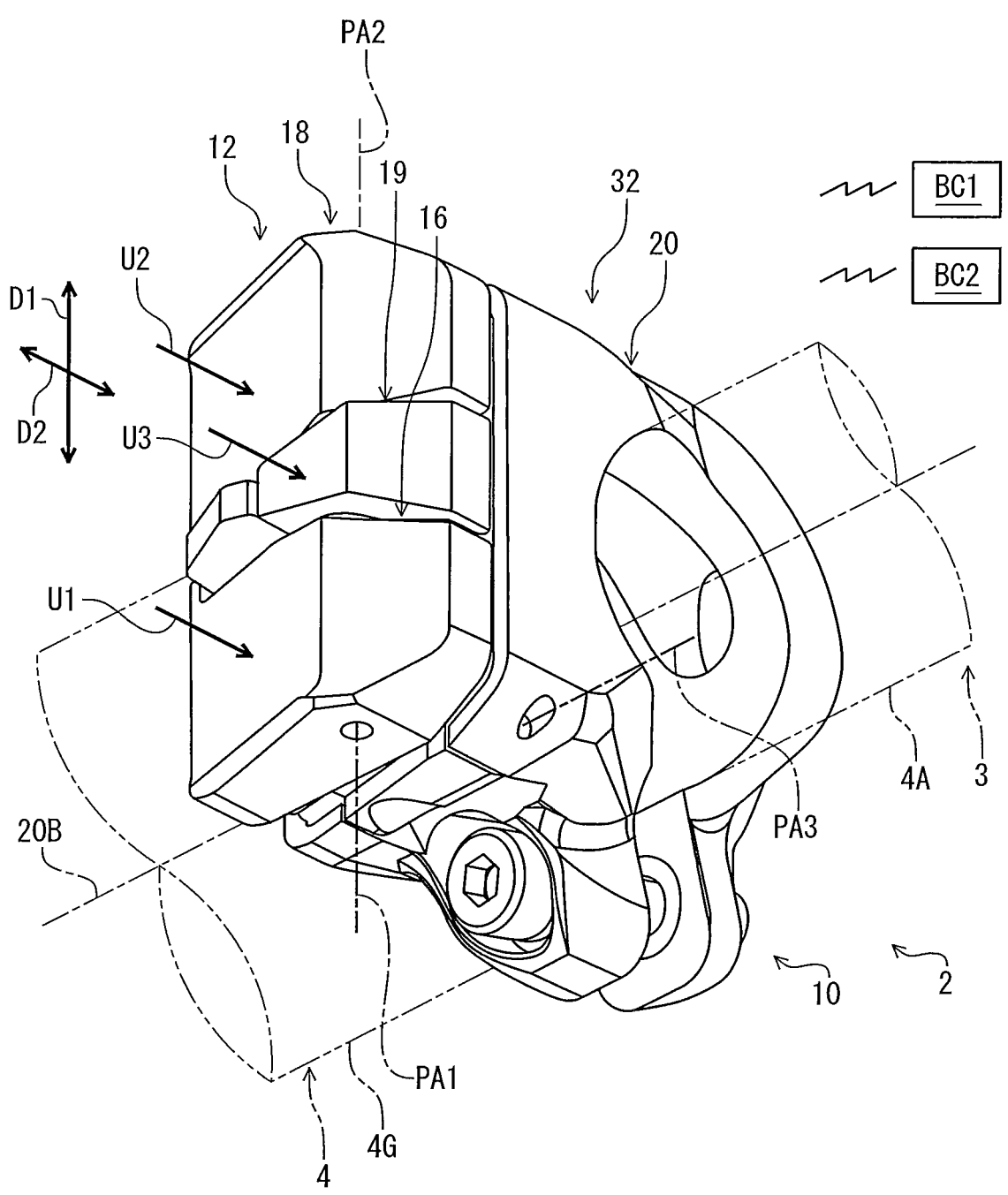
FIG. 1 is a perspective view of an operating device of a human-powered vehicle in accordance with one of embodiments.

The embodiments will now be described with reference to the accompanying drawings, wherein like reference numerals designate corresponding or identical elements throughout the various drawings.

As seen in FIG. 1, an operating device 10 of a human-powered vehicle 2 is configured to operate at least one device. The operating device 10 is configured to be mounted to a vehicle body 3 of the human-powered vehicle 2. The operating device 10 is configured to be mounted to a handlebar 4 of the vehicle body 3 of the human-powered vehicle 2. The operating device 10 is free of a brake lever.

In the present application, the term "human-powered vehicle" includes a vehicle to travel with a motive power including at least a human power of a user who rides the vehicle. The human-powered vehicle includes a various kind of bicycles such as a mountain bike, a road bike, a city bike, a cargo bike, a hand bike, and a recumbent bike. Furthermore, the human-powered vehicle includes an electric bike called as an E-bike. The electric bike includes an electrically assisted bicycle configured to assist propulsion of a vehicle with an electric motor. However, a total number of wheels of the human-powered vehicle is not limited to two. For example, the human-powered vehicle includes a vehicle having one wheel or three or more wheels. Especially, the human-powered vehicle does not include a vehicle that uses only a driving source as motive power. Examples of the driving source include an internal-combustion engine and an electric motor. Generally, a light road vehicle, which includes a vehicle that does not require a driver's license for a public road, is assumed as the human-powered vehicle.

In the present application, the following directional terms "front," "rear," "forward," "rearward," "left," "right," "transverse," "upward" and "downward" as well as any other similar directional terms refer to those directions which are determined on the basis of the user who is in the user's standard position in the human-powered vehicle 2 with facing a handlebar or steering. Examples of the user's standard position include a saddle and a seat. Accordingly, these terms, as utilized to describe the operating device 10 or other devices, should be interpreted relative to the human-powered vehicle 2 equipped with the operating device 10 or other devices as used in an upright riding position on a horizontal surface.

The operating device 10 is configured to be electrically connected to an electric device BC1. In the present embodiment, the operating device 10 is configured to be connected to the electric device BC1 via a wireless communication channel. The operating device 10 is configured to be wirelessly connected to the electric device BC1. However, the operating device 10 can be configured to be connected to the electric device BC1 or other devices via an electric cable if needed or desired.

The operating device 10 is configured to be electrically connected to an electric device BC2. In the present embodiment, the operating device 10 is configured to be connected to the electric device BC2 via a wireless communication channel. The operating device 10 is configured to be wirelessly connected to the electric device BC2. However, the operating device 10 can be configured to be connected to the electric device BC2 or other devices via an electric cable if needed or desired.

Examples of the electric devices BC1 and BC2 include an additional or satellite operating device, an adjustable seatpost, a suspension, a gear changer, a brake device, a lighting device, an assist drive unit, a cycle computer, a smartphone, a tablet computer, and a personal computer. In the present embodiment, the electric device BC1 includes a gear changer such as a derailleur. The electric device BC2 includes a gear changer such as a derailleur. However, the electric devices BC1 and BC2 are not limited to the above devices.

In the present embodiment, the operating device 10 is a left-hand side operating device configured to be operated by the rider's left hand to actuate the electric devices BC1 and BC2 or other devices. However, the structures of the operating device 10 can be applied to a right-hand side operating device.

Figure 2:
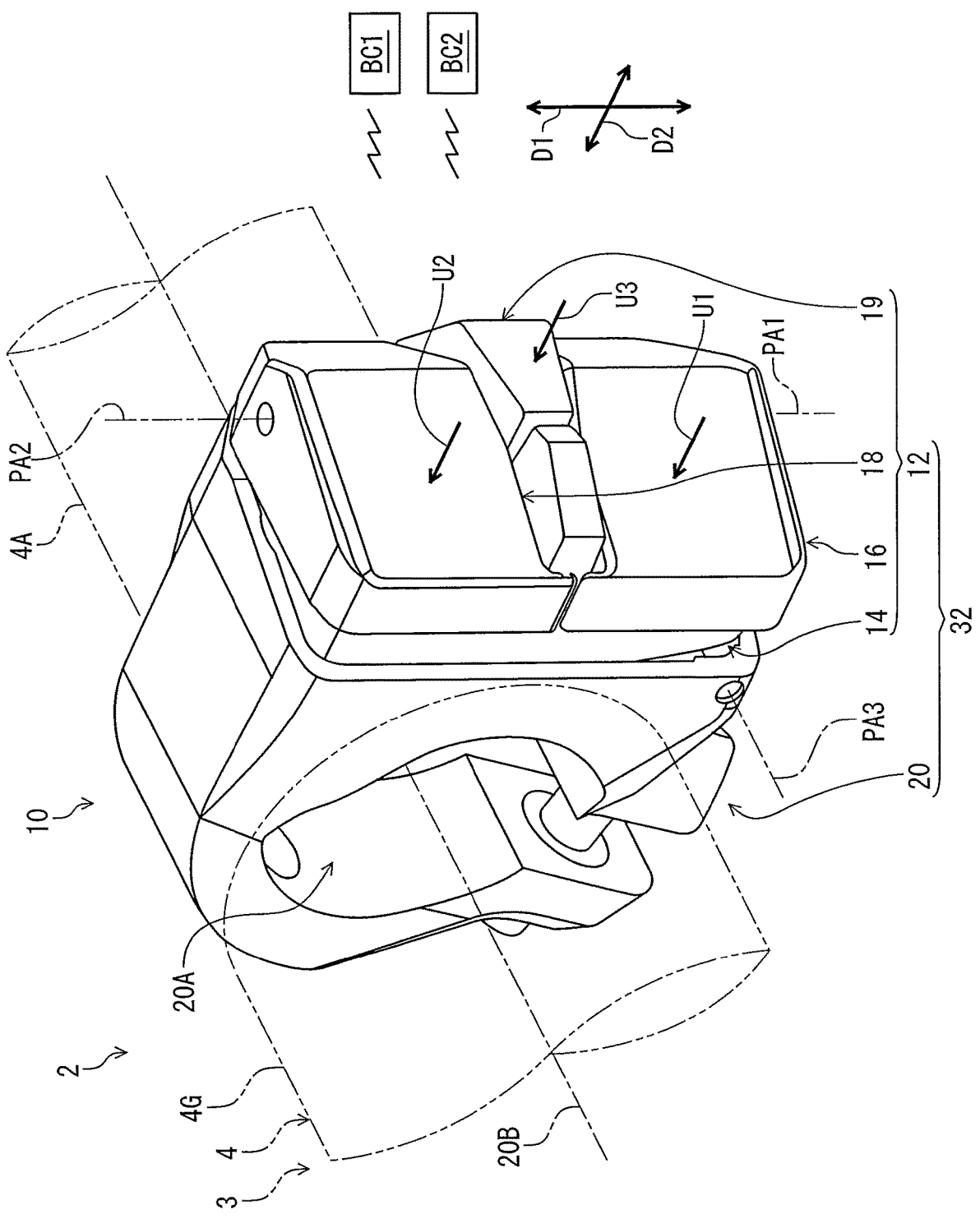
FIG. 2 is another perspective view of the operating device illustrated in FIG. 1.

As seen in FIG. 2, the operating device 10 of the human-powered vehicle 2 comprises an operating structure 12. The operating structure 12 is configured to receive a user input operation U1. The operating structure 12 is configured to receive a user input operation U2. The operating structure 12 is configured to receive a user input operation U3.

The user input operation U1 can also be referred to as a first user input operation U1. The user input operation U2 can also be referred to as a second user input operation U2. The user input operation can also be referred to as a third user input operation U3. Namely, the operating structure 12 is configured to receive the first user input operation U1. The operating structure 12 is configured to receive the second user input operation U2. The operating structure 12 is configured to receive the third user input operation U3. One of the user input operations U1, U2, and U3 can be omitted from the operating structure 12 if needed or desired.

The operating structure 12 includes a base body 14. The operating structure 12 includes an operating member 16. The operating structure 12 includes an operating member 18. The operating structure 12 includes an operating member 19. The operating member 16 is movably coupled to the base body 14. The operating member 18 is movably coupled to the base body 14. The operating member 19 is movably coupled to the base body 14. The operating member 16 is configured to receive the user input operation U1. The operating member 18 is configured to receive the user input operation U2. The operating member 19 is configured to receive the user input operation U3.

The operating member 16 can also be referred to as a first operating member 16. The operating member 18 can also be referred to as a second operating member 18. The operating member 19 can also be referred to as a third operating member 19. Namely, the operating structure 12 includes the first operating member 16, the second operating member 18, and the third operating member 19. The operating device 10 of the human-powered vehicle 2 comprises the first operating member 16 and the second operating member 18. The operating device 10 further comprises the third operating member 19. The first operating member 16 is configured to receive the first user input operation U1. The second operating member 18 is configured to receive the second user input operation U2. The third operating member 19 is configured to receive the third user input operation U3.

The operating member 16 is pivotally coupled to the base body 14 about a pivot axis PA1. The operating member 16 is pivotable relative to the base body 14 about the pivot axis PA1 in response to the user input operation U1. The pivot axis PA1 can also be referred to as a first pivot axis PA1. The first operating member 16 is pivotally coupled to the base body 14 about the first pivot axis PA1. The first operating member 16 is pivotable relative to the base body 14 about the first pivot axis PA1 in response to the first user input operation U1.

The operating member 16 is pivotally coupled to the base body 14 about a pivot axis PA2. The operating member 16 is pivotable relative to the base body 14 about the pivot axis PA2 in response to the user input operation U2. The pivot axis PA2 can also be referred to as a second pivot axis PA2. The second operating member 18 is pivotally coupled to the base body 14 about a second pivot axis PA2. The second operating member 18 is pivotable relative to the base body 14 about the second pivot axis PA2 in response to the second user input operation U2.

The third operating member 19 is movable relative to the base structure 32 in response to the user input operation U3. The third operating member 19 is movable relative to the base body 14 in response to the user input operation U3.

In the present embodiment, the operating structure 12 includes the operating members 16, 18, and 19. However, one or two of the operating members 16, 18, and 19 can be omitted from the operating structure 12 if needed or desired.

As seen in FIG. 2, the operating device 10 of the human-powered vehicle 2 comprises a clamp 20. The clamp 20 is mountable to the human-powered vehicle 2. The clamp 20 is mountable to the vehicle body 3 of the human-powered vehicle 2. The clamp 20 is mountable to the handlebar 4 of the vehicle body 3. The clamp 20 includes a clamp opening 20A through which the handlebar 4 is to extend. The clamp opening 20A has a center axis 20B. The clamp 20 is at least partially made of a non-metallic material such as elastomer or resin. However, the clamp 20 can be at least partially made of a metallic material if needed or desired.

The clamp 20 is configured to couple the operating structure 12 and the vehicle body 3. The clamp 20 is configured to couple the operating structure 12 and the handlebar 4. The clamp 20 is configured to couple the base body 14 and the vehicle body 3. The clamp 20 is configured to couple the base body 14 and the handlebar 4.

Figure 3:
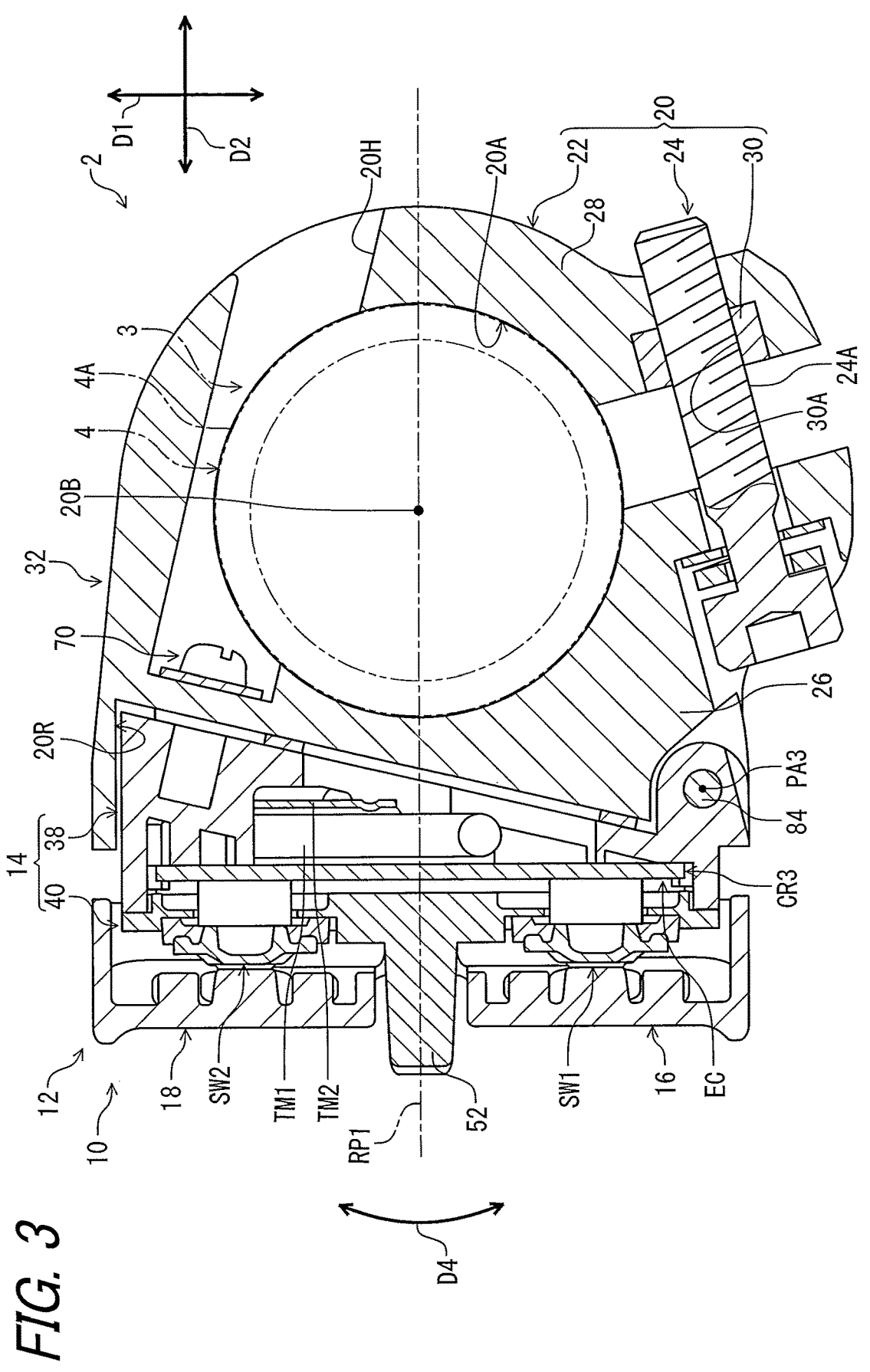
FIG. 3 is a cross-sectional view of the operating device taken along line III-III of FIG. 5.

As seen in FIG. 3, the clamp 20 includes a clamp body 22 and a clamp fastener 24. The clamp body 22 includes a first clamp portion 26 and a second clamp portion 28. The first clamp portion 26 and the second clamp portion 28 define the clamp opening 20A. The clamp fastener 24 is configured to couple the first clamp portion 26 and the second clamp portion 28. At least one of the first clamp portion 26 and the second clamp portion 28 is deformable to change an inner diameter of the clamp opening 20A. The clamp fastener 24 is configured to couple the first clamp portion 26 and the second clamp portion 28 to change the inner diameter of the clamp opening 20A. The clamp fastener 24 includes an externally threaded portion 24A. The clamp 20 includes a nut 30. The nut 30 is coupled to the second clamp portion 28. The nut 30 includes a threaded hole 30A. The externally threaded portion 24A is engaged with the threaded hole 30A. In the present embodiment, the second clamp portion 28 is integrally provided with the first clamp portion 26 as a one-piece unitary member. The clamp body 22 is made of a non-metallic material such as elastomer or resin. The first clamp portion 26 and the second clamp portion 28 are made of a non-metallic material such as elastomer or resin. However, the second clamp portion 28 can be a separate portion from the first clamp portion 26 if needed or desired. The clamp body 22 can be at least partially made of a metallic material if needed or desired. At least one of the first clamp portion 26 and the second clamp portion 28 can be at least partially made of a metallic material if needed or desired.

As seen in FIG. 2, the operating device 10 of the human-powered vehicle 2 comprises a base structure 32. The base structure 32 is mountable to the human-powered vehicle 2. The base structure 32 is mountable to the vehicle body 3 of the human-powered vehicle 2. The base structure 32 is mountable to the handlebar 4 of the human-powered vehicle 2. The base structure 32 includes the base body 14. The base structure 32 includes the clamp 20. The clamp 20 is configured to couple the base structure 32 and the vehicle body 3 of the human-powered vehicle 2. The clamp 20 is configured to couple the base structure 32 and the handlebar 4 of the human-powered vehicle 2.

The first operating member 16 is pivotally coupled to the base structure 32 about the first pivot axis PA1. The second operating member 18 is pivotally coupled to the base structure 32 about the second pivot axis PA2. The third operating member 19 is movable relative to the base structure 32.

Figure 4:
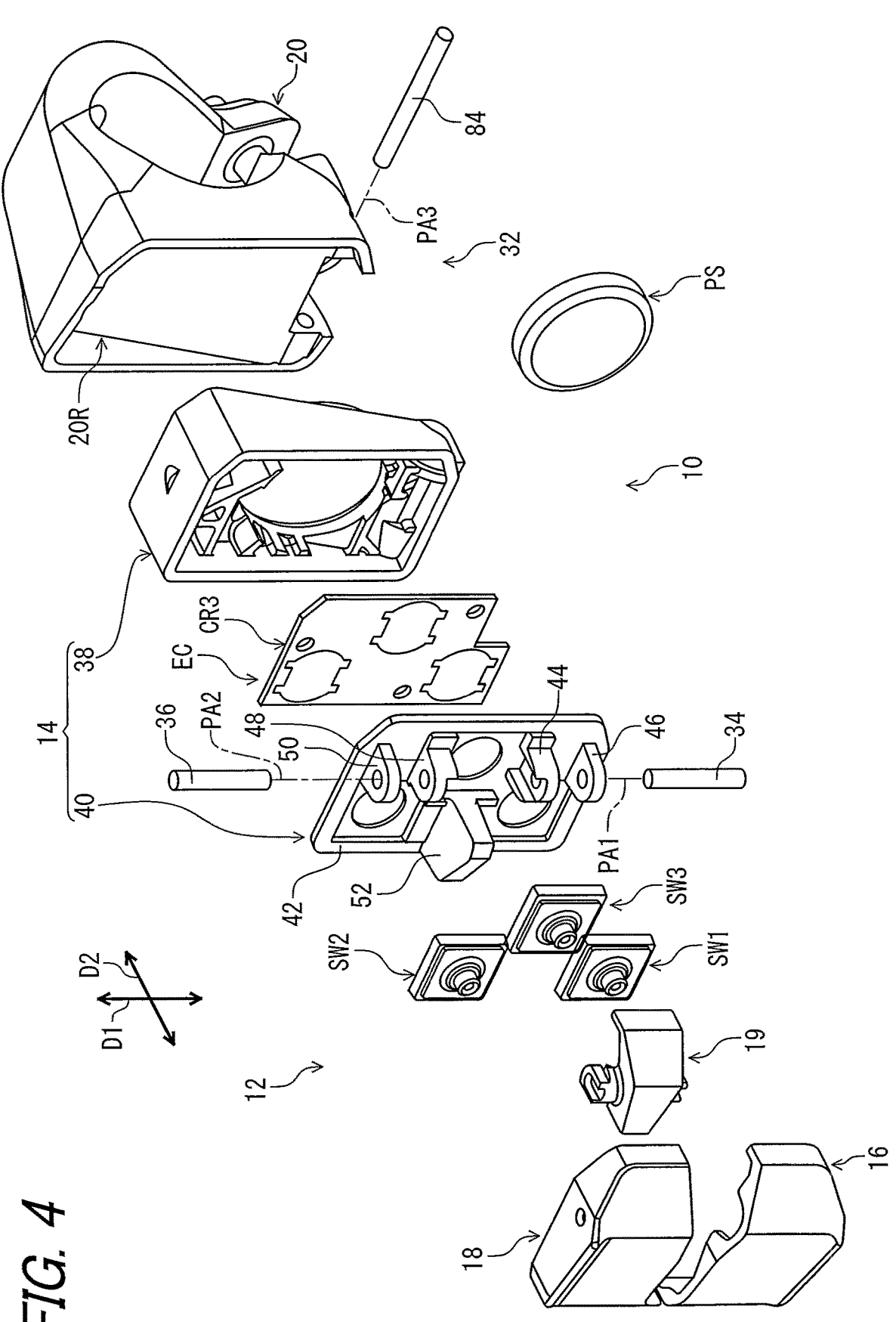
FIG. 4 is an exploded perspective view of the operating device illustrated in FIG. 1.

As seen in FIG. 4, the operating device 10 further comprises a first pivot pin 34. The first pivot pin 34 extends along the first pivot axis PA1. The operating device 10 further comprises a second pivot pin 36. The second pivot pin 36 extends along the second pivot axis PA2. The first pivot pin 34 pivotally couples the first operating member 16 and the base structure 32 about the first pivot axis PA1. The second pivot pin 36 pivotally couples the second operating member 18 and the base structure 32.

In the present embodiment, the second pivot pin 36 is a separate member from the first pivot pin 34. However, the second pivot pin 36 can be integrally provided with the first pivot pin 34 as a one-piece unitary member if needed or desired. The first pivot pin 34 can also be referred to as a pivot pin 34. The second pivot pin 36 can also be referred to as a pivot pin 36.

The base body 14 includes a first base body 38 and a second base body 40. The second base body 40 is attached to the first base body 38. The first operating member 16 is pivotally coupled to the second base body 40 about the first pivot axis PA1. The second operating member 18 is pivotally coupled to the second base body 40 about the second pivot axis PA2. The first operating member 16 is pivotally coupled to the second base body 40 with the first pivot pin 34. The second operating member 18 is pivotally coupled to the second base body 40 with the second pivot pin 36.

In the present embodiment, the second base body 40 is a separate member from the first base body 38. However, the second base body 40 can be integrally provided with the first base body 38 as a one-piece unitary member if needed or desired.

The second base body 40 includes a base plate 42, first supports 44 and 46, second supports 48 and 50, and an intermediate portion 52. The first support 44 protrudes from the base plate 42. The first support 46 protrudes from the base plate 42. The second support 48 protrudes from the base plate 42. The second support 50 protrudes from the base plate 42. The first pivot pin 34 is coupled to the first supports 44 and 46. The second pivot pin 36 is coupled to the second supports 48 and 50. The intermediate portion 52 protrudes from the base plate 42.

Figure 5:
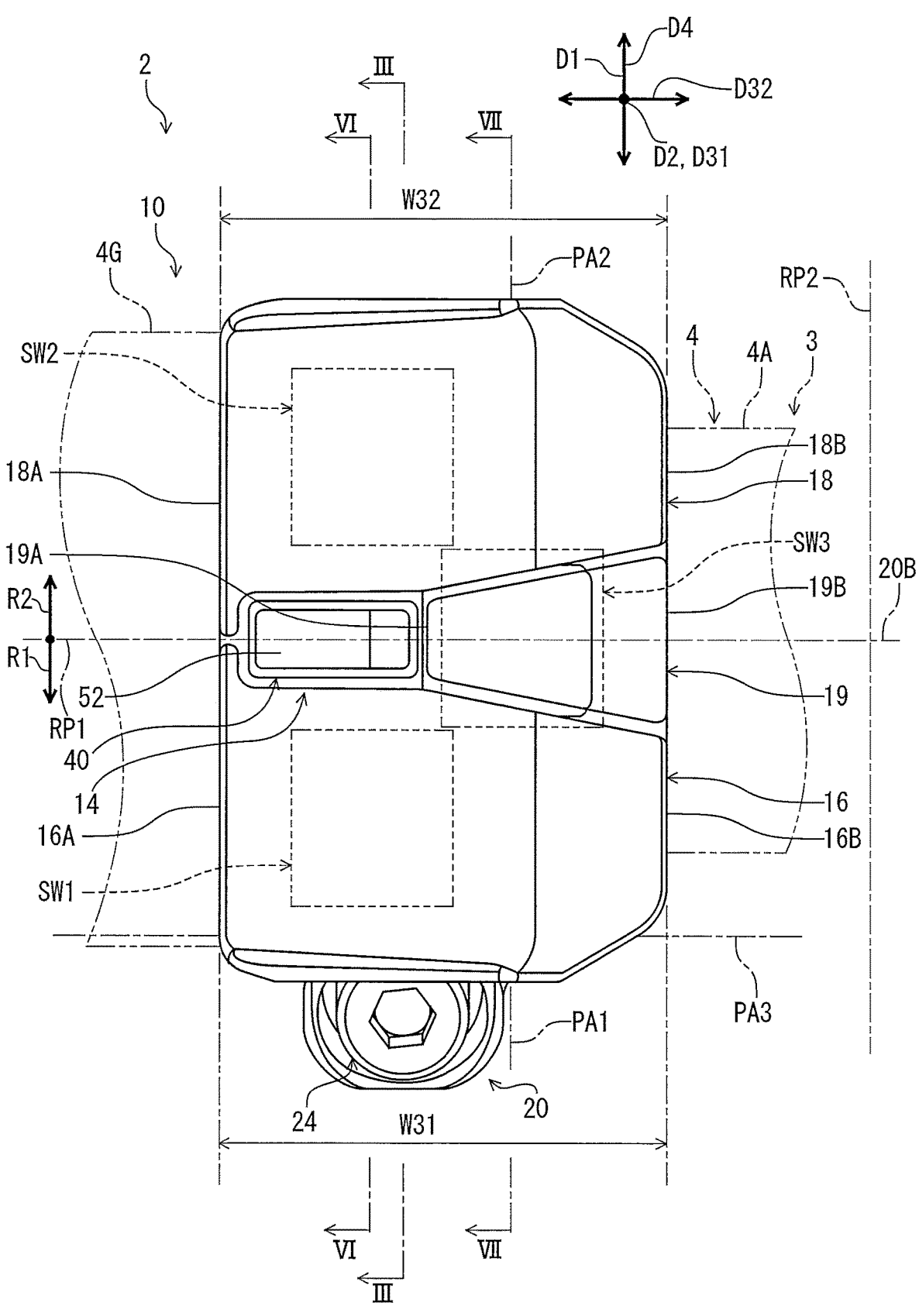
FIG. 5 is a side elevational view of the operating device illustrated in FIG. 1.

As seen in FIG. 5, the first operating member 16 and the second operating member 18 are arranged in a first direction D1. The second operating member 18 is spaced apart from the first operating member 16 in the first direction D1. The third operating member 19 is at least partially provided between the first operating member 16 and the second operating member 18 in the first direction D1.

In the present embodiment, the third operating member 19 is entirely provided between the first operating member 16 and the second operating member 18 in the first direction D1. However, the third operating member 19 can be partially provided between the first operating member 16 and the second operating member 18 in the first direction D1 if needed or desired. The first operating member 16 can also be referred to as an operating member 16. The second operating member 18 can also be referred to as an operating member 18.

At least one of the first pivot axis PA1 and the second pivot axis PA2 extends along the first direction D1. At least one of the first pivot axis PA1 and the second pivot axis PA2 is parallel to the first direction D1. The first pivot axis PA1 is coincident with the second pivot axis PA2. However, at least one of the first pivot axis PA1 and the second pivot axis PA2 can be non-parallel to the first direction D1 if needed or desired. The first pivot axis PA1 can be offset from the second pivot axis PA2 if needed or desired.

A reference plane RP1 is defined perpendicularly to the first direction D1 and is provided between a first region R1 and a second region R2 to separate the first region R1 and the second region R2. The first operating member 16 is provided in the first region R1. The second operating member 18 is provided in the second region R2. In the present embodiment, the second operating member 18 has a shape symmetrical with a shape of the first operating member 16 with respect to the reference plane RP1 as viewed along the reference plane RP1. However, the second operating member 18 has a shape asymmetrical with a shape of the first operating member 16 with respect to the reference plane RP1 as viewed along the reference plane RP1 if needed or desired.

As seen in FIG. 3, the reference plane RP1 is defined to include the center axis 20B of the clamp opening 20A. However, the reference plane RP1 can be offset from the center axis 20B of the clamp opening 20A if needed or desired.

As seen in FIG. 5, an additional reference plane RP2 is defined perpendicularly to the center axis 20B of the clamp opening 20A. The first direction D1 is parallel to the additional reference plane RP2. The additional reference plane RP2 is perpendicular to the reference plane RP1.

As seen in FIG. 2, the third operating member 19 is movable relative to the base structure 32 in a second direction D2 intersecting the first direction D1. The third operating member 19 is movable relative to the base body 14 in the second direction D2.

In the present embodiment, the second direction D2 is perpendicular to the first direction D1. However, the second direction D2 can be non-perpendicular to the first direction D1 if needed or desired.

As seen in FIG. 5, the first operating member 16 includes a first end 16A and a first additional end 16B. In the present embodiment, the first additional end 16B is provided closer to the first pivot axis PA1 than the first end 16A. The first end 16A is configured to be provided closer to a handlebar grip 4G of the handlebar 4 of the human-powered vehicle 2 than the first additional end 16B in a mounting state where the base structure 32 is mounted to the handlebar 4. However, the first end 16A can be provided closer to the first pivot axis PA1 than the first additional end 16B if needed or desired. The first end 16A can be configured to be provided closer to the handlebar grip 4G of the handlebar 4 than the first additional end 16B in the mounting state if needed or desired.

The handlebar 4 includes a handlebar body 4A extending along the center axis 20B of the clamp opening 20A in a state where the mounting state. The handlebar body 4A has a tubular shape. The handlebar grip 4G is attached to an end of the handlebar body 4A. The handlebar grip 4G has an outer diameter larger than an outer diameter of the handlebar body 4A. The handlebar grip 4G is made of a non-metallic material such as elastomer or resin.

The second operating member 18 includes a second end 18A and a second additional end 18B. In the present embodiment, the second additional end 18B is provided closer to the second pivot axis PA2 than the second end 18A. The second end 18A is configured to be provided closer to the handlebar grip 4G of the handlebar 4 of the human-powered vehicle 2 than the second additional end 18B in the mounting state where the base structure 32 is mounted to the handlebar 4. However, the second end 18A can be provided closer to the second pivot axis PA2 than the second additional end 18B if needed or desired. The second end 18A can be configured to be provided closer to the handlebar grip 4G of the handlebar 4 than the second additional end 18B in the mounting state if needed or desired.

The third operating member 19 includes a third end 19A and a third additional end 19B. In the present embodiment, the third additional end 19B is provided closer to the first pivot axis PA1 than the third end 19A. The third additional end 19B is provided closer to the second pivot axis PA2 than the third end 19A. The third end 19A is configured to be provided closer to the handlebar grip 4G of the handlebar of the human-powered vehicle 2 than the third additional end 19B in the mounting state where the base structure 32 is mounted to the handlebar. However, the third end 19A can be provided closer to at least one of the first pivot axes A1 and A2 than the third additional end 19B if needed or desired. The third end 19A can be configured to be provided closer to the handlebar grip 4G of the handlebar than the third additional end 19B in the mounting state if needed or desired.

As seen in FIG. 4, the operating structure 12 includes an electric switch SW1. The operating structure 12 includes an electric switch SW2. The operating structure 12 includes an electric switch SW3. The electric switch SW1 can also be referred to as a first electric switch SW1. The electric switch SW2 can also be referred to as a second electric switch SW2. The electric switch SW3 can also be referred to as a third electric switch SW3. Namely, the operating device 10 of the human-powered vehicle 2 comprises the first electric switch SW1 and the second electric switch SW2. The operating device 10 further comprises the third electric switch SW3.

The first electric switch SW1 is configured to be activated in response to a movement of the first operating member 16. The first electric switch SW1 is configured to be activated in response to a pivotal movement of the first operating member 16. The second electric switch SW2 is configured to be activated in response to a movement of the second operating member 18. The second electric switch SW2 is configured to be activated in response to a pivotal movement of the second operating member 18.

Figure 6:
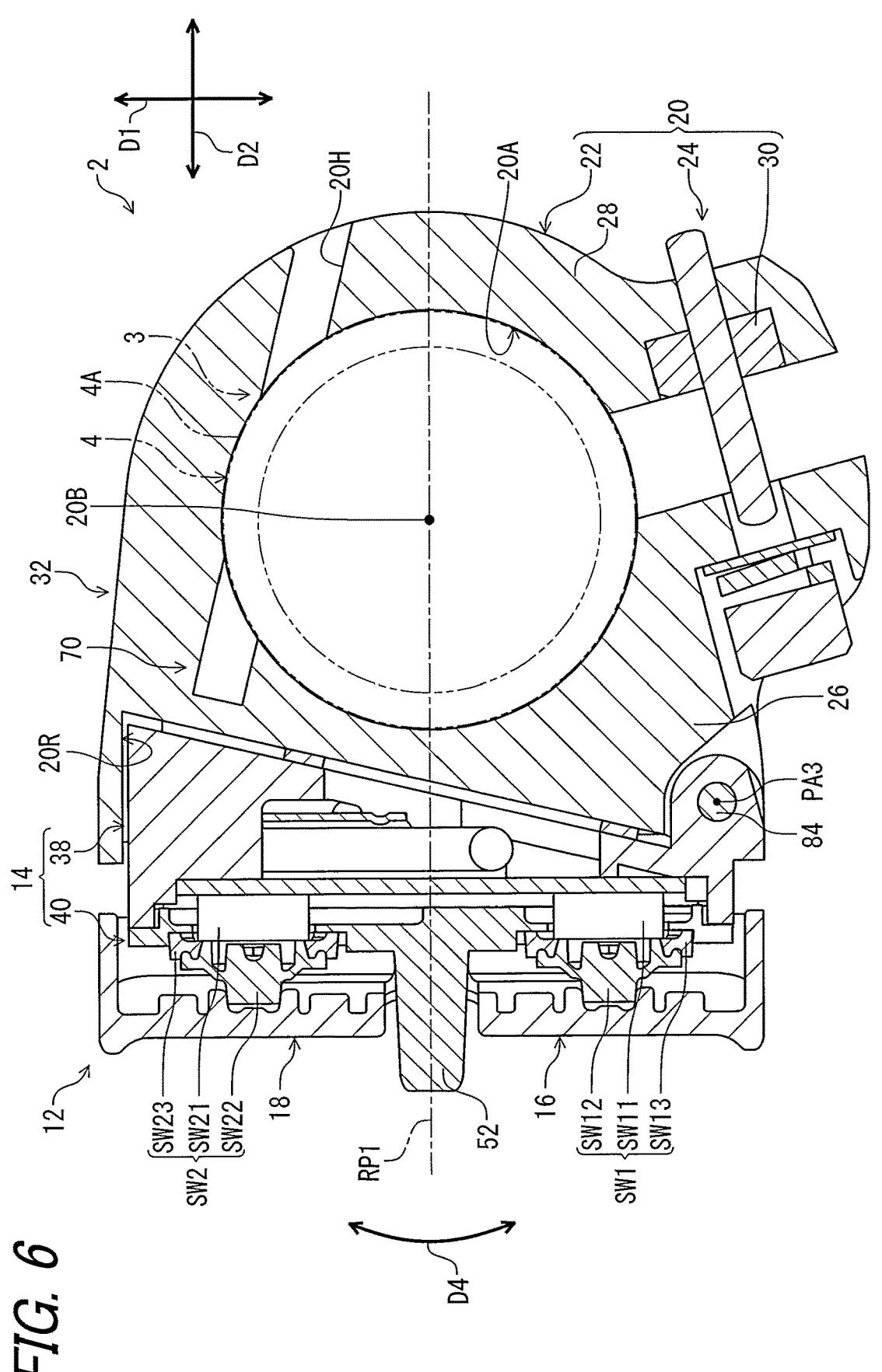
FIG. 6 is a cross-sectional view of the operating device taken along line VI-VI of FIG. 5.

As seen in FIG. 6, the electric switch SW1 is at least partially provided between the operating member 16 and the base body 14. The electric switch SW2 is at least partially provided between the operating member 18 and the base body 14. The first electric switch SW1 is at least partially provided between the first operating member 16 and the base structure 32. The second electric switch SW2 is at least partially provided between the second operating member 18 and the base structure 32.

In the present embodiment, the electric switch SW1 is entirely provided between the operating member 16 and the base body 14. The electric switch SW2 is entirely provided between the operating member 18 and the base body 14. The first electric switch SW1 is entirely provided between the first operating member 16 and the base structure 32. The second electric switch SW2 is entirely provided between the second operating member 18 and the base structure 32.

However, the electric switch SW1 can be partially provided between the operating member 16 and the base body 14 if needed or desired. The electric switch SW2 can be partially provided between the operating member 18 and the base body 14 if needed or desired. The first electric switch SW1 can be partially provided between the first operating member 16 and the base structure 32 if needed or desired. The second electric switch SW2 can be partially provided between the second operating member 18 and the base structure 32 if needed or desired.

The electric switch SW1 includes a switch circuit SW11, a button SW12, and a frame SW13. The switch circuit SW11 includes a fixed contact and a movable contact. The frame SW13 is secured to the base body 14. The button SW12 is movably attached to the frame SW13. The button SW12 is movable relative to the frame SW13 in response to the user input operation U1. The button SW12 is configured to transmit the user input operation U1 to the switch circuit SW11 to turn the switch circuit SW11 on. The button SW12 is made of an elastic member such as elastomer or resin.

The electric switch SW2 includes a switch circuit SW21, a button SW22, and a frame SW23. The switch circuit SW21 includes a fixed contact and a movable contact. The frame SW23 is secured to the base body 14. The button SW22 is movably attached to the frame SW23. The button SW22 is movable relative to the frame SW23 in response to the user input operation U1. The button SW22 is configured to transmit the user input operation U1 to the switch circuit SW21 to turn the switch circuit SW21 on. The button SW22 is made of an elastic member such as elastomer or resin.

Figure 7:
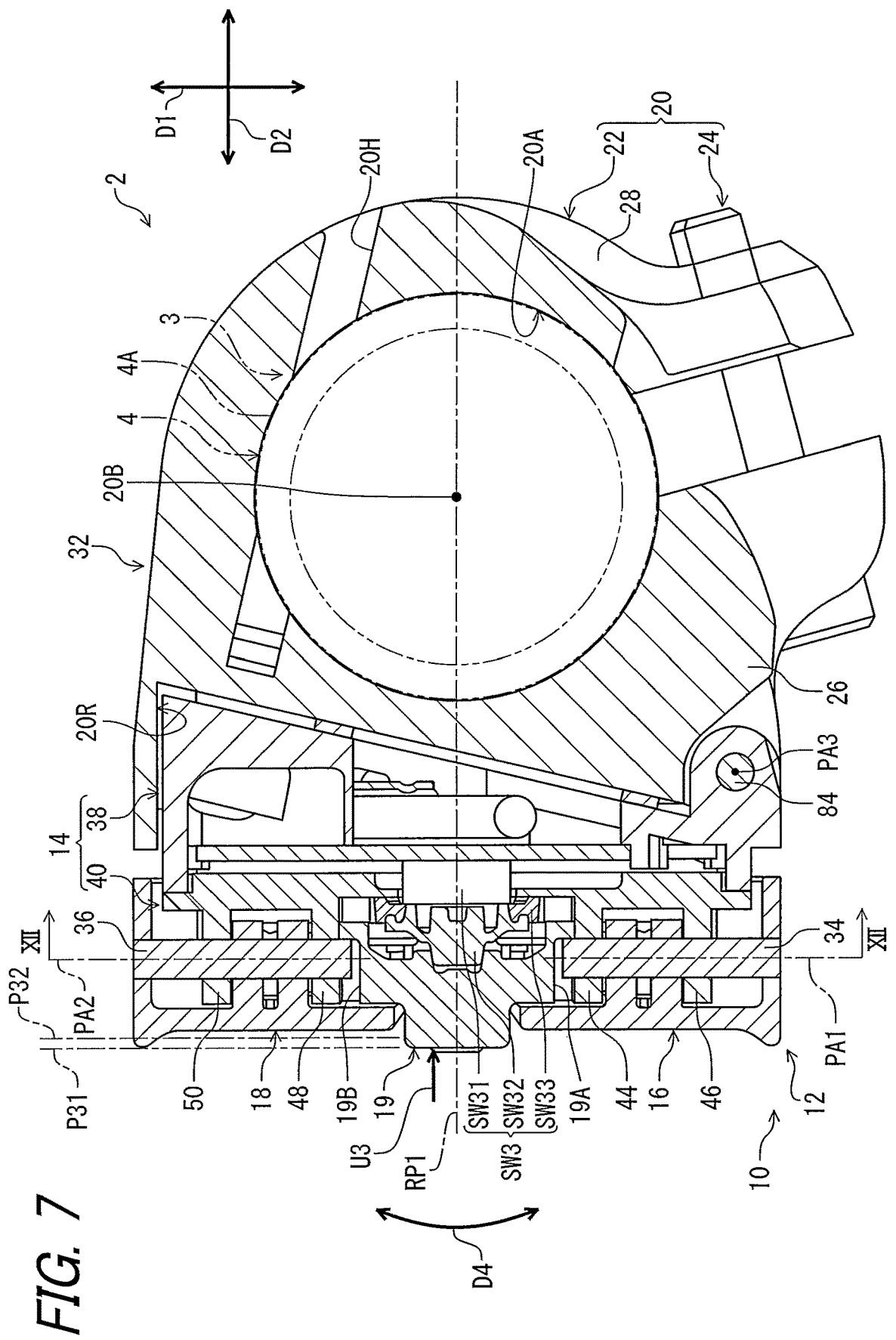
FIG. 7 is a cross-sectional view of the operating device taken along line VII-VII of FIG. 5.

As seen in FIG. 7, the third electric switch SW3 is configured to be activated in response to a movement of the third operating member 19. The third electric switch SW3 is at least partially provided between the third operating member 19 and the base structure 32. In the present embodiment, the third electric switch SW3 is entirely provided between the third operating member 19 and the base structure 32. However, the third electric switch SW3 can be partially provided between the third operating member 19 and the base structure 32 if needed or desired.

The electric switch SW3 includes a switch circuit SW31, a button SW32, and a frame SW33. The switch circuit SW31 includes a fixed contact and a movable contact. The frame SW33 is secured to the base body 14. The button SW32 is movably attached to the frame SW33. The button SW32 is movable relative to the frame SW33 in response to the user input operation U1. The button SW32 is configured to transmit the user input operation U1 to the switch circuit SW31 to turn the switch circuit SW31 on. The button SW32 is made of an elastic member such as elastomer or resin.

Figure 8:
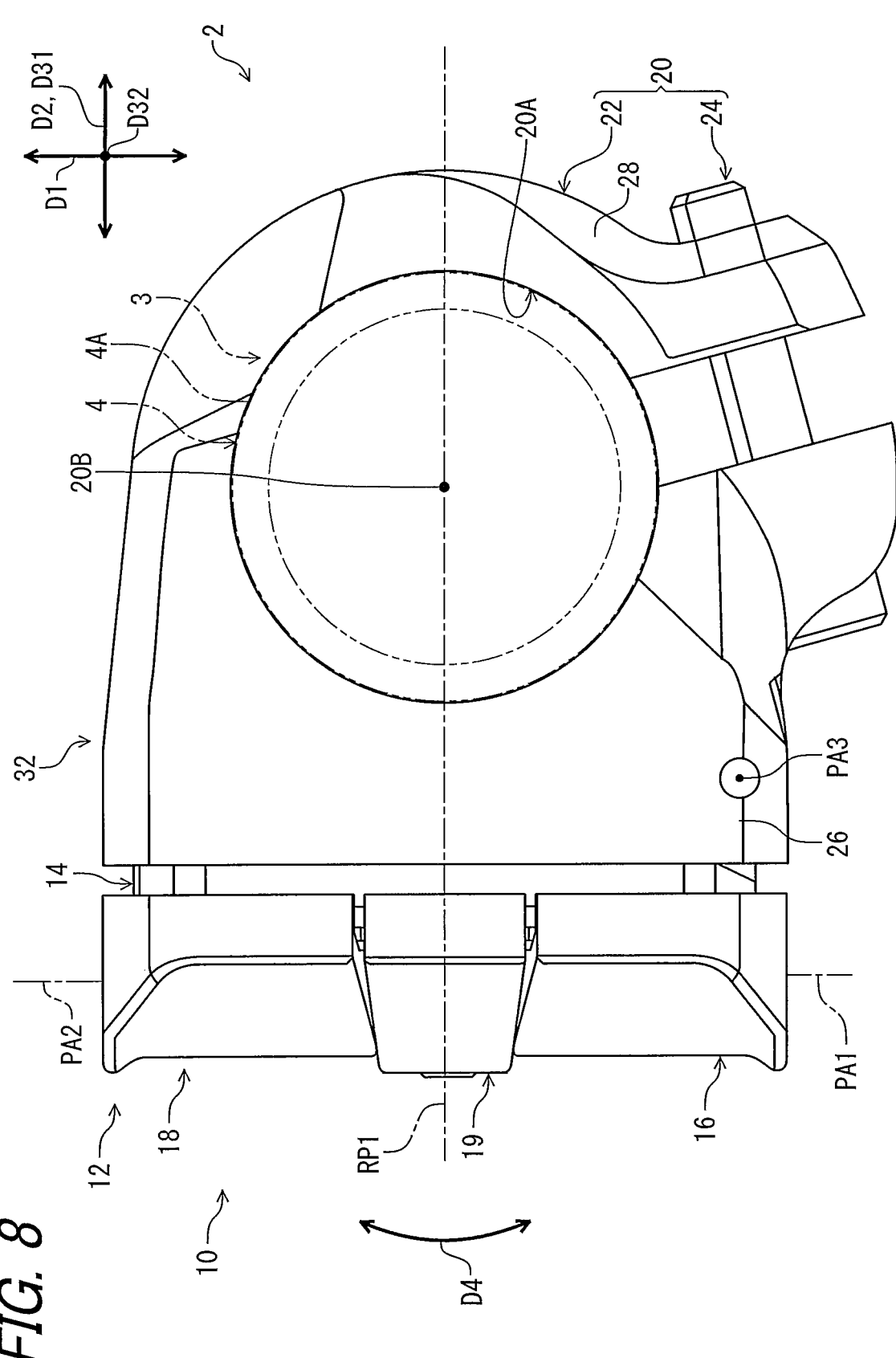
FIG. 8 is a side elevational view of the operating device illustrated in FIG. 1.
Figure 9:
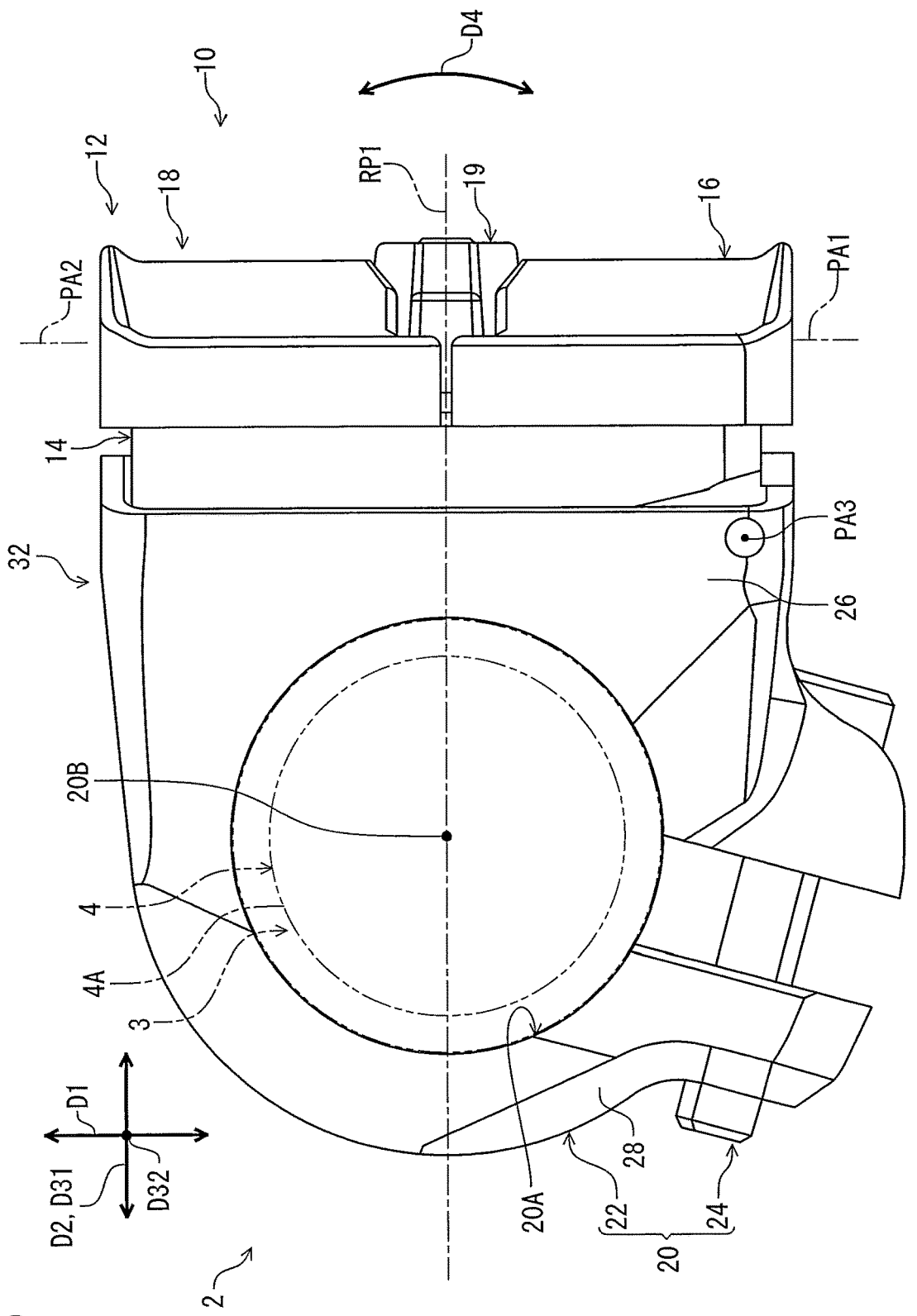
FIG. 9 is a side elevational view of the operating device illustrated in FIG. 1.

As seen in FIGS. 5, 8, and 9, one of the first operating member 16 and the second operating member 18 is arranged to avoid overlapping the other of the first operating member 16 and the second operating member 18 as viewed in a third direction D31 or D32. The third direction D31 is perpendicular to one of the first pivot axis PA1 and the second pivot axis PA2. The third direction D32 is perpendicular to one of the first pivot axis PA1 and the second pivot axis PA2. The third direction D32 is parallel to the second direction D2.

The first operating member 16 is arranged to avoid overlapping the second operating member 18 as viewed in the third direction D31 or D32 perpendicular to the first pivot axis PA1. The second operating member 18 is arranged to avoid overlapping the first operating member 16 as viewed in the third direction D31 or D32 perpendicular to the second pivot axis PA2.

One of the first operating member 16 and the second operating member 18 is arranged to avoid overlapping the other of the first operating member 16 and the second operating member 18 as viewed along the reference plane RP1. The first operating member 16 is arranged to avoid overlapping the second operating member 18 as viewed along the reference plane RP1. The second operating member 18 is arranged to avoid overlapping the first operating member 16 as viewed along the reference plane RP1.

However, one of the first operating member 16 and the second operating member 18 can be arranged to at least partially overlap the other of the first operating member 16 and the second operating member 18 as viewed in the third direction D31 if needed or desired. One of the first operating member 16 and the second operating member 18 can be arranged to overlap the other of the first operating member 16 and the second operating member 18 at least partially as viewed along the reference plane RP1 if needed or desired.

As seen in FIGS. 8 and 9, the first operating member 16 and the second operating member 18 are arranged in a circumferential direction D4 defined about the center axis 20B of the clamp opening 20A. The second operating member 18 is spaced apart from the first operating member 16 in the circumferential direction D4. The third operating member 19 is at least partially provided between the first operating member 16 and the second operating member 18 in the circumferential direction D4. However, the positional relationship between the first operating member 16, the second operating member 18, and the third operating member 19 is not limited to the illustrated embodiment.

As seen in FIG. 6, the first electric switch SW1 and the second electric switch SW2 are arranged in the circumferential direction D4. The second electric switch SW2 is spaced apart from the first electric switch SW1 in the circumferential direction D4. However, the positional relationship between the first electric switch SW1 and the second electric switch SW2 is not limited to the illustrated embodiment.

Figure 10:
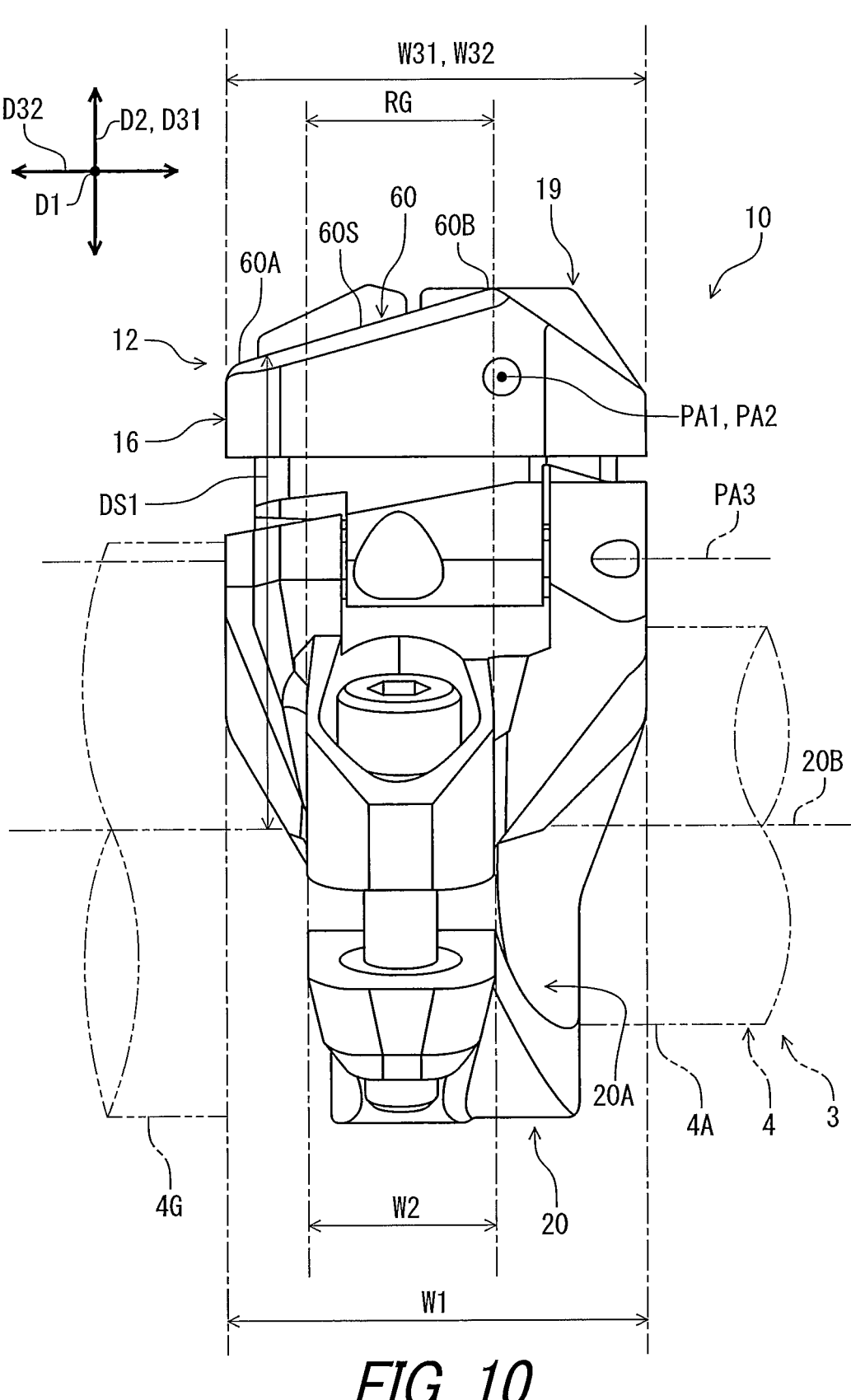
FIG. 10 is a side elevational view of the operating device illustrated in FIG. 1.

As seen in FIG. 10, the base structure 32 has a base width W1. The base width W1 is defined along the center axis 20B of the clamp opening 20A as a maximum width of the base structure 32. The clamp opening 20A has a clamp width W2. The clamp width W2 is defined along the center axis 20B of the clamp opening 20A as a minimum width of the clamp opening 20A. A ratio of the clamp width W2 to the base width W1 is less than or equal to 45%. However, the ratio of the clamp width W2 to the base width W1 can be greater than 45% if needed or desired.

As seen in FIG. 5, the first operating member 16 has a first width W31. The first width W31 is defined along the center axis 20B of the clamp opening 20A. The second operating member 18 has a second width W32. The second width W32 is defined along the center axis 20B of the clamp opening 20A. In the present embodiment, the second width W32 is equal to the first width W31. However, the second width W32 can be different from the first width W31 if needed or desired.

As seen in FIGS. 5 and 10, at least one of a first ratio of the clamp width W2 to the first width W31 and a second ratio of the clamp width W2 to the second width W32 is less than or equal to 45%. In the present embodiment, the first width W31 is less than or equal to 45%. The second width W32 is less than or equal to 45%. However, at least one of the first width W31 and the second width W32 can be greater than 45% if needed or desired.

As seen in FIG. 10, at least one of the first pivot axis PA1 and the second pivot axis PA2 is provided outside a region RG defined by the clamp width W2 along the center axis 20B of the clamp opening 20A as viewed along the at least one of the first pivot axis PA1 and the second pivot axis PA2. In the present embodiment, the first pivot axis PA1 is provided outside the region RG as viewed along the first pivot axis PA1. The second pivot axis PA2 is provided outside the region RG as viewed along the second pivot axis PA2. However, the first pivot axis PA1 can be provided in the region RG as viewed along the first pivot axis PA1 if needed or desired. The second pivot axis PA2 can be provided in the region RG as viewed along the second pivot axis PA2 if needed or desired.

As seen in FIG. 10, the first operating member 16 includes a first surface 60. The first surface 60 is configured to be pressed by the user when the first operating member 16 receives the first user input operation U1.

The first surface 60 includes a first inclined surface 60S. Namely, the first operating member 16 includes the first inclined surface 60S. The first inclined surface 60S is non-parallel to and non-perpendicular to the center axis 20B of the clamp opening 20A. The first inclined surface 60S includes a first surface end 60A and a first additional surface end 60B and extends between the first surface end 60A and the first additional surface end 60B. The first surface end 60A is configured to be provided closer to the handlebar grip 4G of the handlebar 4 than the first additional surface end 60B in the mounting state where the base structure 32 is mounted to the handlebar 4.

A first distance DS1 is radially defined between the first inclined surface 60S and the center axis 20B of the clamp opening 20A as viewed in the first direction D1. The first inclined surface 60S is inclined to decrease the first distance DS1 from the first additional surface end 60B toward the first surface end 60A. However, the first inclined surface 60S can be inclined to increase the first distance DS1 from the first additional surface end 60B toward the first surface end 60A if needed or desired. The first inclined surface 60S can be parallel to the center axis 20B of the clamp opening 20A if needed or desired.

Figure 11:
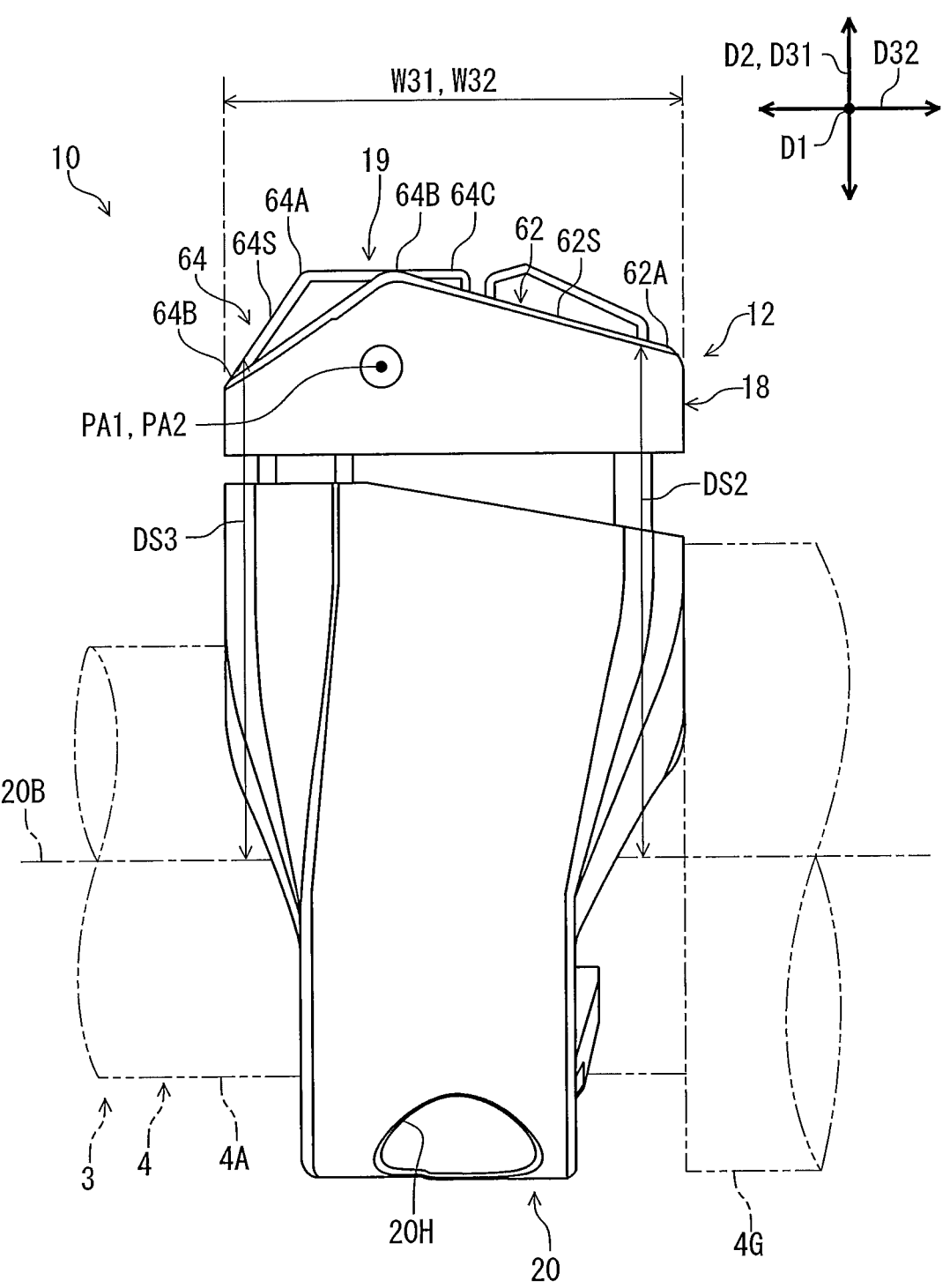
FIG. 11 is a side elevational view of the operating device illustrated in FIG. 1.

As seen in FIG. 11, the second operating member 18 includes a second surface 62. The second surface 62 is configured to be pressed by the user when the second operating member 18 receives the second user input operation U2.

The second surface 62 includes a second inclined surface 62S. Namely, the second operating member 18 includes the second inclined surface 62S. The second inclined surface 62S is non-parallel to and non-perpendicular to the center axis 20B of the clamp opening 20A. The second inclined surface 62S includes a second surface end 62A and a second additional surface end 62B and extends between the second surface end 62A and the second additional surface end 62B. The second surface end 62A is configured to be provided closer to the handlebar grip 4G of the handlebar 4 than the second additional surface end 62B in the mounting state where the base structure 32 is mounted to the handlebar 4.

A second distance DS2 is radially defined between the second inclined surface 62S and the center axis 20B of the clamp opening 20A as viewed in the second direction D2. The second inclined surface 62S is inclined to decrease the second distance DS2 from the second additional surface end 62B toward the second surface end 62A. However, the second inclined surface 62S can be inclined to increase the second distance DS2 from the second additional surface end 62B toward the second surface end 62A if needed or desired. The second inclined surface 62S can be parallel to the center axis 20B of the clamp opening 20A if needed or desired.

As seen in FIG. 11, the third operating member 19 includes a third surface 64. The third surface 64 is configured to be pressed by the user when the third operating member 19 receives the third user input operation U3.

The third surface 64 includes a third inclined surface 64S. Namely, the third operating member 19 includes the third inclined surface 64S. The third inclined surface 64S is non-parallel to and non-perpendicular to the center axis 20B of the clamp opening 20A. The third inclined surface 64S includes a third surface end 64A and a third additional surface end 64B and extends between the third surface end 64A and the third additional surface end 64B. The third surface end 64A is configured to be provided closer to the handlebar grip 4G of the handlebar 4 than the third additional surface end 64B in the mounting state where the base structure 32 is mounted to the handlebar 4.

A third distance DS3 is radially defined between the third inclined surface 64S and the center axis 20B of the clamp opening 20A as viewed in the third direction D31. The third inclined surface 64S is inclined to decrease the third distance DS3 from the third surface end 64A toward the third additional surface end 64B. However, the third inclined surface 64S can be inclined to increase the third distance DS3 from the third surface end 64A toward the third additional surface end 64B if needed or desired. The third inclined surface 64S can be parallel to the center axis 20B of the clamp opening 20A if needed or desired.

The third surface 64 includes a third additional surface 64C. The third additional surface 64C is parallel to the center axis 20B of the clamp opening 20A. The third inclined surface 64S is non-parallel to and non-perpendicular to the third additional surface 64C. The third additional surface 64C is configured to be provided closer to the handlebar grip 4G of the handlebar 4 than the third inclined surface 64S in the mounting state. Thus, the third additional surface 64C is configured to be pressed by the user when the third operating member 19 receives the user input operation U3.

As seen in FIG. 7, the third operating member 19 is movable relative to the base structure 32 between a third rest position P31 and a third operated position P32. At least one of the first pivot pin 34 and the second pivot pin 36 is contactable with the third operating member 19 to position the third operating member 19 in the third rest position P31. In the present embodiment, both the first pivot pin 34 and the second pivot pin 36 are contactable with the third operating member 19 to position the third operating member 19 in the third rest position P31. However, only one of the first pivot pin 34 and the second pivot pin 36 can be configured to be contactable with the third operating member 19 to position the third operating member 19 in the third rest position P31 if needed or desired.

Figure 12:
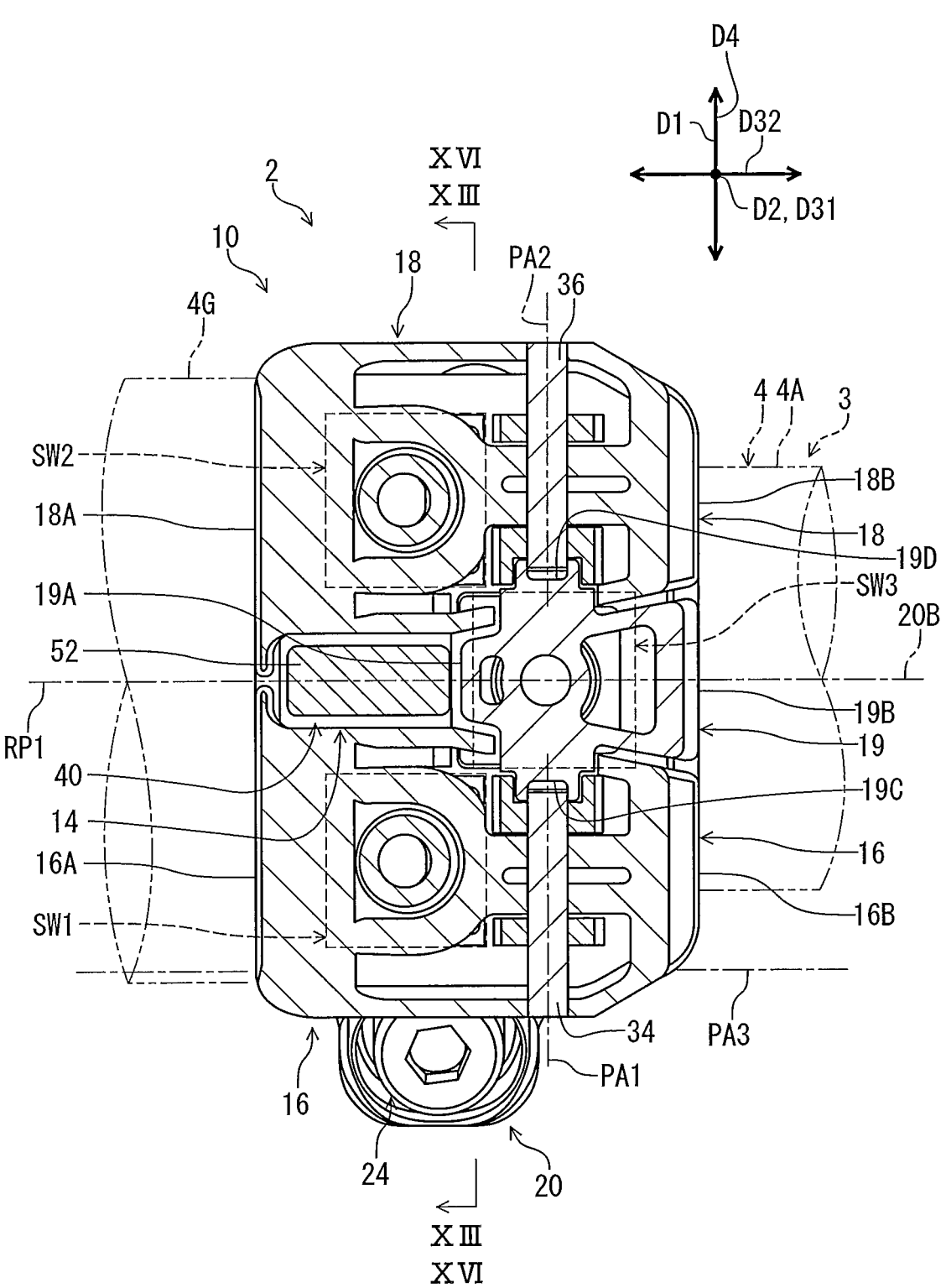
FIG. 12 is a cross-sectional view of the operating device taken along line XII-XII of FIG. 7.
Figure 13:
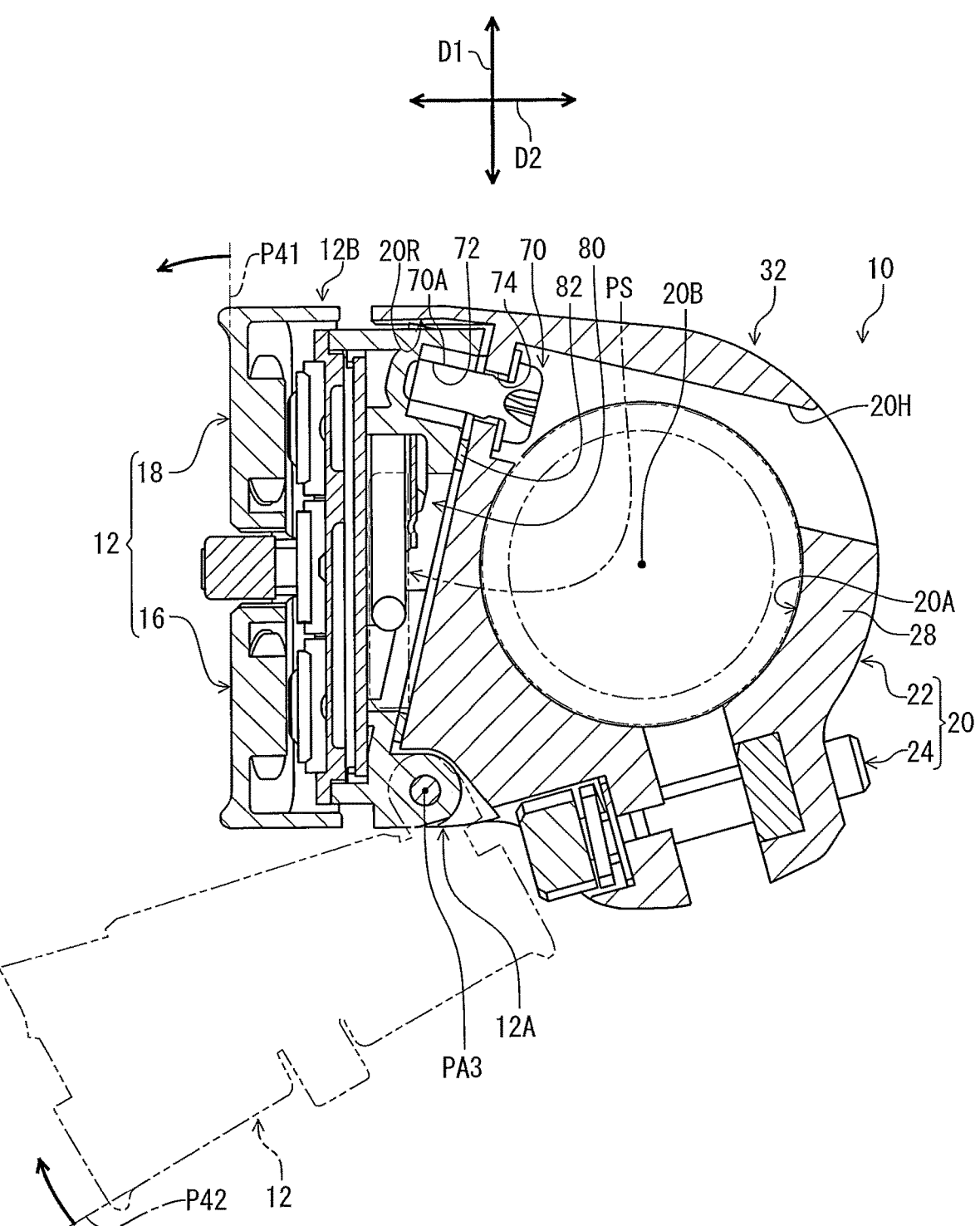
FIG. 13 is a cross-sectional view of the operating device taken along line XIII-XIII of FIG. 12.

As seen in FIGS. 12 and 13, the second pivot pin 36 is spaced apart from the first pivot pin 34 in the first direction D1. The third operating member 19 is at least partially provided between the first pivot pin 34 and the second pivot pin 36 in the first direction D1. The third operating member 19 includes a first groove 19C and a second groove 19D. An end of the first pivot pin 34 is provided in the first groove 19C. An end of the second pivot pin 36 is provided in the second groove 19D. The third operating member 19 is configured to be guided by the first pivot pin 34 and the second pivot pin 36.

As seen in FIG. 13, the operating structure 12 is pivotally coupled to the clamp 20 about a base pivot axis PA3. The base body 14 is pivotally coupled to the clamp 20 about the base pivot axis PA3. The operating structure 12 is pivotable relative to the clamp 20 about the base pivot axis PA3 between a closed position P41 and an open position P42.

The operating structure 12 includes a first base end 12A and a second base end 12B and extends between the first base end 12A and the second base end 12B. The first base end 12A is pivotally coupled to the clamp 20 about the base pivot axis PA3. The first base end 12A is closer to the base pivot axis PA3 than the second base end 12B.

The operating device 10 further comprises a fastener 70. The fastener 70 is configured to fasten the operating structure 12 to the clamp 20. The fastener 70 is configured to fasten the second base end 12B to the clamp 20.

One of the clamp 20 and the operating structure 12 includes a threaded hole 72. The fastener 70 includes an externally threaded portion 70A. The externally threaded portion 70A is engaged with the threaded hole 72 to fasten the operating structure 12 to the clamp 20.

The other of the clamp 20 and the operating structure 12 includes a through hole 74. The fastener 70 extends through the through hole 74 in a state where the fastener 70 fastens the operating structure 12 to the clamp 20.

In the present embodiment, the operating structure 12 includes the threaded hole 72. The clamp 20 includes the through hole 74. However, the clamp 20 can include the threaded hole 72 if needed or desired. The operating structure 12 can include the through hole 74 if needed or desired.

The clamp 20 includes a hole 20H. The fastener 70 is partially provided in the hole 20H. The hole 20H is in communication with the clamp opening 20A. The fastener 70 is inserted into the hole 20H when the operating structure 12 is fastened to the clamp 20 with the fastener 70.

As seen in FIG. 13, at least one of the clamp 20 and the operating structure 12 define a holder space 80 in which an electric power source PS is to be provided in a closed state where the operating structure 12 is in the closed position P41. The clamp 20 and the operating structure 12 define the holder space 80 in which the electric power source PS is to be provided.

The clamp 20 is configured to restrict the electric power source PS from moving relative to the clamp 20 in a holding state where the electric power source PS is provided in the holder space 80. The clamp 20 is configured to bias the electric power source PS toward the operating structure 12 in the holding state.

The operating device 10 further comprises a seal member 82. The seal member 82 is provided to at least one of the clamp 20 and the operating structure 12. In the present embodiment, the seal member 82 is provided to the operating structure 12. The seal member 82 is attached to the base body 14.

Figure 14:
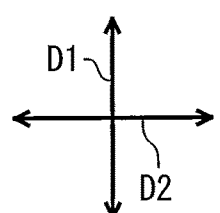
FIG. 14 is a cross-sectional view of an operating device in accordance with a modification.

The seal member 82 has an annular shape. The seal member 82 is compressed between the operating structure 12 and the clamp 20 in the closed state. The seal member 82 is made of an elastic member such as elastomer. The seal member 82 can be provided to the clamp 20 or both the clamp 20 and the operating structure 12 if needed or desired. As seen in FIG. 14, for example, the seal member 82 can be provided to the clamp 20. In such modifications, the seal member 82 can have a sheet shape.

As seen in FIG. 4, the operating device 10 further comprises a base pivot pin 84. The base pivot pin 84 pivotally couples the operating structure 12 and the clamp 20 about the base pivot axis PA3. The base pivot pin 84 extends along the base pivot axis PA3.

Figure 15:
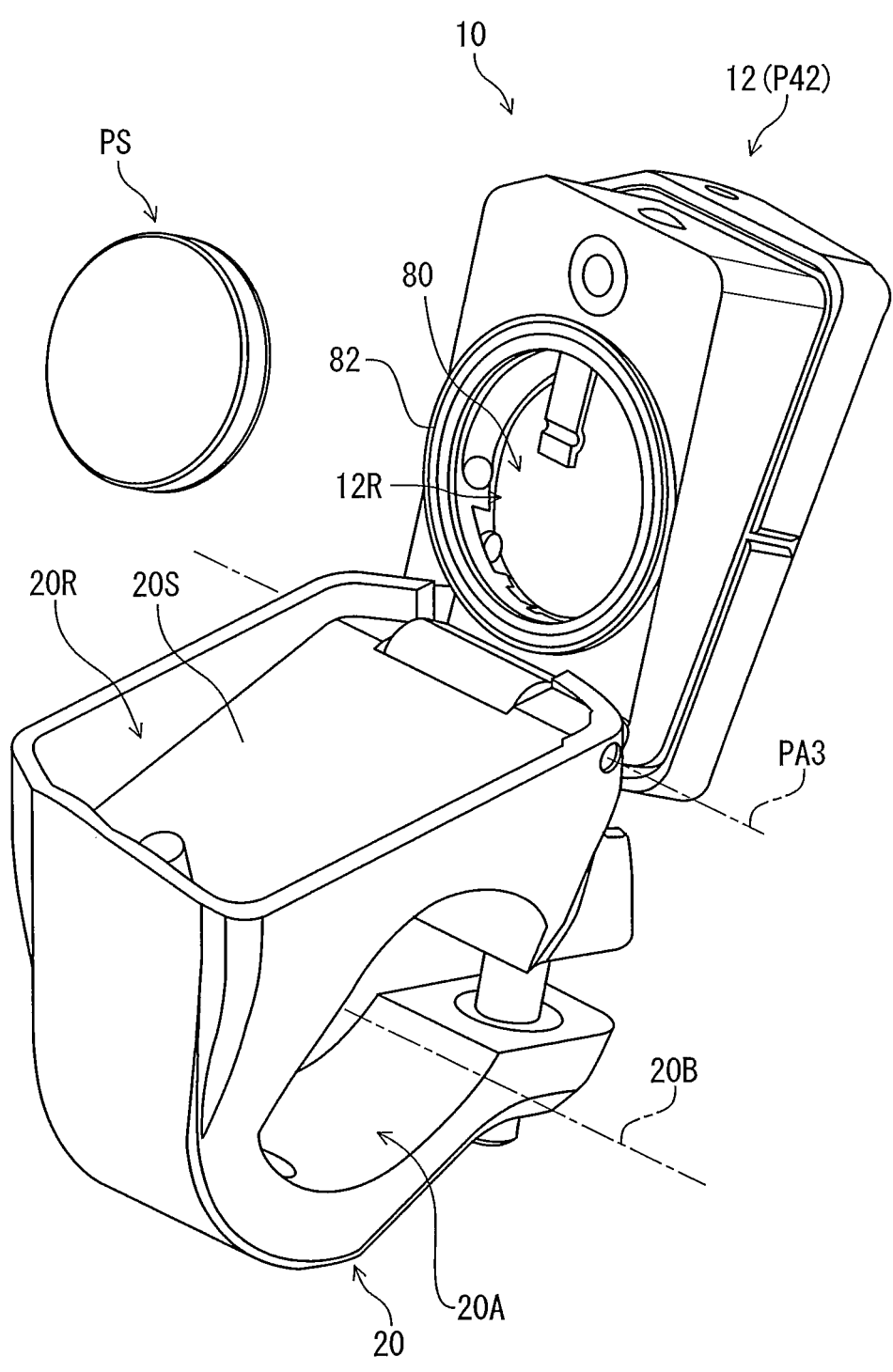
FIG. 15 is a perspective view of the operating device illustrated in FIG. 1 (open state).

As seen in FIG. 15, the clamp 20 and the operating structure 12 allows the electric power source PS to be accessed in an open state where the operating structure 12 is in the open position P42. The base pivot axis PA3 extends along the center axis 20B of the clamp opening 20A. In the present embodiment, the pivot axis is non-parallel to the base pivot axis PA3. The base pivot axis PA3 is parallel to the center axis 20B of the clamp opening 20A. However, the pivot axis can be parallel to the base pivot axis PA3 if needed or desired. The base pivot axis PA3 can be non-parallel to the center axis 20B of the clamp opening 20A if needed or desired.

The clamp 20 includes a first recess 20R. The operating structure 12 is provided outside the first recess 20R in an open state where the operating structure 12 is in the open position P42. The base body 14 is provided outside the first recess 20R in the open state where the operating structure 12 is in the open position P42.

As seen in FIG. 13, the operating structure 12 is at least partially provided in the first recess 20R in a closed state where the operating structure 12 is in the closed position P41. The base body 14 is at least partially provided in the first recess 20R in the closed state where the operating structure 12 is in the closed position P41.

Figure 16:
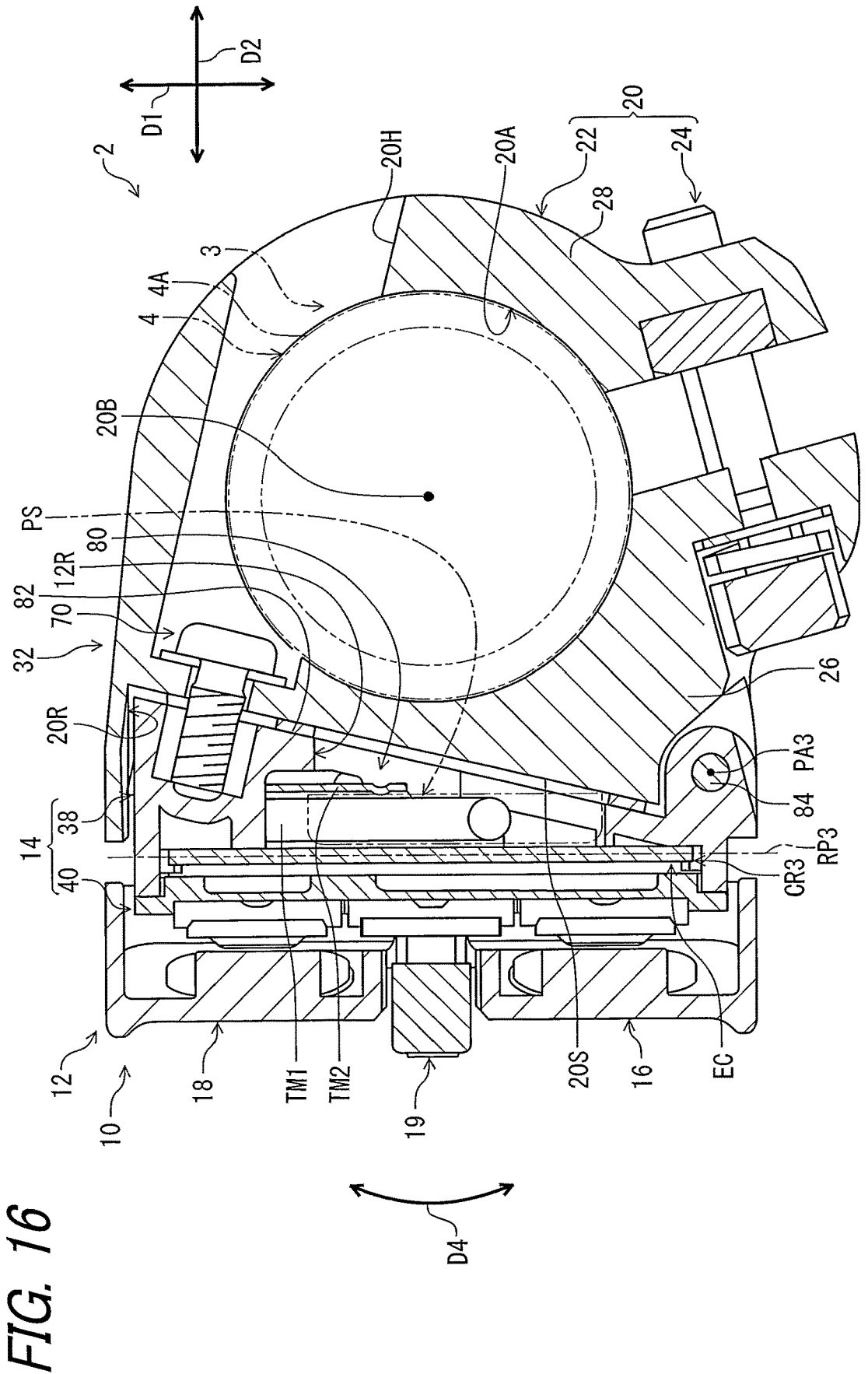
FIG. 16 is a cross-sectional view of the operating device taken along line XVI-XVI of FIG. 12.

As seen in FIG. 16, the operating structure 12 includes a second recess 12R. The second recess 12R at least partly defines the holder space 80 in which the electric power source PS is to be provided. The base body 14 includes the second recess 12R. In the present embodiment, the second recess 12R partially defines the holder space 80. However, the second recess 12R can entirely define the holder space 80 if needed or desired.

The operating device 10 further comprises at least one substrate CR3. The at least one substrate CR3 is at least partially provided to one of the clamp 20 and the operating structure 12. In the present embodiment, the at least one substrate CR3 includes a first substrate CR31. The first substrate CR31 is entirely provided to the operating structure 12. However, the at least one substrate CR3 can be provided to the clamp 20 if needed or desired. The operating device 10 can include at least two substrates if needed or desired.

The first substrate CR31 extends along a reference plane RP3. The first recess 20R includes a surface 20S. The surface 20S faces toward the electric power source PS in the holding state. The seal member 82 is in contact with the surface 20S in the holding state. The first substrate CR31 is non-parallel to and non-perpendicular to the surface 20S. The first substrate CR31 is inclined relative to the surface 20S. The reference plane RP3 is non-parallel to and non-perpendicular to the surface 20S. The reference plane RP3 is inclined relative to the surface 20S. The reference plane RP3 is parallel to the first direction D1. The surface 20S is non-parallel to and non-perpendicular to the first direction D1. However, the first substrate CR31 can be parallel to the surface 20S if needed or desired. The reference plane RP3 can be parallel to the surface 20S if needed or desired. The reference plane RP3 can be non-parallel to the first direction D1 if needed or desired. The surface 20S can be parallel to the first direction D1 if needed or desired.

As seen in FIG. 6, the first electric switch SW1 is electrically mounted on the at least one substrate CR3. The second electric switch SW2 is electrically mounted on the at least one substrate CR3. As seen in FIG. 7, the third electric switch SW3 is electrically mounted on the at least one substrate CR3.

Figure 17:
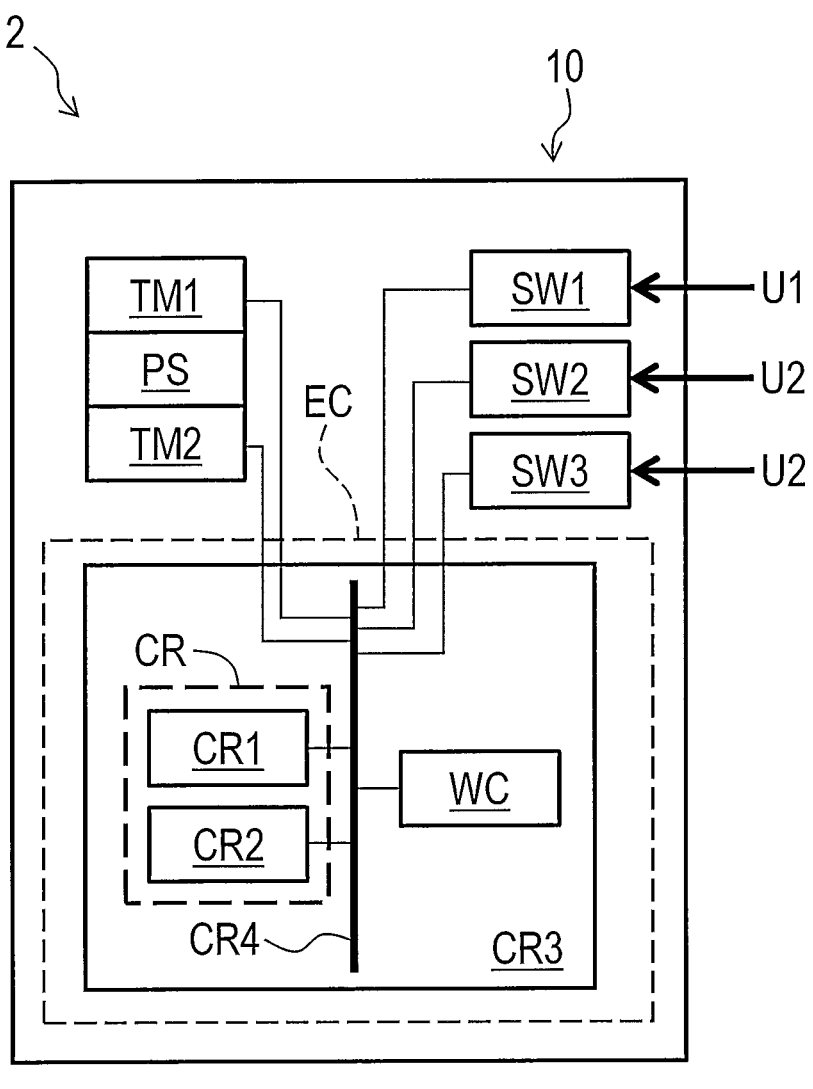
FIG. 17 is a schematic block diagram of the human-powered vehicle illustrated in FIG. 1.
Figure 17:
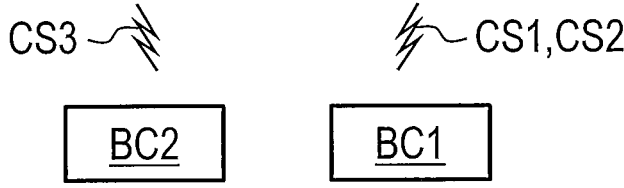

As seen in FIG. 17, the operating device 10 includes electronic circuitry EC. The electronic circuitry EC includes an electronic controller CR, the at least one substrate CR3, a system bus CR4, and a wireless communicator WC. The electronic controller CR is configured to be electrically connected to the first electric switch SW1, the second electric switch SW2, the third electric switch SW3, and the wireless communicator WC.

The electronic controller CR includes a hardware processor CR1 and a hardware memory CR2. The hardware processor CR1 is coupled to the hardware memory CR2. The hardware memory CR2 is coupled to the hardware processor CR1. The hardware processor CR1 and the hardware memory CR2 are electrically mounted on the at least one substrate CR3. The hardware processor CR1 is electrically connected to the hardware memory CR2 via the at least one substrate CR3 and the system bus CR4. The hardware memory CR2 is electrically connected to the hardware processor CR1 via the at least one substrate CR3 and the system bus CR4. For example, the electronic controller CR includes a semiconductor. The hardware processor CR1 includes a semiconductor. The hardware memory CR2 includes a semiconductor. However, the electronic controller CR can be free of a semiconductor if needed or desired. The hardware processor CR1 can be free of a semiconductor if needed or desired. The hardware memory CR2 can be free of a semiconductor if needed or desired.

For example, the hardware processor CR1 includes at least one of a central processing unit (CPU), a micro processing unit (MPU), and a memory controller. The hardware memory CR2 is electrically connected to the hardware processor CR1. For example, the hardware memory CR2 includes at least one of a volatile memory and a non-volatile memory. Examples of the volatile memory include a random-access memory (RAM) and a dynamic random-access memory (DRAM). Examples of the non-volatile memory include a read only memory (ROM), an electrically erasable programmable ROM (EEPROM), and a magnetic disc. The hardware memory CR2 includes storage areas each having an address. The hardware processor CR1 is configured to control the hardware memory CR2 to store data in the storage areas of the hardware memory CR2 and reads data from the storage areas of the hardware memory CR2. The hardware memory CR2 can also be referred to as a computer-readable storage medium CR2.

The electronic controller CR is configured to execute at least one control algorithm of the operating device 10. For example, the electronic controller CR is programed to execute at least one control algorithm of the operating device 10. The hardware memory CR2 stores at least one program including at least one program instruction. The at least one program is read into the hardware processor CR1, and thereby the at least one control algorithm of the operating device 10 is executed based on the at least one program. The electronic controller CR can also be referred to as an electronic controller circuit or circuitry CR. The electronic controller CR can also be referred to as an electronic hardware controller circuit or circuitry CR.

The structure of the electronic circuitry EC is not limited to the above structure. The structure of the electronic controller CR is not limited to the above structure. The structure of the electronic controller CR is not limited to the hardware processor CR1 and the hardware memory CR2. The electronic circuitry EC can be realized by hardware alone or a combination of hardware and software. In the present embodiment, the hardware processor CR1 and the hardware memory CR2 are integrated as a single chip such as an application specific integrated circuit (ASIC) or a field programmable gate array (FPGA). However, the hardware processor CR1 and the hardware memory CR2 can be separate chips if needed or desired. The electronic controller CR can include the hardware processor CR1, the hardware memory CR2, the at least one substrate CR3, and the system bus CR4 if needed or desired. The electronic controller CR can be at least two electronic controllers which are separately provided. The electronic circuitry EC can include at least two electronic controllers which are separately provided. The at least one control algorithm of the operating device 10 can be executed by the at least two electronic controllers if needed or desired. The electronic controller CR can include at least two hardware processors which are separately provided. The electronic controller CR can include at least two hardware memories which are separately provided. The at least one control algorithm of the operating device 10 can be executed by the at least two hardware processors if needed or desired. The at least one control algorithm of the operating device 10 can be stored in the at least two hardware memories if needed or desired. The electronic circuitry EC can include at least two circuit boards which are separately provided if needed or desired. The electronic circuitry EC can include at least two system buses which are separately provided if needed or desired.

As seen in FIG. 17, the wireless communicator WC is configured to wirelessly communicate with at least one electric device such as the electric device BC1 or BC2. The wireless communicator WC is electrically connected to the hardware processor CR1 and the hardware memory CR2 with the at least one substrate CR3 and the system bus CR4. The wireless communicator WC is electrically mounted on the at least one substrate CR3. The wireless communicator WC includes a signal transmitting circuit or circuitry, a signal receiving circuit or circuitry, and an antenna. Thus, the wireless communicator WC can also be referred to as a wireless communicator circuit or circuitry WC.

The wireless communicator WC is configured to superimpose digital signals on carrier wave using a predetermined wireless communication protocol to wirelessly transmit signals. For example, the wireless communicator WC is configured to encrypt signals using a cryptographic key to generate encrypted wireless signals. The wireless communicator WC is configured to transmit wireless signals via the antenna. The wireless communicator WC can be a one-way wireless communication device such as a receiver, or a two-way wireless communication device such as a transceiver.

For example, the wireless communicator WC is configured to receive wireless signals via the antenna. In the present embodiment, the wireless communicator WC is configured to decode the wireless signals to recognize signals transmitted from other wireless communicators. The wireless communicator WC is configured to decrypt the wireless signals using the cryptographic key.

The term "wireless communicator" as used herein includes a receiver, a transmitter, a transceiver, a transmitter-receiver, and contemplates any device or devices, separate or combined, capable of transmitting and/or receiving wireless communication signals, including shift signals or control, command or other signals related to some function of the component being controlled. Here, the wireless communicator WC is configured to at least receive a wireless signal. For example, the wireless communicator WC is a two-way wireless transceiver that conducts two-way wireless communications using the wireless receiver for wirelessly receiving shift signals and a wireless transmitter for wirelessly transmitting data. In the present embodiment, the wireless communicator WC can wirelessly communicate with other ones of the bicycle components BC. The wireless control signals of the wireless communicator WC can be radio frequency (RF) signals, ultra-wide band communication signals, radio frequency identification (RFID), Wi-Fi (registered trademark), Zigbee (registered trademark), ANT+ (registered trademark) communications, or Bluetooth (registered trademark) communications or any other type of signal suitable for short range wireless communications as understood in the bicycle field. It should also be understood that the wireless communicator WC can transmit the signals at a particular frequency and/or with an identifier such as a particular code, to distinguish the wireless control signal from other wireless control signals. In this way, the operating device 10 can recognize which control signals are to be acted upon and which control signals are not to be acted upon. Thus, the operating device 10 can ignore the control signals from other wireless communicators of other electric devices.

In the present embodiment, the electronic circuitry EC includes the wireless communicator WC. However, the electronic circuitry EC can include a wired communicator instead of or in addition to the wireless communicator WC if needed or desired. For example, the wired communicator is configured to communicate with at least one electric device via an electric cable. In such modifications, the electronic circuitry EC includes a connection port to which the electric cable is to be connected.

As seen in FIG. 16, the operating device 10 includes a first terminal TM1 and a second terminal TM2. The first terminal TM1 and the second terminal TM2 are electrically connected to the electronic circuitry EC. The first terminal TM1 is made of a metallic material. The second terminal TM2 is made of a metallic material. The first terminal TM1 is contactable with a positive terminal of the electric power source PS in a holding state where the electric power source PS is in the holder space 80. The second terminal TM2 is contactable with a negative terminal of the electric power source PS in the holding state. The first terminal TM1 can also be referred to as a terminal TM1. The second terminal TM2 can also be referred to as a terminal TM2.

As seen in FIG. 17, the electronic controller CR is configured to generate a control signal CS1 in response to the user input operation U1. The electronic controller CR is configured to generate a control signal CS2 in response to the user input operation U2. The electronic controller CR is configured to generate a control signal CS3 in response to the user input operation U3.

For example, the electronic controller CR is configured to generate the control signal CS1 in response to the activation of the first electric switch SW1. The electronic controller CR is configured to generate the control signal CS2 in response to the activation of the second electric switch SW2. The electronic controller CR is configured to generate the control signal CS3 in response to the activation of the third electric switch SW3.

The electronic controller CR is configured to control the wireless communicator WC to wirelessly transmit the control signal CS1 in response to the user input operation U1. The electronic controller CR is configured to control the wireless communicator WC to wirelessly transmit the control signal CS2 in response to the user input operation U2. The electronic controller CR is configured to control the wireless communicator WC to wirelessly transmit the control signal CS3 in response to the user input operation U3.

In a case where the electric device BC1 includes a gear changer, for example, the control signal CS1 indicates one of upshifting and downshifting of the electric device BC1. The control signal CS2 indicates the other of upshifting and downshifting of the electric device BC1. In a case where the electric device BC2 includes a rider-posture changer such as an adjustable seatpost or a suspension, the control signal CS3 indicates changing of a state of the rider-posture changer. The electric device BC1 is not limited to the gear changer. The electric device BC2 is not limited to the rider-posture changer. Each of the electric devices BC1 and BC2 can include an adjustable seatpost, a suspension, a gear changer, a brake device, a lighting device, an assist drive unit, a cycle computer, a smartphone, a tablet computer, a personal computer, or other types of device if needed or desired.

Figure 18:
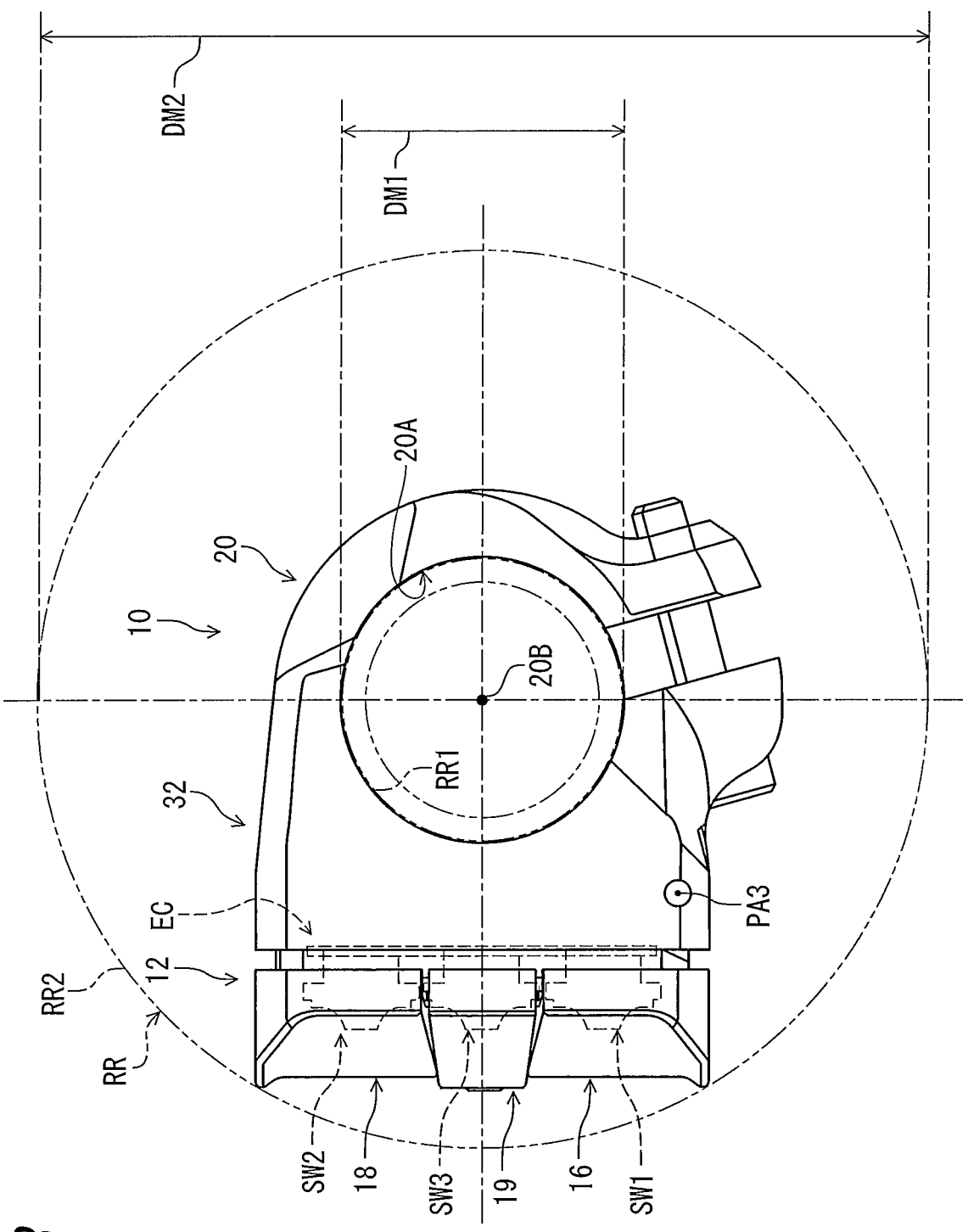
FIG. 18 is a side elevational view of the operating device illustrated in FIG. 1.

As seen in FIG. 18, at least one of the first electric switch SW1, the second electric switch SW2, the third electric switch SW3, and the electronic circuitry EC is at least partially provided in a radial region RR defined about the center axis 22B of the clamp opening 22A. The radial region RR includes a radially inner end RR1 and a radially outer end RR2. The radial region RR is defined between the radially inner end RR1 and the radially outer end RR2.

In the present embodiment, each of the first electric switch SW1, the second electric switch SW2, the third electric switch SW3, and the electronic circuitry EC are entirely provided in the radial region RR. However, at least one of the first electric switch SW1, the second electric switch SW2, the third electric switch SW3, and the electronic circuitry EC can be at least partially provided outside the radial region RR if needed or desired.

The radially inner end RR1 has a first diameter DM1. The radially outer end RR2 has a second diameter DM2. For example, the first diameter DM1 is 22 mm. The second diameter DM2 is 70 mm. However, the first diameter DM1 and the second diameter DM2 are not limited to the above diameters.

Figure 19:
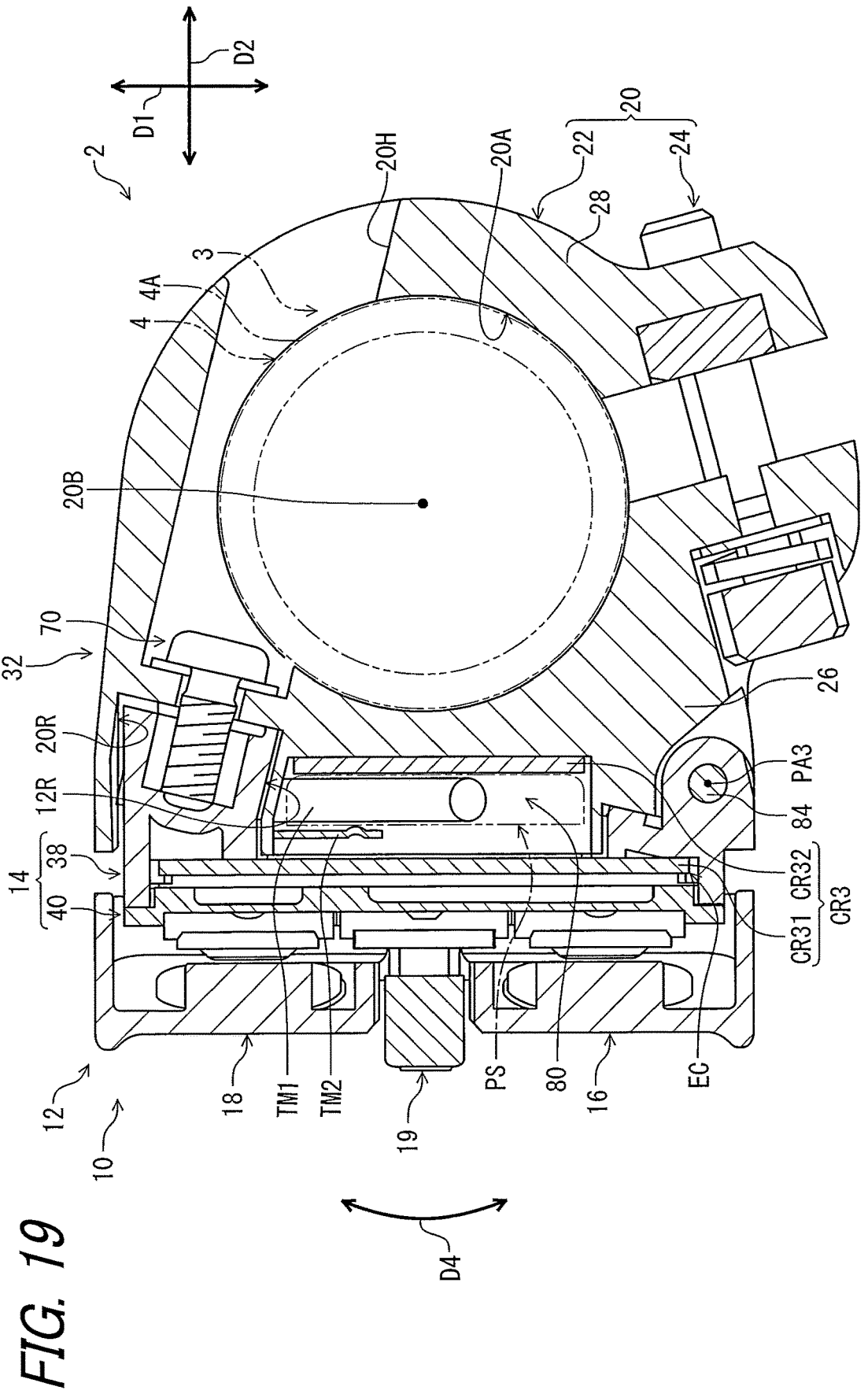
FIG. 19 is a cross-sectional view of an operating device in accordance with a modification.

In the present embodiment, as seen in FIG. 16, the at least one substrate CR3 is entirely provided to the operating structure 12. As seen in FIG. 19, however, the at least one substrate CR3 can be at least partially provided to the clamp 20 if needed or desired. The at least two substrate CR3 includes the first substrate CR31 and a second substrate CR32. The first substrate CR31 is provided to the operating structure 12. The second substrate CR32 is provided to the clamp 20. The second substrate CR32 is secured to the clamp 20. The first terminal TM1 and the second terminal TM2 are attached to the clamp 20. The first terminal TM1 and the second terminal TM2 are electrically connected to the second substrate CR32. The second substrate CR32 is configured to be electrically connected to the first substrate CR31 via electric contacts respectively provided to the operating structure 12 and the clamp 20. Thus, the electric power source PS is held by the clamp 20 via the first terminal TM1 and the second terminal TM2.

Figure 20:
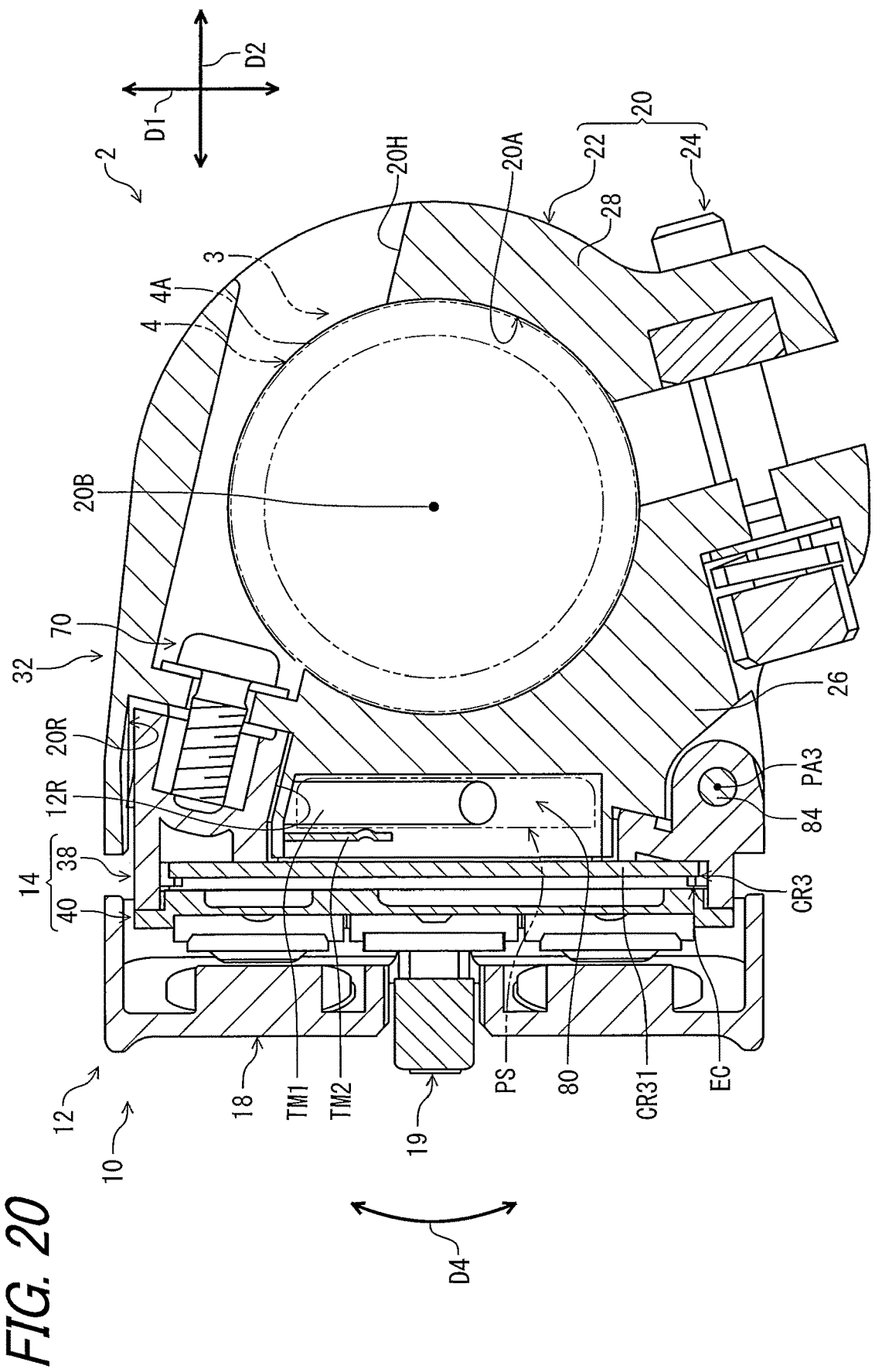
FIG. 20 is a cross-sectional view of an operating device in accordance with another modification.

Furthermore, as seen in FIG. 20, the second substrate CR32 can be omitted from the operating device 10 depicted in FIG. 19. In the modification depicted in FIG. 20, the first terminal TM1 and the second terminal TM2 are configured to be electrically connected to the first substrate CR31 via electric contacts respectively provided to the operating structure 12 and the clamp 20.

FIGS. 21 to 34 show an operating device 210 in accordance with a modification. The operating device 210 has substantially the same structure as the structure of the operating device 10.

Figure 21:
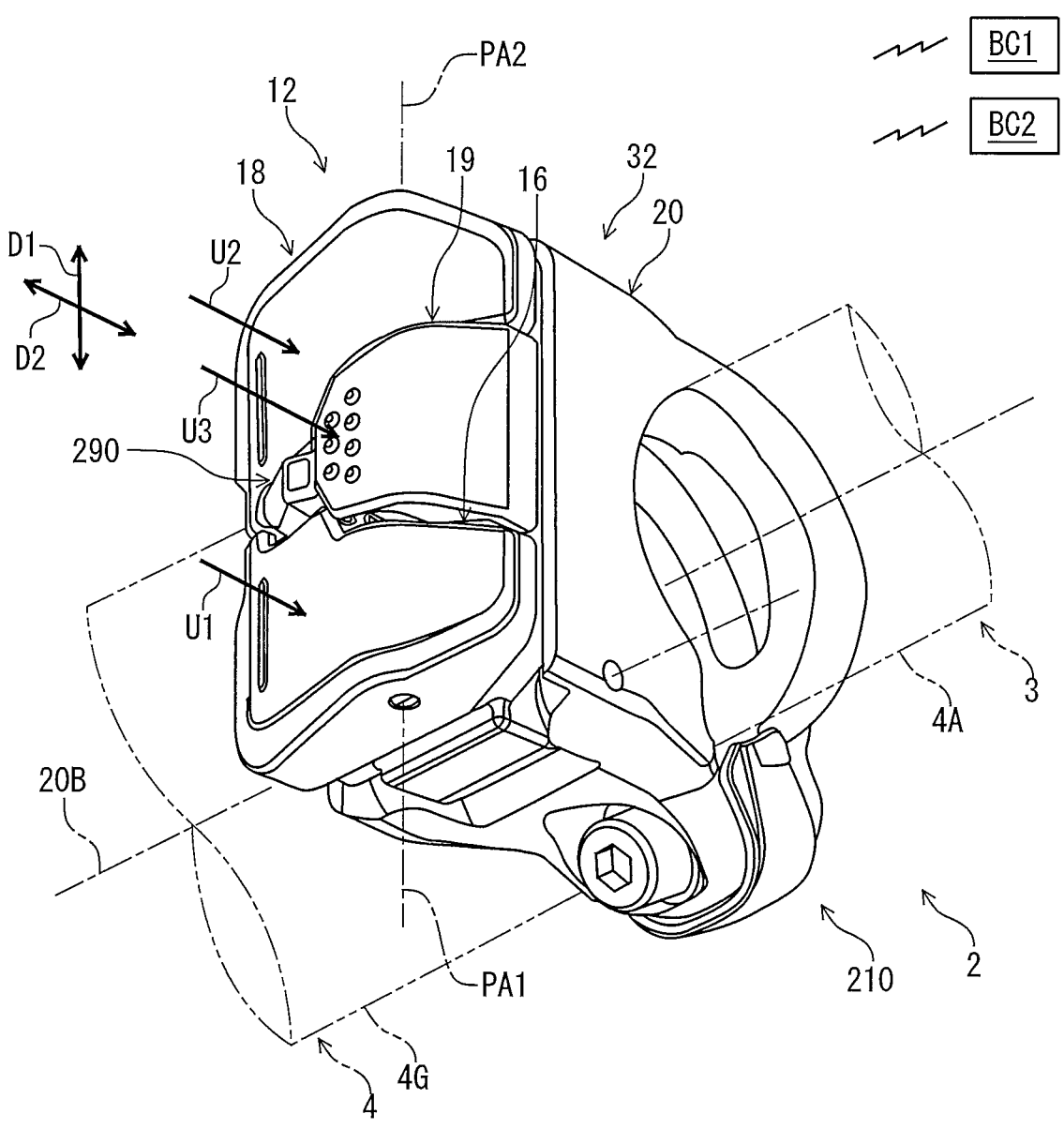
FIG. 21 is a perspective view of an operating device of a human-powered vehicle in accordance with another of the embodiments.

As seen in FIG. 21, the operating device 210 of the human-powered vehicle 2 comprises the base structure 32, the first operating member 16, and the second operating member 18. The base structure 32 is mountable to the human-powered vehicle 2. The base structure 32 is mountable to the vehicle body 3 of the human-powered vehicle 2. The base structure 32 is mountable to the handlebar 4 of the human-powered vehicle 2.

The first operating member 16 is movably coupled to the base structure 32 and is configured to receive the first user input operation U1. The second operating member 18 is movably coupled to the base structure 32 and is configured to receive the second user input operation U2. The first operating member 16 and the second operating member 18 are arranged in the first direction D1. The operating device 210 further comprises a third operating member 19. The third operating member 19 is movably coupled to the base structure 32 and is configured to receive the third user input operation U3. The operating device 210 is free of a brake lever.

Figure 22:
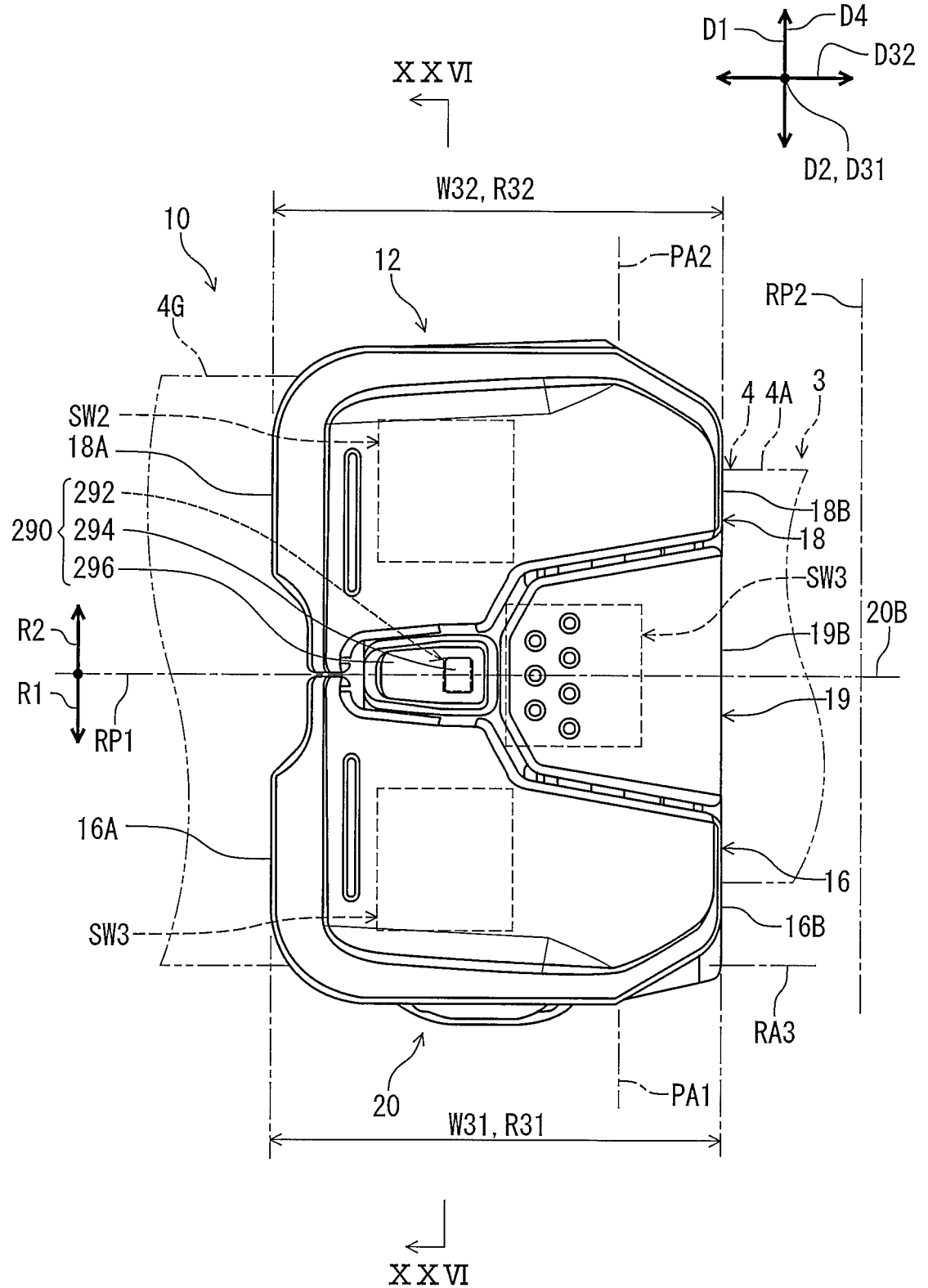
FIG. 22 is a side elevational view of the operating device illustrated in FIG. 21.

As seen in FIG. 22, the operating device 210 further comprises the first electric switch SW1 and the second electric switch SW2. The first electric switch SW1 is configured to be activated in response to the movement of the first operating member 16. The second electric switch SW2 is configured to be activated in response to the movement of the second operating member 18.

The operating device 210 of the human-powered vehicle 2 comprises a light emitter unit 290. The light emitter unit 290 is configured to emit light to the outside of the operating device 210. The light emitter unit 290 is provided in a position corresponding to the intermediate portion 52 of the operating device 10 illustrated in FIG. 5. The light emitter unit 290 is configured to indicate information relating to the human-powered vehicle 2. For example, the information includes at least one of a remaining level of the electric power source PS, a pairing mode of the operating device 210, a communication state of the operating device 210, a power-on of the operating device 210, a state of the electric device BC1, a state of the electric device BC2, and other notifications.

The light emitter unit 290 is at least partially provided between the first operating member 16 and the second operating member 18 in the first direction D1 as viewed in the second direction D2 intersecting the first direction D1. In the present embodiment, the light emitter unit 290 is entirely provided between the first operating member 16 and the second operating member 18 in the first direction D1 as viewed in the second direction D2. Alternatively, the light emitter unit 290 can be partially provided between the first operating member 16 and the second operating member 18 in the first direction D1 as viewed in the second direction D2.

The light emitter unit 290 and the third operating member 19 are arranged in the third direction D32 intersecting each of the first direction D1 and the second direction D2. The first operating member 16 has the first width W31 defined in the first direction D1. The second operating member 18 has the second width W32 defined in the first direction D1. The light emitter unit 290 is at least partially provided in a first operating-member region R31 defined in the first direction D1 by the first width W31. The light emitter unit 290 is at least partially provided in a second operating-member region R32 defined in the first direction D1 by the second width W32. In the present embodiment, the light emitter unit 290 is entirely provided in the first operating-member region R31. The light emitter unit 290 is entirely provided in the second operating-member region R32. Alternatively, the light emitter unit 290 can be partially provided in the first operating-member region R31. The light emitter unit 290 can be partially provided in the second operating-member region R32. The first direction D1 intersects the center axis 20B of the clamp 20.

Figure 23:
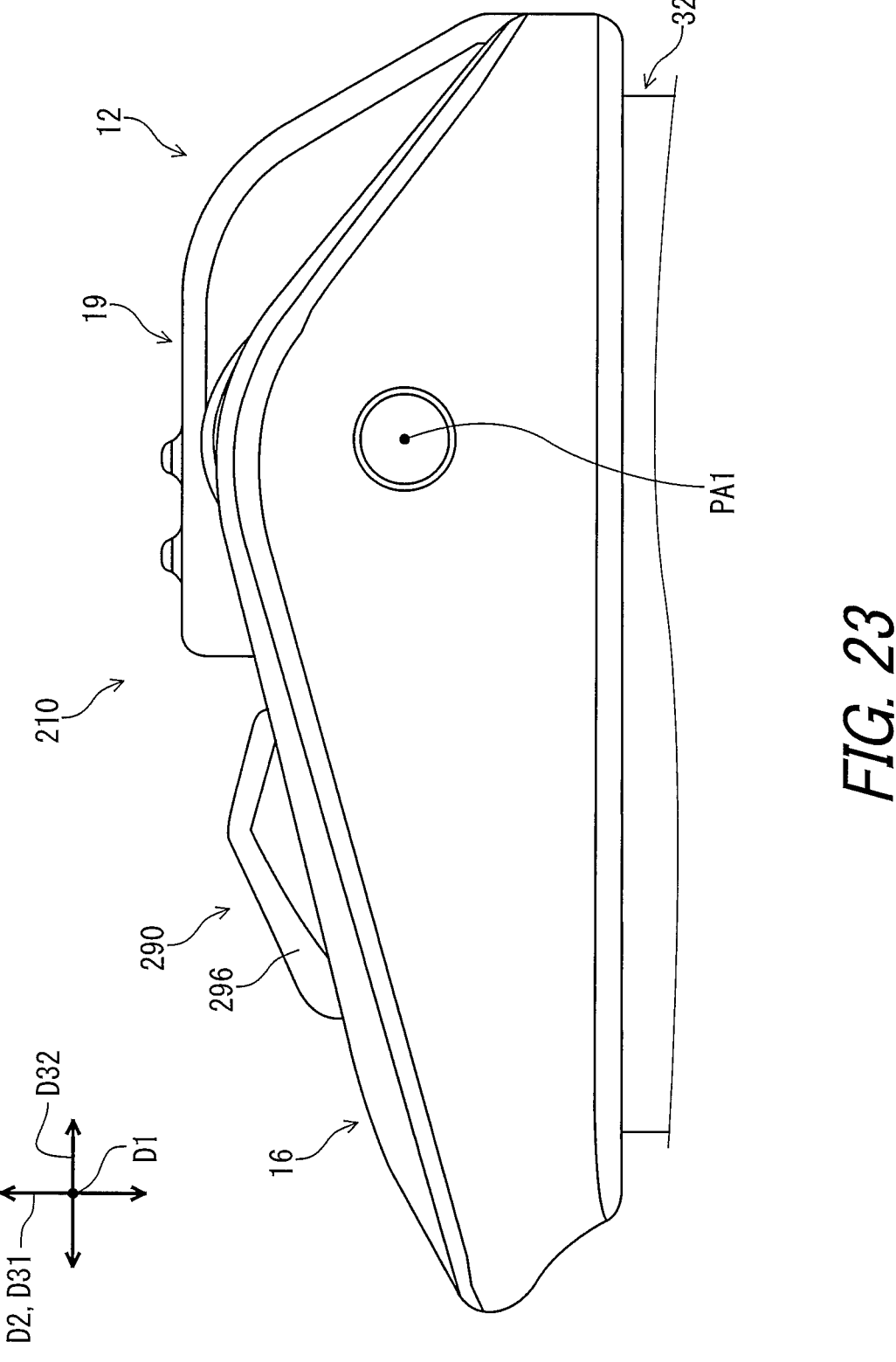
FIG. 23 is a partial side elevational view of the operating device illustrated in FIG. 21.
Figure 24:
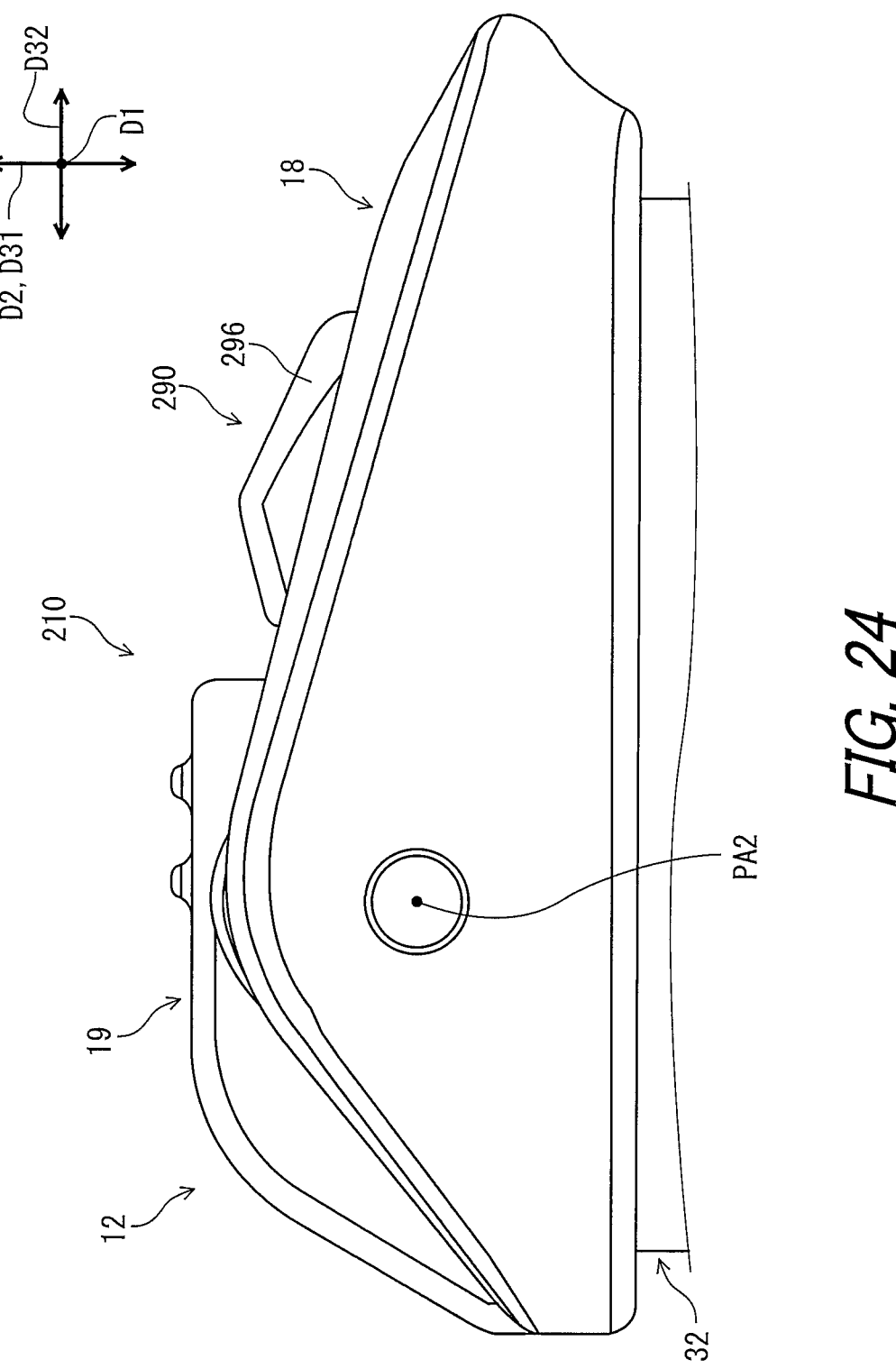
FIG. 24 is a partial side elevational view of the operating device illustrated in FIG. 21.

As seen in FIGS. 23 and 24, the light emitter unit 290 at least partially protrudes from at least one of the first operating member 16 and the second operating member 18 as viewed in the first direction D1.

As seen in FIG. 23, the light emitter unit 290 partially protrudes from the first operating member 16 as viewed in the first direction D1. Alternatively, the light emitter unit 290 can be provided to entirely protrude from the first operating member 16 as viewed in the first direction D1 if needed or desired.

As seen in FIG. 24, the light emitter unit 290 partially protrudes from the second operating member 18 as viewed in the first direction D1. Alternatively, the light emitter unit 290 can be provided to entirely protrude from the second operating member 18 as viewed in the first direction D1 if needed or desired.

Figure 25:
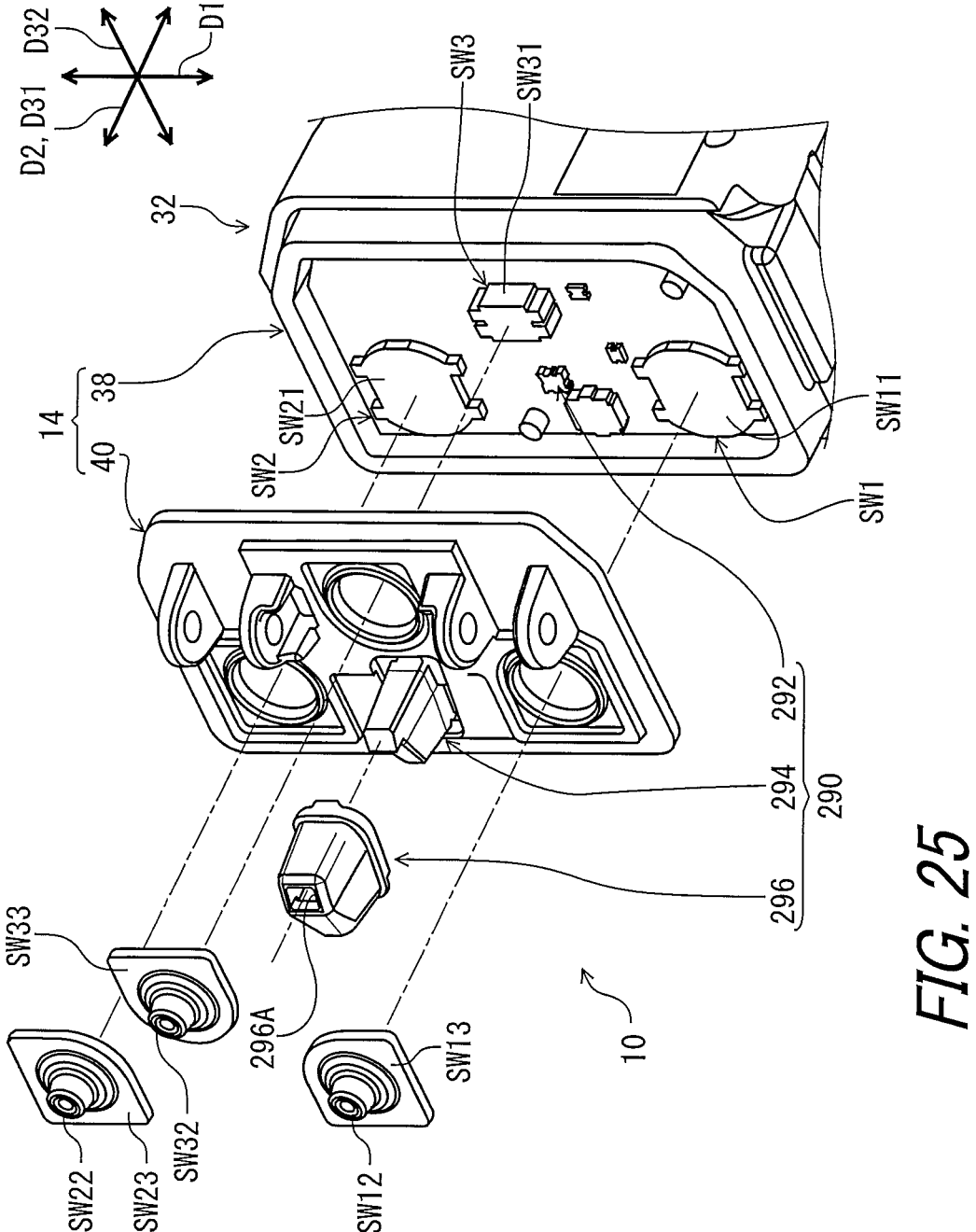
FIG. 25 is an exploded perspective view of the operating device illustrated in FIG. 21.

As seen in FIG. 25, the light emitter unit 290 includes a light emitter 292 and a light transmitting member 294. The light emitter 292 is configured to emit light. The light transmitting member 294 is configured to transmit light emitted from the light emitter 292. The light transmitting member 294 is configured to transmit light emitted from the light emitter 292 to the outside of the operating device 210. The light emitter 292 includes at least one light emitting diode (LED).

As seen in FIG. 21, at least one of the light emitter 292 and the light transmitting member 294 is at least partially provided between the first operating member 16 and the second operating member 18 in the first direction D1 as viewed in the second direction D2. In the present embodiment, the light emitter 292 is entirely provided between the first operating member 16 and the second operating member 18 in the first direction D1 as viewed in the second direction D2. The light transmitting member 294 is entirely provided between the first operating member 16 and the second operating member 18 in the first direction D1 as viewed in the second direction D2. Alternatively, the light emitter 292 can be partially provided between the first operating member 16 and the second operating member 18 in the first direction D1 as viewed in the second direction D2 if needed or desired. The light transmitting member 294 can be partially provided between the first operating member 16 and the second operating member 18 in the first direction D1 as viewed in the second direction D2 if needed or desired.

As seen in FIG. 25, the light emitter unit 290 includes an additional member 296 coupled to the light transmitting member 294. The additional member 296 is configured to partially cover the light transmitting member 294. The light transmitting member 294 is partially exposed from the additional member 296.

Figure 26:
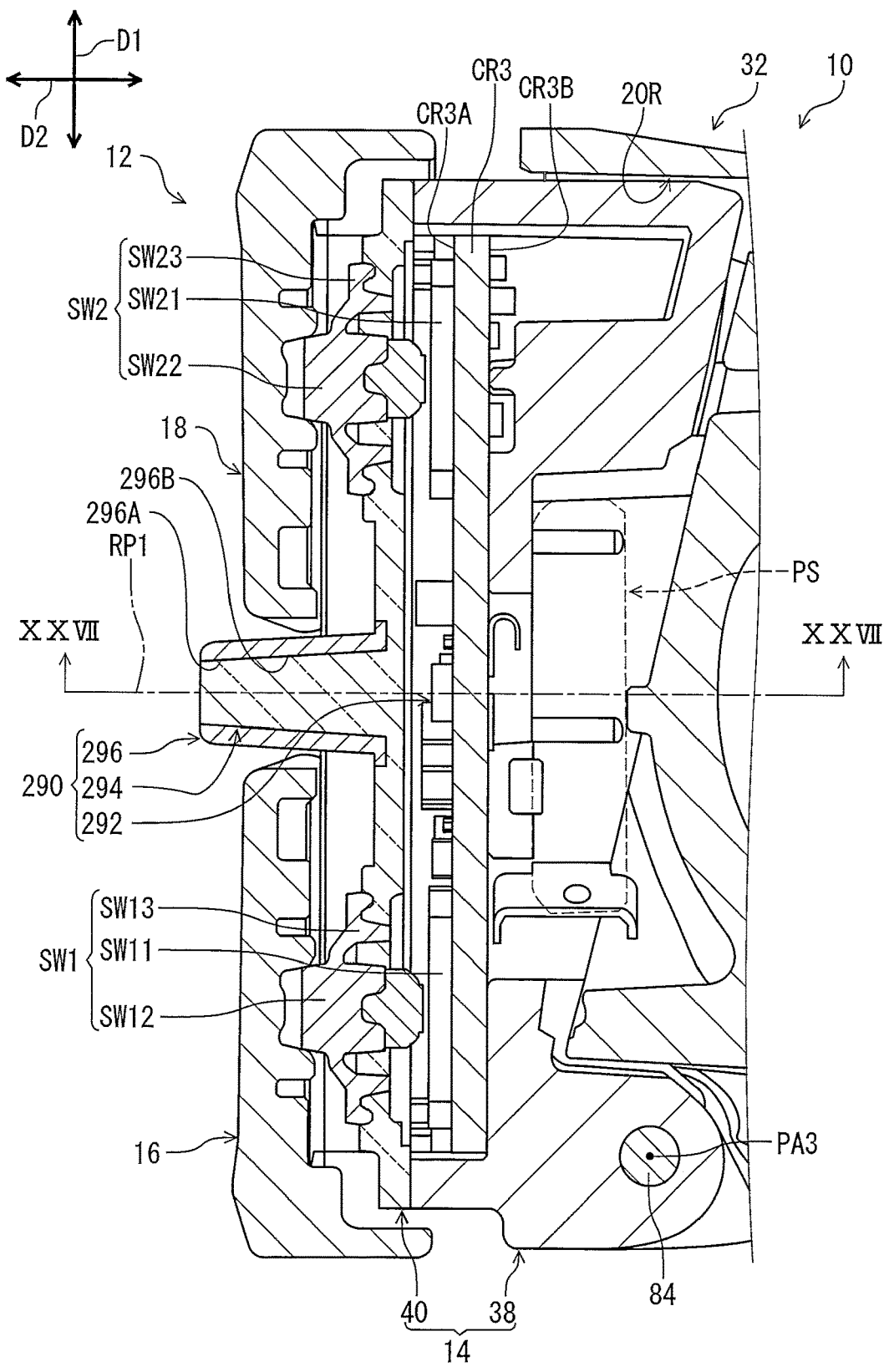
FIG. 26 is a cross-sectional view of the operating device taken along line XXVI-XXVI of FIG. 22.
Figure 27:
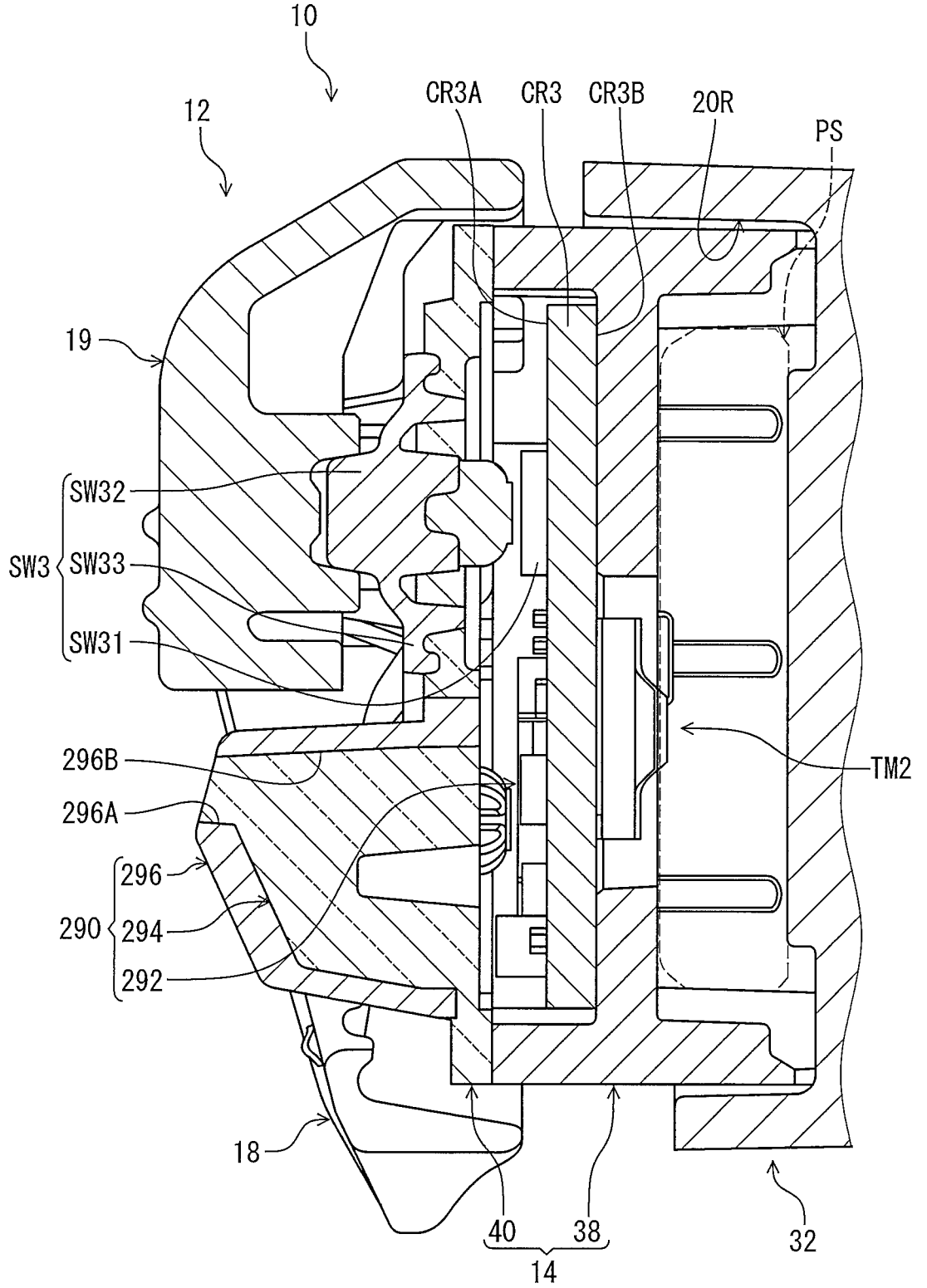
FIG. 27 is a cross-sectional view of the operating device taken along line XXVII-XXVII of FIG. 26.

As seen in FIGS. 26 and 27, the additional member 296 includes an opening 296A. The light transmitting member 294 is at least partially provided in the opening 296A. The additional member 296 includes an internal space 296B. The internal space 296B includes the opening 296A. The light transmitting member 294 is at least partially provided in the internal space 296B. For example, the light transmitting member 294 is partially provided in the opening 296A. The light transmitting member 294 is partially provided in the internal space 296B.

As seen in FIGS. 26 and 27, the additional member 296 is a separate member from the second base body 40. As seen in FIGS. 28 to 31, however, the additional member 296 can be integrally provided with the second base body 40 if needed or desired.

Figure 28:
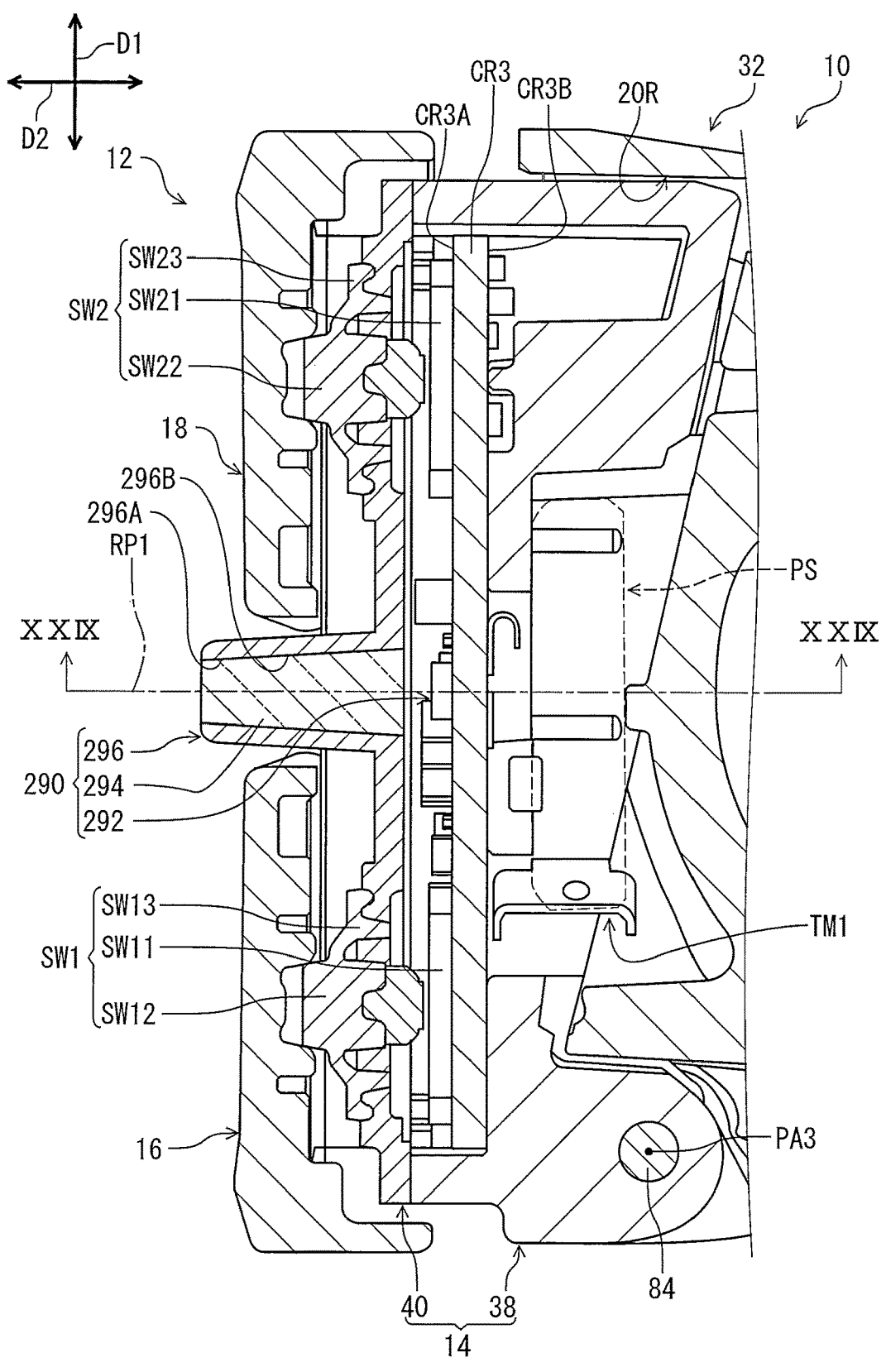
FIG. 28 is a cross-sectional view of the operating device in accordance with a first modification.
Figure 29:
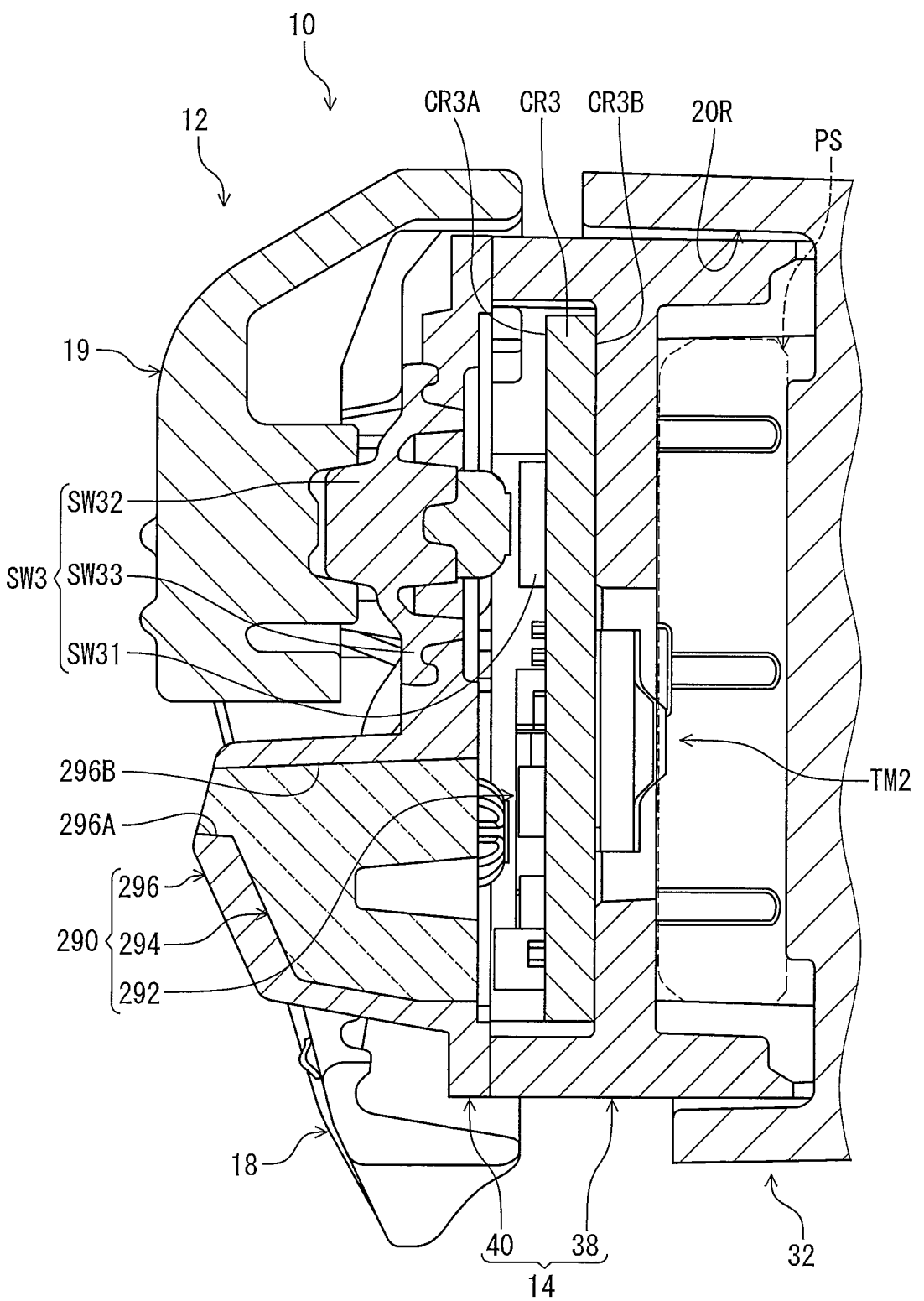
FIG. 29 is a cross-sectional view of the operating device taken along line XXIX-XXIX of FIG. 28.

In the modification depicted in FIGS. 28 and 29, the light transmitting member 294 is at least partially provided in the opening 296A. The light transmitting member 294 is at least partially provided in the internal space 296B. For example, the light transmitting member 294 is partially provided in the opening 296A. The light transmitting member 294 is entirely provided in the internal space 296B.

Figure 30:
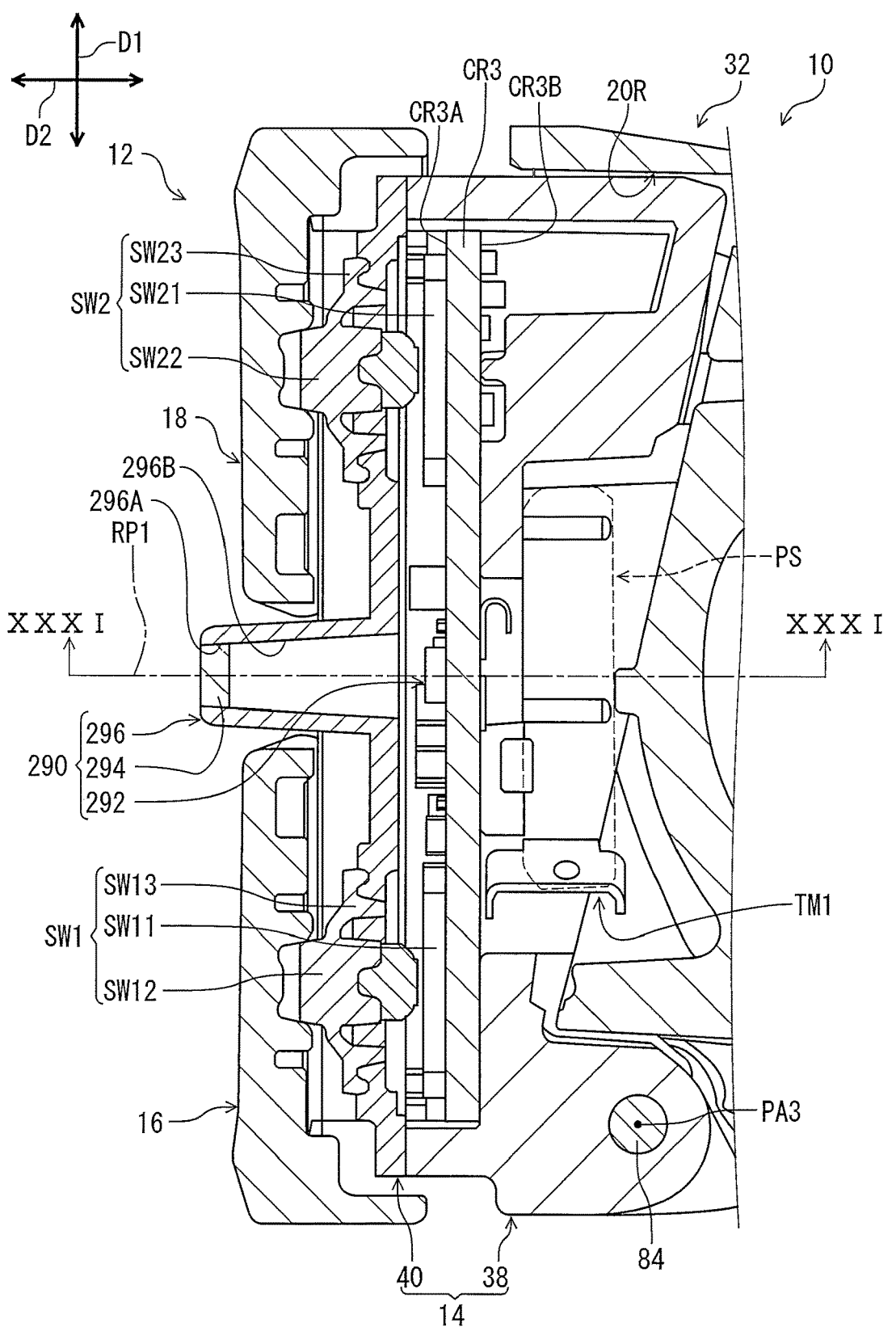
FIG. 30 is a cross-sectional view of the operating device in accordance with a second modification.
Figure 31:
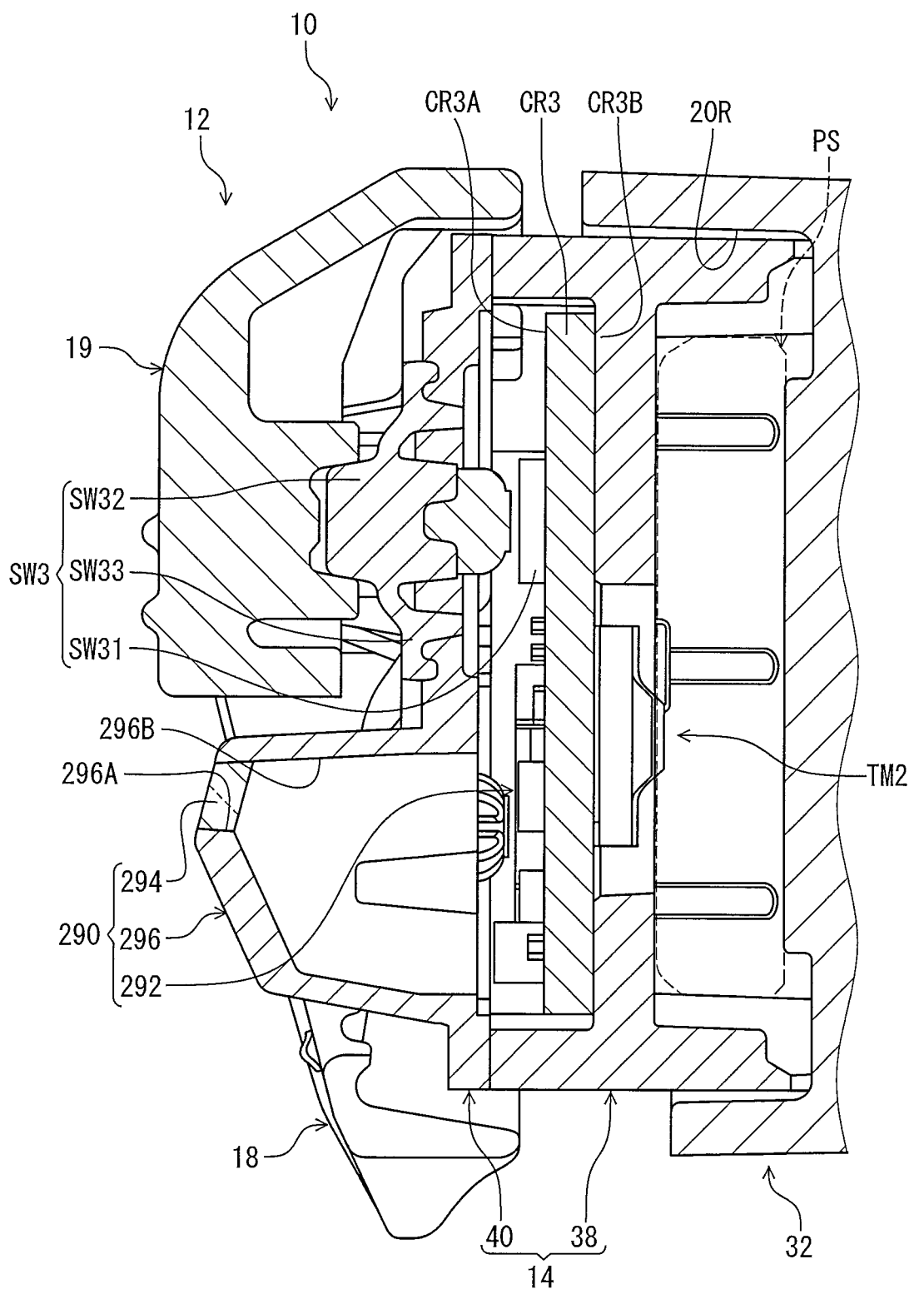
FIG. 31 is a cross-sectional view of the operating device taken along line XXXI-XXXI of FIG. 30.

In the modification depicted in FIGS. 30 and 31, the light transmitting member 294 is at least partially provided in the opening 296A. The light transmitting member 294 is at least partially provided in the internal space 296B. For example, the light transmitting member 294 is entirely provided in the opening 296A. The light transmitting member 294 is entirely provided in the internal space 296B.

As seen in FIGS. 26 and 27, the light transmitting member 294 is integrally provided with at least part of the base structure 32 as a one-piece unitary member. The light transmitting member 294 is integrally provided with the second base body 40 of the base structure 32 as a one-piece unitary member. Alternatively, the light transmitting member 294 can be a separate member from the second base body 40 of the base structure 32 if needed or desired.

The light transmitting member 294 has first light transmittance. The additional member 296 has second light transmittance. The first light transmittance is higher than the second light transmittance. For example, the second light transmittance is zero. Namely, the additional member 296 is configured to block light which is to be emitted from the light transmitting member 294 except for light emitted through the opening 296A of the additional member 296. In the present embodiment, the second base body 40 has the first light transmittance since the light transmitting member 294 is integrally provided with the second base body 40 as a one-piece unitary member. The light transmitting member 294 is made of a translucent material. Examples of the material of the light transmitting member 294 include Acrylonitrile-Ethylene-Styrene (ABS) resin. Alternatively, the light transmitting member 294 can be at least partially made of a transparent material if needed or desired.

As seen in FIGS. 26 and 27, the operating device 210 further comprises the substrate CR3. The substrate CR3 has a first surface CR3A and a second surface CR3B. The second surface CR3B is provided on a reverse side of the first surface CR3A.

As seen in FIG. 26, the first electric switch SW1 and the second electric switch SW2 are provided on the first surface CR3A. The first electric switch SW1 and the second electric switch SW2 are electrically mounted on the first surface CR3A. The switch circuit SW11 of the first electric switch SW1 is provided on the first surface CR3A. The switch circuit SW21 of the second electric switch SW2 is provided on the first surface CR3A. The switch circuit SW11 of the first electric switch SW1 is electrically mounted on the first surface CR3A. The switch circuit SW21 of the second electric switch SW2 is electrically mounted on the first surface CR3A.

As seen in FIG. 27, the third electric switch SW3 is provided on the first surface CR3A. The third electric switch SW3 is electrically mounted on the first surface CR3A.

As seen in FIG. 26, the light emitter 292 is provided on the first surface CR3A. The light emitter 292 is electrically mounted on the first surface CR3A. The substrate CR3 is fastened to the base structure 32 with at least one fastener such as a screw. Thus, the light emitter 292 is fixedly coupled to the base structure 32.

Figure 32:
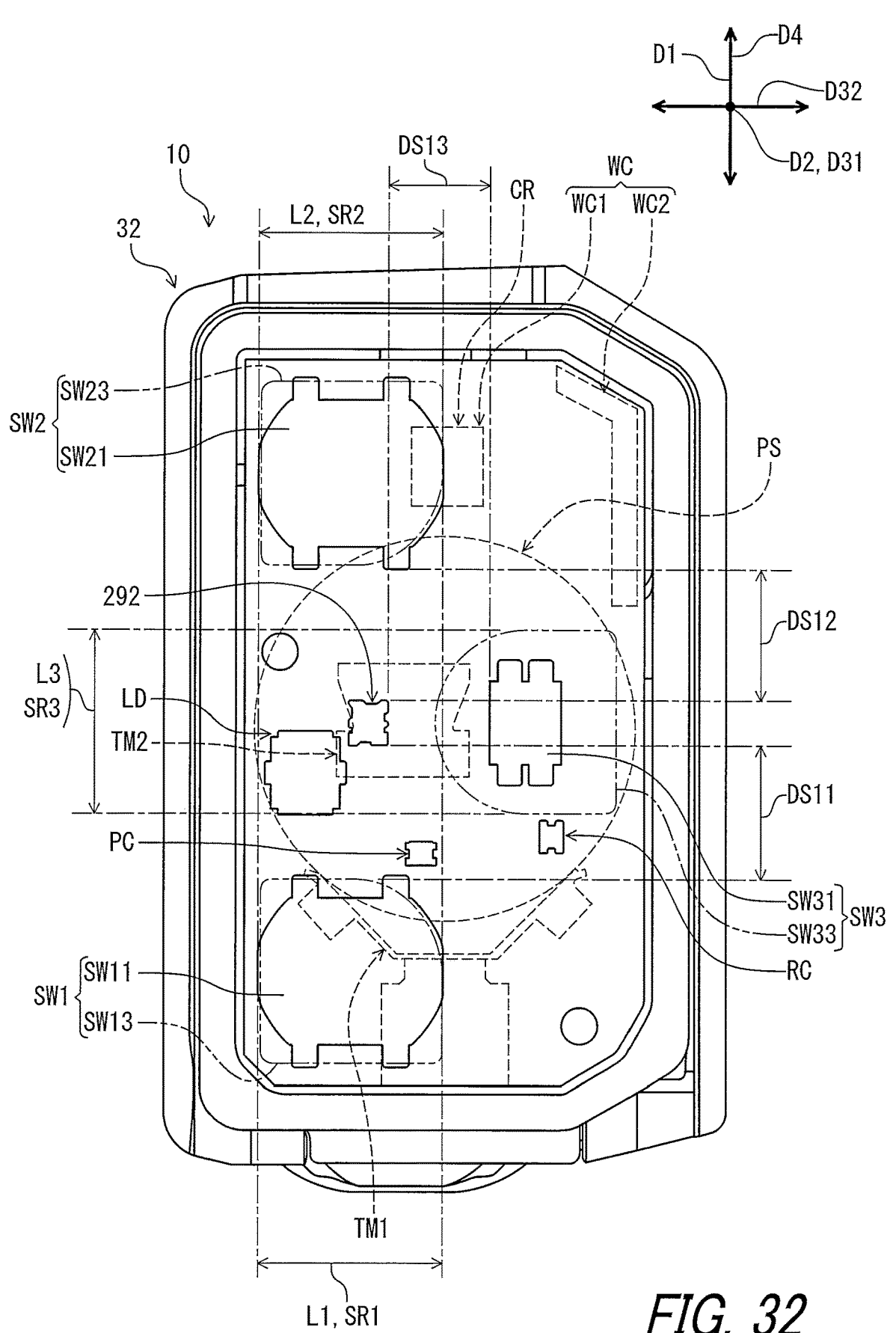
FIG. 32 is a plan view of a substrate and electronic parts of the operating device illustrated in FIG. 21 (first surface).

As seen in FIG. 32, the light emitter 292 is at least partially provided between the first electric switch SW1 and the second electric switch SW2 in the first direction D1 as viewed in the second direction D2. For example, the light emitter 292 is entirely provided between the first electric switch SW1 and the second electric switch SW2 in the first direction D1 as viewed in the second direction D2. Alternatively, the light emitter 292 can be partially provided between the first electric switch SW1 and the second electric switch SW2 in the first direction D1 as viewed in the second direction D2 if needed or desired.

Figure 33:
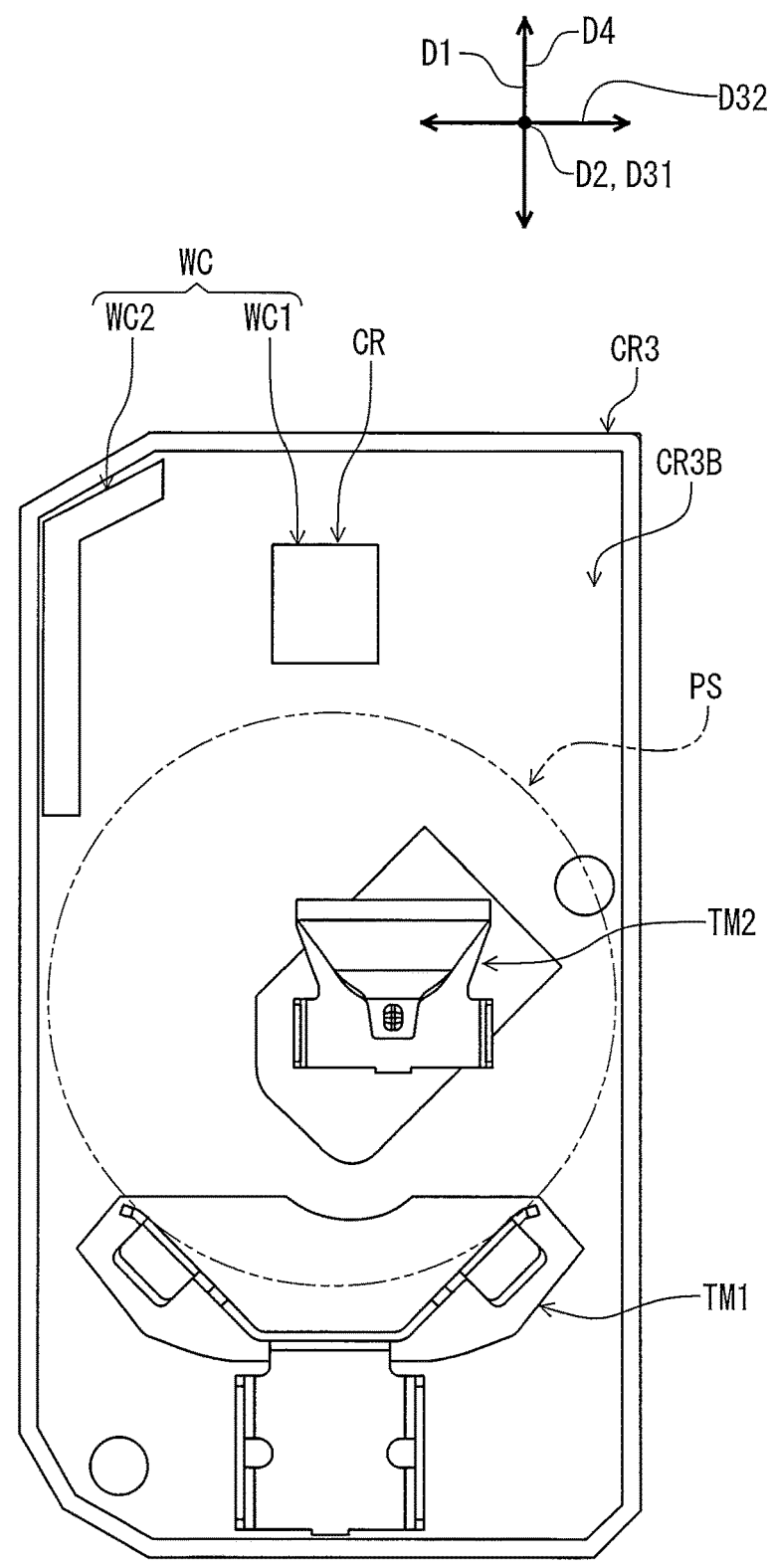
FIG. 33 is a plan view of the substrate and electronic parts of the operating device illustrated in FIG. 21 (second surface).

As seen in FIG. 33, the electronic controller CR is provided on the second surface CR3B. The wireless communicator WC is at least partially provided on the second surface CR3B. The wireless communicator WC includes a wireless communicator circuit WC1 and an antenna WC2. The wireless communicator circuit WC1 is electrically connected to the antenna WC2. The wireless communicator circuit WC1 is configured to wirelessly communicate with another wireless communicator via the antenna WC2. The wireless communicator circuit WC1 includes the signal transmitting circuit or circuitry and the signal receiving circuit or circuitry. The wireless communicator circuit WC1 is provided on the second surface CR3B.

In FIG. 33, the electronic controller CR and the wireless communicator circuit WC1 are integrally provided as a one-piece chip. Alternatively, the electronic controller CR can be provided separately from the wireless communicator circuit WC1 if needed or desired.

The operating device 210 further comprises the terminal TM1. The terminal TM1 is configured to be in contact with the electric power source PS. The operating device 210 further comprises the terminal TM2. The terminal TM2 is configured to be in contact with the electric power source PS.

The terminal TM1 is provided on at least one of the first surface CR3A and the second surface CR3B. The terminal TM2 is provided on at least one of the first surface CR3A and the second surface CR3B.

Figure 34:
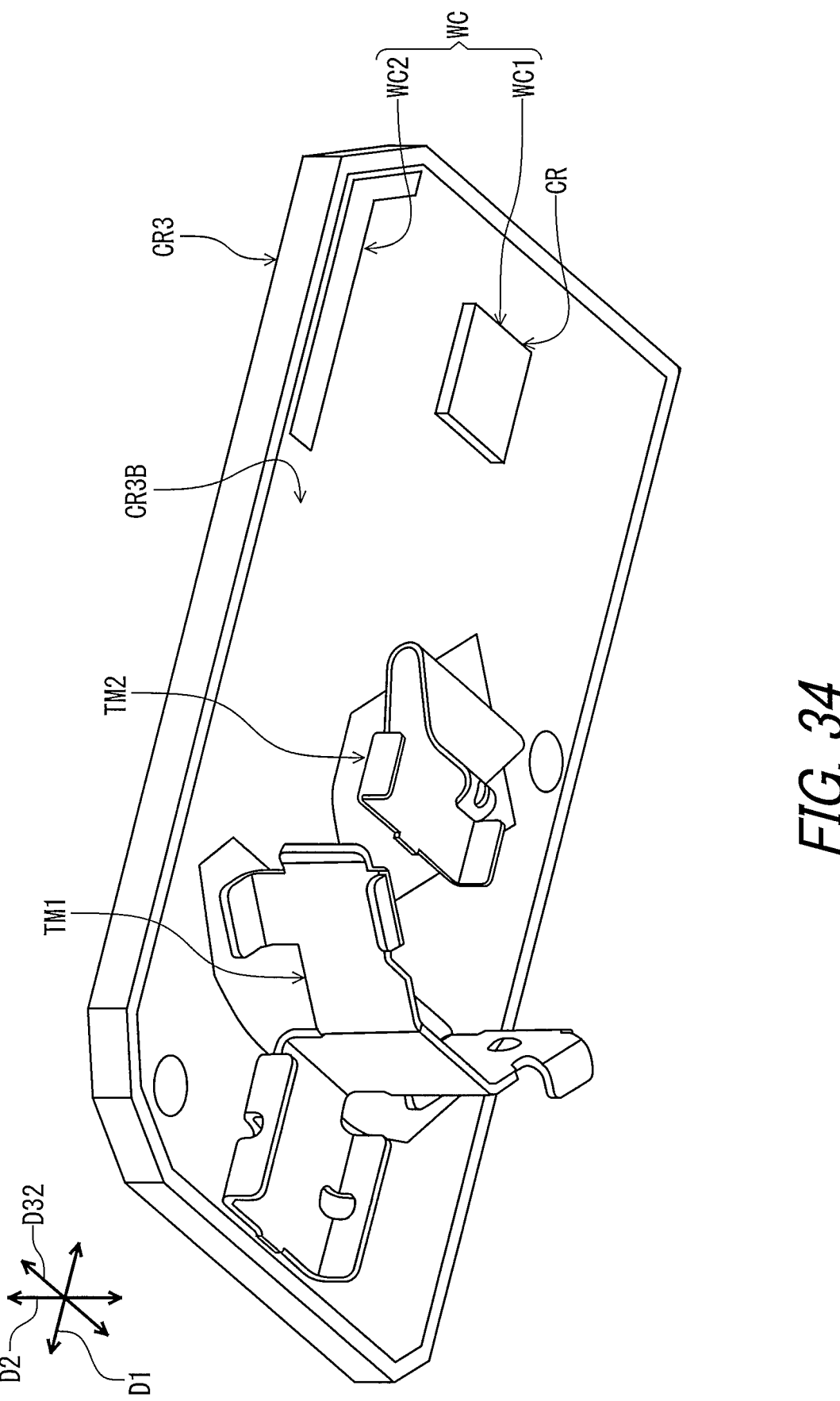
FIG. 34 is a perspective view of the substrate and electronic parts of the operating device illustrated in FIG. 21.

As seen in FIG. 34, for example, the terminal TM1 is provided on the second surface CR3B. The terminal TM2 is provided on the second surface CR3B. Alternatively, the terminal TM1 can be provided on the first surface CR3A or both the first surface CR3A and the second surface CR3B if needed or desired. The terminal TM2 can be provided on the first surface CR3A or both the first surface CR3A and the second surface CR3B if needed or desired. In a case where the terminal TM1 is provided on both the first surface CR3A and the second surface CR3B, the electric power source PS includes at least two electric power sources provided on the first surface CR3A and the second surface CR3B, the terminal TM1 includes at least two terminal parts provided on the first surface CR3A and the second surface CR3B. In a case where the terminal TM2 is provided on both the first surface CR3A and the second surface CR3B, the electric power source PS includes at least two electric power sources provided on the first surface CR3A and the second surface CR3B, the terminal TM2 includes at least two terminal parts provided on the first surface CR3A and the second surface CR3B.

Figure 35:
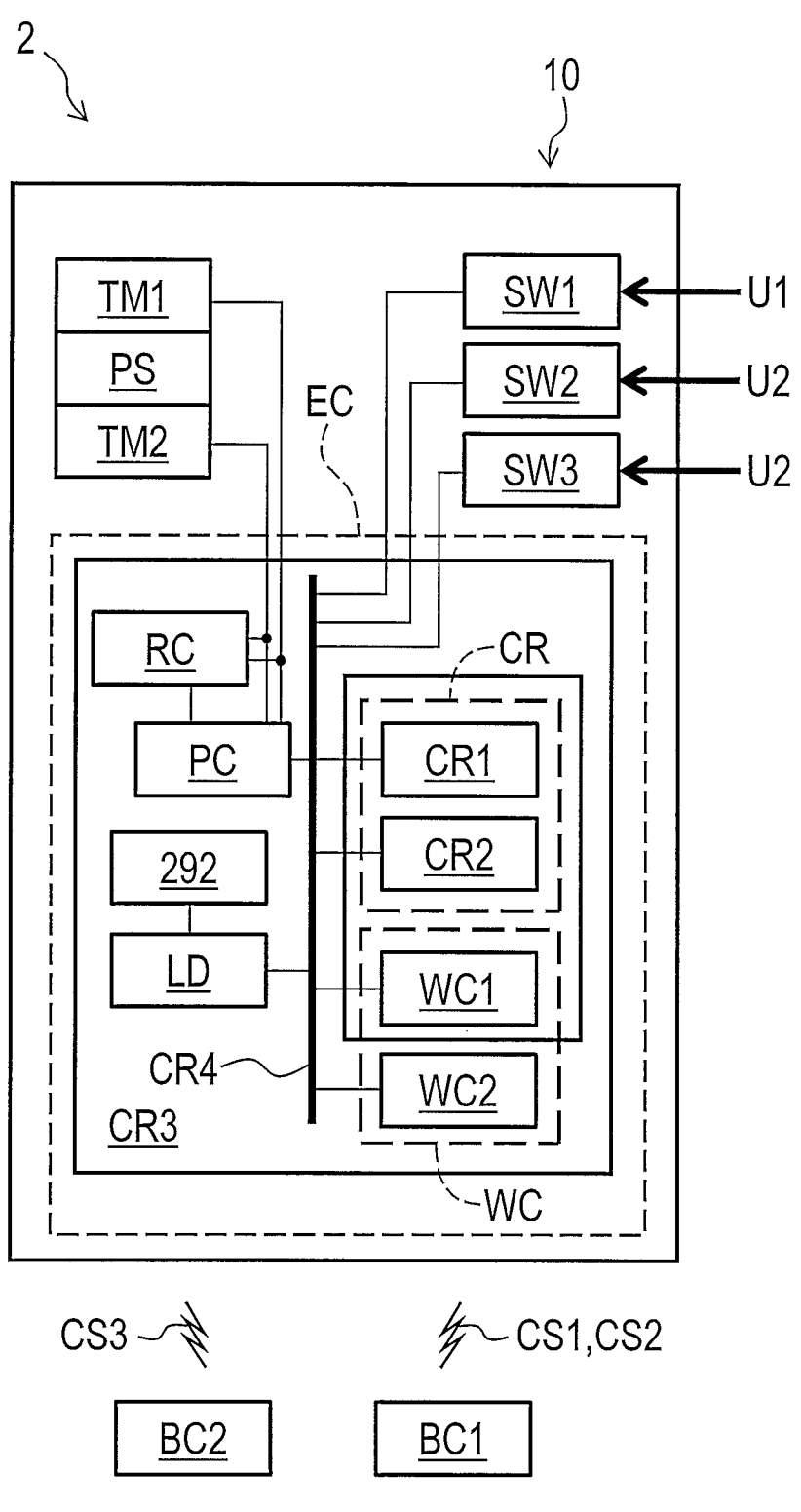
FIG. 35 is a schematic block diagram of the human-powered vehicle illustrated in FIG. 21.

As seen in FIG. 35, the electronic circuitry EC includes a light emitter driver LD. The light emitter driver LD is electrically connected to the light emitter 292 to control at least one of a voltage and a current applied to the light emitter 292. The light emitter driver LD is configured to manage at least one of the voltage and the current of the light emitter 292 and is configured to control the light emission of the light emitter 292 by supplying an adequate current to the light emitter 292. The light emitter driver LD is electrically connected to the electronic controller CR. The electronic controller CR is configured to control the light emitter 292 via the light emitter driver LD. The electronic controller CR is configured to control the light emitter 292 to turn on or off via the light emitter driver LD. The electronic controller CR is configured to control the light emitter 292 to change a color of light emitted from the light emitter 292 via the light emitter driver LD. The electronic controller CR is configured to control the light emitter 292 to change a pattern of the light emission of the light emitter 292 via the light emitter driver LD.

The electronic circuitry EC includes a power controller PC. The power controller PC is configured to control a voltage supplied from the electric power source PS to stabilize the operation of the electronic controller CR and the light emitter driver LD.

The electronic circuitry EC includes a reset controller RC. The reset controller RC is configured to operate the electronic controller CR in low temperature environments or when the remaining level of the electric power source PS is low. To increase the remaining level of the electric power source PS to a level which is enough to supply electricity from the power controller PC to the electronic controller CR, for example, the reset controller RC is configured to control the power controller PC to interrupt electricity supplied from the power controller PC to the electronic controller CR when the remaining level of the electric power source PS is low.

As seen in FIG. 32, the light emitter driver LD, the power controller PC, and the reset controller RC are provided on the first surface CR3A of the substrate CR3. The light emitter driver LD is at least partially provided between the first electric switch SW1 and the second electric switch SW2 in the first direction D1. The first electric switch SW1 is closer to the light emitter driver LD than the second electric switch SW2 in the first direction D1. A first distance DS11 defined between the first electric switch SW1 and the light emitter driver LD in the first direction D1 is greater than a second distance DS12 defined between the second electric switch SW2 and the light emitter driver LD in the first direction D1. Alternatively, the second electric switch SW2 can be closer to the light emitter driver LD than the first electric switch SW1 in the first direction D1 if needed or desired. The first distance DS11 can be less than or equal to the second distance DS12 if needed or desired.

The first electric switch SW1 has a first length L1 defined in the third direction D32. The second electric switch SW2 has a second length L2 defined in the third direction D32. The first electric switch SW1 defines a first switch region SR1 in the third direction D32. The first switch region SR1 corresponds to the first length L1. The second electric switch SW2 defines a second switch region SR2 in the third direction D32. The second switch region SR2 corresponds to the second length L2. The light emitter 292 is at least partially provided in the first switch region SR1. The light emitter 292 is at least partially provided in the second switch region SR2. For example, the light emitter 292 is entirely provided in the first switch region SR1. The light emitter 292 is entirely provided in the second switch region SR2. Alternatively, the light emitter 292 can be partially provided in the first switch region SR1 if needed or desired. The light emitter 292 can be partially provided in the second switch region SR2 if needed or desired.

The third electric switch SW3 has a third length L3 defined in the third direction D32. The third electric switch SW3 defines a third switch region SR3 in the third direction D32. The third switch region SR3 corresponds to the third length L3. The light emitter 292 is at least partially provided in the third switch region SR3. For example, the light emitter 292 is entirely provided in the third switch region SR3. Alternatively, the light emitter 292 can be partially provided in the third switch region SR3 if needed or desired.

As seen in FIG. 32, the light emitter 292 is at least partially provided in a terminal region TR2 defined as an outline of the terminal TM2 as viewed in the second direction D2. The light emitter 292 is at least partially provided in a battery region BR defined as an outline of the electric power source PS as viewed in the second direction D2 in a state where the electric power source PS is provided in the holder space 80 (see e.g., FIG. 13). For example, the light emitter 292 is partially provided in the terminal region TR2 as viewed in the second direction D2. The light emitter 292 is entirely provided in the battery region BR as viewed in the second direction D2 in the state where the electric power source PS is provided in the holder space 80 (see e.g., FIG. 13). Alternatively, the light emitter 292 can be entirely provided in the terminal region TR2 as viewed in the second direction D2 if needed or desired. The light emitter 292 can be partially provided in the battery region BR as viewed in the second direction D2 in the state where the electric power source PS is provided in the holder space 80 (see e.g., FIG. 13) if needed or desired.

The second electric switch SW2 is provided to at least partially overlap at least one of the electronic controller CR and the wireless communicator WC as viewed in the second direction D2. For example, the second electric switch SW2 is provided to partially overlap the electronic controller CR and the wireless communicator WC as viewed in the second direction D2. Alternatively, the second electric switch SW2 can be provided to entirely overlap at least one of the electronic controller CR and the wireless communicator WC as viewed in the second direction D2 if needed or desired.

The second electric switch SW2 is closer to the antenna WC2 than the first electric switch SW1 as viewed in the second direction D2. The third electric switch SW3 is closer to the antenna WC2 than the second electric switch SW2 as viewed in the second direction D2.

In the modification depicted in FIG. 32, the positional relationships described above are not limited to the positional relationships depicted in FIG. 32.

Figure 37:
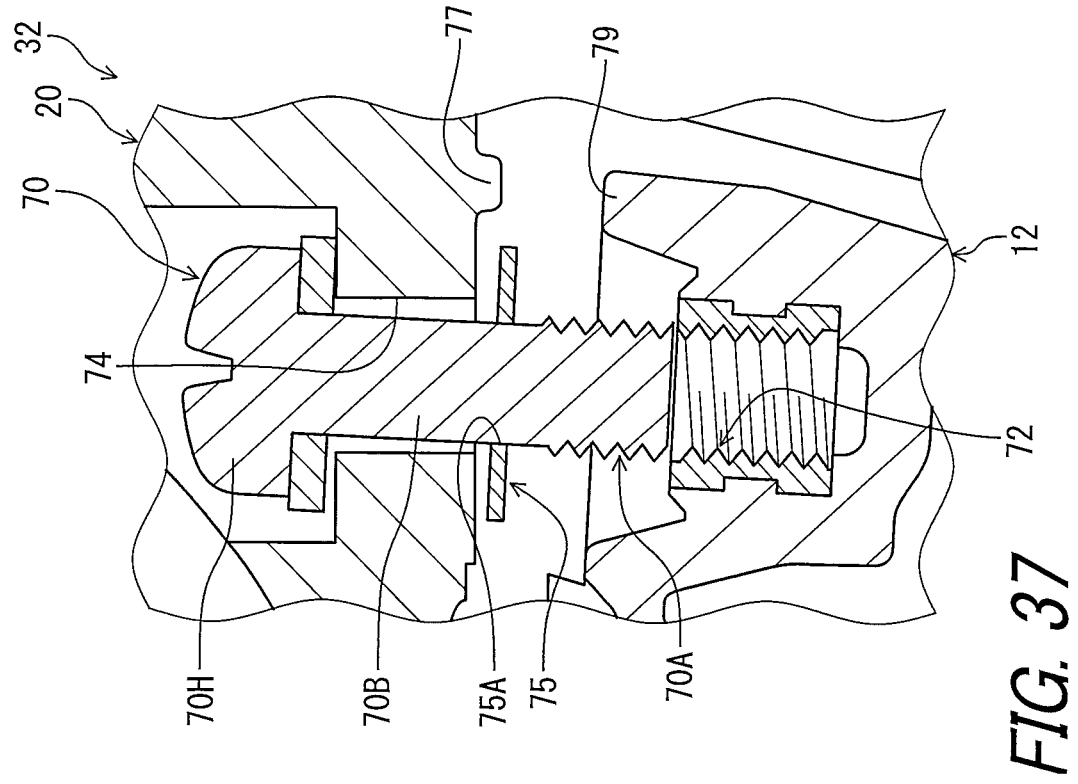
FIG. 37 is a cross-sectional view of the operating device in accordance with the embodiments in a state where the operating structure is not fastened to the base structure with the fastener.
Figure 36:
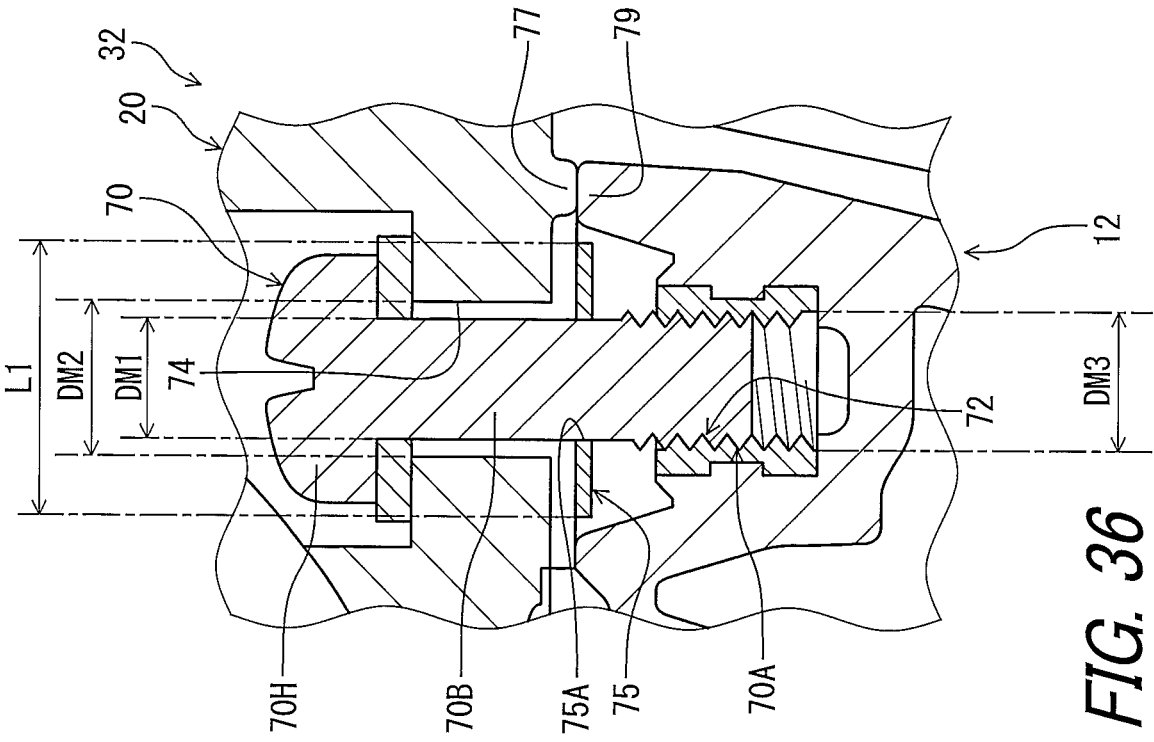
FIG. 36 is a cross-sectional view of the operating device in accordance with the embodiments in a state where an operating structure is fastened to a base structure with a fastener.

As seen in FIGS. 36 and 37, a restriction member 75 can be attached to the fastener 70. The restriction member 75 is attached to the fastener 70 to restrict the fastener 70 from falling off the clamp 20. For example, the restriction member 75 has an annular shape and includes a hole 75A. The fastener 70 extends through the hole 75A. The restriction member 75 is made of a non-metallic material or a metallic material. Examples of the non-metallic material include an elastic material. Examples of the fastener 70 include a non-metallic washer, a metallic washer, a snap ring, an O ring, a ring having a C-shape, and a pin.

The base structure 32 includes the through hole 74. The fastener 70 extends through the through hole 74. The fastener 70 includes a fastener body 70B and a head 70H. The head 70H is provided to an end of the fastener body 70B. The fastener body 70B includes the externally threaded portion 70A. The externally threaded portion 70A is engaged with the threaded hole 72 to fasten the operating structure 12 to the clamp 20 of the base structure 32.

As seen in FIG. 36, the restriction member 75 has an outer length L4. The hole 75A has an inner diameter DM4. The through hole 74 has an inner diameter DM5. The externally threaded portion 70A has an outer diameter DM6. The outer length L4 of the restriction member 75 is larger than the inner diameter DM5 of the through hole 74. The inner diameter DM4 of the hole 75A is smaller than the outer diameter DM6 of the externally threaded portion 70A. Thus, as seen in FIG. 37, the restriction member 75 restricts the fastener 70 from falling off the through hole 74 in a state where the fastener 70 is not threadedly engaged with the operating structure 12.

As seen in FIG. 36, the base structure 32 includes a first contact portion 77. The operating structure 12 includes a second contact portion 79. The first contact portion 77 is in contact with the second contact portion 79 in a state where the fastener 70 is threadedly engaged with the operating structure 12. The restriction member 75 is spaced apart from the first contact portion 77 and the second contact portion 79 in the state where the fastener 70 is threadedly engaged with the operating structure 12. Thus, the restriction member 75 is not provided between the first contact portion 77 and the second contact portion 79 in the state where the fastener 70 is threadedly engaged with the operating structure 12.

In the present application, the term "comprising" and its derivatives, as used herein, are intended to be open ended terms that specify the presence of the stated features, elements, components, groups, integers, and/or steps, but do not exclude the presence of other unstated features, elements, components, groups, integers and/or steps. This concept also applies to words of similar meaning, for example, the terms "have," "include" and their derivatives.

The terms "member," "section," "portion," "part," "element," "body" and "structure" when used in the singular can have the dual meaning of a single part or a plurality of parts.

The ordinal numbers such as "first" and "second" recited in the present application are merely identifiers, but do not have any other meanings, for example, a particular order and the like. Moreover, for example, the term "first element" itself does not imply an existence of "second element," and the term "second element" itself does not imply an existence of "first element."

The term "pair of," as used herein, can encompass the configuration in which the pair of elements have different shapes or structures from each other in addition to the configuration in which the pair of elements have the same shapes or structures as each other.

The terms "a" (or "an"), "one or more" and "at least one" can be used interchangeably herein.

The phrase "at least one of" as used in this disclosure means "one or more" of a desired choice. For one example, the phrase "at least one of" as used in this disclosure means "only one single choice" or "both of two choices" if the number of its choices is two. For other example, the phrase "at least one of" as used in this disclosure means "only one single choice" or "any combination of equal to or more than two choices" if the number of its choices is equal to or more than three. For instance, the phrase "at least one of A and B" encompasses (1) A alone, (2), B alone, and (3) both A and B. The phrase "at least one of A, B, and C" encompasses (1) A alone, (2), B alone, (3) C alone, (4) both A and B, (5) both B and C, (6) both A and C, and (7) all A, B, and C. In other words, the phrase "at least one of A and B" does not mean "at least one of A and at least one of B" in this disclosure.

Finally, terms of degree such as "substantially," "about" and "approximately" as used herein mean a reasonable amount of deviation of the modified term such that the end result is not significantly changed. All of numerical values described in the present application can be construed as including the terms such as "substantially," "about" and "approximately."

Obviously, numerous modifications and variations of the present invention are possible in light of the above teachings. It is therefore to be understood that within the scope of the appended claims, the invention may be practiced otherwise than as specifically described herein.

What is claimed is:

1. An operating device of a human-powered vehicle, the operating device comprising:
   a base structure mountable to the human-powered vehicle;
   a first operating member pivotally coupled to the base structure about a first pivot axis;
   a second operating member pivotally coupled to the base structure about a second pivot axis, the first operating member and the second operating member being arranged in a first direction;
   a first electric switch at least partially provided between the first operating member and the base structure;
   a second electric switch at least partially provided between the second operating member and the base structure; and
   at least one of the first pivot axis and the second pivot axis extending along the first direction.

2. The operating device according to claim 1, wherein at least one of the first pivot axis and the second pivot axis is parallel to the first direction.

3. The operating device according to claim 1, wherein the first pivot axis is coincident with the second pivot axis.

4. The operating device according to claim 1, wherein the second operating member is spaced apart from the first operating member in the first direction.

5. The operating device according to claim 1, further comprising:
   a third operating member at least partially provided between the first operating member and the second operating member in the first direction, the third operating member being movable relative to the base structure in a second direction intersecting the first direction; and
   a third electric switch at least partially provided between the third operating member and the base structure, the third electric switch being configured to be activated in response to a movement of the third operating member.

6. The operating device according to claim 5, wherein the base structure includes a clamp,
   the clamp includes a clamp opening through which the handlebar is to extend, the clamp opening having a center axis,
   the third operating member includes a third inclined surface, and
   the third inclined surface is non-parallel to and non-perpendicular to the center axis of the clamp opening.

7. The operating device according to claim 1, wherein one of the first operating member and the second operating member is arranged to avoid overlapping the other of the first operating member and the second operating member as viewed in a third direction perpendicular to one of the first pivot axis and the second pivot axis.

8. The operating device according to claim 1, wherein the base structure includes a clamp, and
   the clamp is configured to couple the base structure and a handlebar of the human-powered vehicle.

9. The operating device according to claim 1, wherein the clamp includes a clamp opening through which the handlebar is to extend, the clamp opening having a center axis,
   the base structure has a base width defined along the center axis of the clamp opening as a maximum width of the base structure,
   the clamp opening has a clamp width defined along the center axis of the clamp opening as a minimum width of the clamp opening, and
   a ratio of the clamp width to the base width is less than or equal to 45%.

10. The operating device according to claim 9, wherein the first operating member has a first width defined along the center axis of the clamp opening,
    the second operating member has a second width defined along the center axis of the clamp opening, and
    at least one of a first ratio of the clamp width to the first width and a second ratio of the clamp width to the second width is less than or equal to 45%.

11. The operating device according to claim 9, wherein at least one of the first pivot axis and the second pivot axis is provided outside a region defined by the clamp width along the center axis of the clamp opening as viewed along the at least one of the first pivot axis and the second pivot axis.

12. The operating device according to claim 1, wherein the first operating member includes a first end and a first additional end, and the first additional end is provided closer to the first pivot axis than the first end.

13. The operating device according to claim 12, wherein the first end is configured to be provided closer to a handlebar grip of a handlebar of the human-powered vehicle than the first additional end in a mounting state where the base structure is mounted to the handlebar.

14. The operating device according to claim 13, wherein the base structure includes a clamp, the clamp is configured to couple the base structure and the handlebar of the human-powered vehicle, the clamp includes a clamp opening through which the handlebar is to extend, the clamp opening having a center axis, the first operating member includes a first inclined surface, and the first inclined surface is non-parallel to and non-perpendicular to the center axis of the clamp opening.

15. The operating device according to claim 14, wherein the first inclined surface includes a first surface end and a first additional surface end and extends between the first surface end and the first additional surface end, the first surface end is configured to be provided closer to the handlebar grip of the handlebar than the first additional surface end in the mounting state where the base structure is mounted to the handlebar, a first distance is radially defined between the first inclined surface and the center axis of the clamp opening as viewed in the first direction, and the first inclined surface is inclined to decrease the first distance from the first additional surface end toward the first surface end.

16. The operating device according to claim 1, further comprising:

a first pivot pin extending along the first pivot axis; and a second pivot pin extending along the second pivot axis, wherein the first pivot pin pivotally couples the first operating member and the base structure about the first pivot axis, and the second pivot pin pivotally couples the second operating member and the base structure.

17. The operating device according to claim 16, wherein the second pivot pin is a separate member from the first pivot pin.

18. The operating device according to claim 16, further comprising a third operating member at least partially provided between the first operating member and the second operating member in the first direction, the third operating member is movable relative to the base structure between a third rest position and a third operated position, and at least one of the first pivot pin and the second pivot pin is contactable with the third operating member to position the third operating member in the third rest position.

19. The operating device according to claim 1, wherein a reference plane is defined perpendicularly to the first direction and is provided between a first region and a second region to separate the first region and the second region, the first operating member is provided in the first region, and the second operating member is provided in the second region.

20. The operating device according to claim 19, wherein the second operating member has a shape symmetrical with a shape of the first operating member with respect to the reference plane as viewed along the reference plane.

21. The operating device according to claim 1, further comprising a light emitter unit at least partially provided between the first operating member and the second operating member in the first direction as viewed in a second direction intersecting the first direction.

22. An operating device of a human-powered vehicle, the operating device comprising:

a base structure mountable to the human-powered vehicle;

a first operating member movably coupled to the base structure and configured to receive a first user input operation;

a second operating member movably coupled to the base structure and configured to receive a second user input operation, the first operating member and the second operating member being arranged in a first direction;

a light emitter unit at least partially provided between the first operating member and the second operating member in the first direction as viewed in a second direction intersecting the first direction, the light emitter unit including a light emitter, the light emitter being configured to emit light;

a substrate;

a first electric switch configured to be activated in response to a movement of the first operating member, the first electric switch being electrically mounted on the substrate; and a second electric switch configured to be activated in response to a movement of the second operating member, the second electric switch being electrically mounted on the substrate, wherein the light emitter is electrically mounted on the substrate.

23. The operating device according to claim 22, wherein the light emitter unit at least partially protrudes from at least one of the first operating member and the second operating member as viewed in the first direction.

24. The operating device according to claim 22, wherein the light emitter unit includes a light transmitting member, and the light transmitting member is configured to transmit light emitted from the light emitter.

25. The operating device according to claim 24, wherein at least one of the light emitter and the light transmitting member is at least partially provided between the first operating member and the second operating member in the first direction as viewed in the second direction.

26. The operating device according to claim 24, wherein the light emitter is at least partially provided between the first electric switch and the second electric switch in the first direction as viewed in the second direction.

27. The operating device according to claim 24, further comprising:

a terminal configured to be in contact with an electric power source, wherein the substrate has a first surface and a second surface provided on a reverse side of the first surface, the light emitter being provided on the first surface' and the terminal is provided on at least one of the first surface and the second surface.

28. The operating device according to claim 24, wherein the light transmitting member is integrally provided with at least part of the base structure as a one-piece unitary member.

29. The operating device according to claim 24, wherein the light emitter unit includes an additional member coupled to the light transmitting member, the light transmitting member has first light transmittance, the additional member has second light transmittance, and the first light transmittance is higher than the second light transmittance.

30. The operating device according to claim 29, wherein the additional member includes an opening, and the light transmitting member is at least partially provided in the opening.

31. An operating device of a human-powered vehicle, the operating device comprising:

a base structure mountable to the human-powered vehicle;

a first operating member movably coupled to the base structure and configured to receive a first user input operation;

a second operating member movably coupled to the base structure and configured to receive a second user input operation, the first operating member and the second operating member being arranged in a first direction;

a light emitter unit at least partially provided between the first operating member and the second operating member in the first direction as viewed in a second direction intersecting the first direction; and a third operating member movably coupled to the base structure and configured to receive a third user input operation, wherein the light emitter unit and the third operating member are arranged in a third direction intersecting each of the first direction and the second direction.

* * * * *